(12) United States Patent
Gao et al.

(10) Patent No.: US 12,481,110 B2
(45) Date of Patent: Nov. 25, 2025

(54) OPTICAL MODULE

(71) Applicant: Huawei Technologies Co., Ltd., Shenzhen (CN)

(72) Inventors: Shimin Gao, Dongguan (CN); Lu Cao, Shenzhen (CN); Xue Yin, Shenzhen (CN); Jiansi Tan, Dongguan (CN); Dada Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 18/111,338

(22) Filed: Feb. 17, 2023

(65) Prior Publication Data

US 2023/0204883 A1 Jun. 29, 2023

Related U.S. Application Data

(63) Continuation of application No. PCT/CN2021/090669, filed on Apr. 28, 2021.

(30) Foreign Application Priority Data

Aug. 18, 2020 (CN) .......................... 202010831724.6
Sep. 22, 2020 (CN) .......................... 202011004279.2

(51) Int. Cl.
*H04B 10/00* (2013.01)
*G02B 6/38* (2006.01)
(Continued)

(52) U.S. Cl.
CPC ......... *G02B 6/4293* (2013.01); *G02B 6/3817* (2013.01); *G02B 6/4246* (2013.01);
(Continued)

(58) Field of Classification Search
CPC .. G02B 6/4293; G02B 6/3817; G02B 6/4246; G02B 6/4278; G02B 6/428;
(Continued)

(56) References Cited

U.S. PATENT DOCUMENTS 7,325,983 B1 * 2/2008 Dallesasse ........... G02B 6/4269
398/79
8,641,429 B2 * 2/2014 Fish ................... H01R 13/6658
439/76.1

(Continued)

FOREIGN PATENT DOCUMENTS

CN 103904491 A 7/2014
CN 205910229 U 1/2017
(Continued)

*Primary Examiner* — Agustin Bello
(74) *Attorney, Agent, or Firm* — Slater Matsil, LLP

(57) ABSTRACT

An optical module includes a housing, an optical component, and a power supply component. A second end of the housing is provided with a second socket, and the second end of the housing is an end part configured to be inserted into an optical communication device. The optical component includes a second optical connector, and the power supply component includes a second electrical connector. Both the optical component and the power supply component are located in the housing, both the second optical connector and the second electrical connector are located in the second socket, and positions of the second optical connector and the second electrical connector are independent of each other.

20 Claims, 33 Drawing Sheets

(51) Int. Cl.
  *G02B 6/42* (2006.01)
  *H01R 13/04* (2006.01)
  *H01R 13/05* (2006.01)
  *H01R 13/08* (2006.01)
  *H01R 13/10* (2006.01)
  *H01R 13/22* (2006.01)
  *H01R 13/24* (2006.01)
  *H01R 13/26* (2006.01)
  *H01R 13/518* (2006.01)
  *H01R 31/06* (2006.01)
  *H01R 43/20* (2006.01)
  *H04B 10/80* (2013.01)
  *H01R 13/631* (2006.01)
  *H01R 24/00* (2011.01)
  *H01R 24/62* (2011.01)
  *H01R 103/00* (2006.01)
  *H04B 10/40* (2013.01)

(52) U.S. Cl.
  CPC ........... *G02B 6/4278* (2013.01); *G02B 6/428* (2013.01); *G02B 6/4284* (2013.01); *G02B 6/4292* (2013.01); *H01R 13/04* (2013.01); *H01R 13/05* (2013.01); *H01R 13/08* (2013.01); *H01R 13/10* (2013.01); *H01R 13/22* (2013.01); *H01R 13/2471* (2013.01); *H01R 13/26* (2013.01); *H01R 13/518* (2013.01); *H01R 31/06* (2013.01); *H01R 43/20* (2013.01); *H04B 10/801* (2013.01); *H04B 10/808* (2013.01); *G02B 6/4274* (2013.01); *H01R 13/631* (2013.01); *H01R 24/00* (2013.01); *H01R 24/62* (2013.01); *H01R 2103/00* (2013.01); *H04B 10/40* (2013.01); *Y02E 10/50* (2013.01)

(58) Field of Classification Search
  CPC .. G02B 6/4284; G02B 6/4292; G02B 6/4274; H01R 13/04; H01R 13/05; H01R 13/08; H01R 13/10; H01R 13/22; H01R 13/2471; H01R 13/26; H01R 13/518; H01R 31/06; H01R 43/20; H01R 13/631; H01R 24/00; H01R 24/62; H01R 2103/00; H04B 10/801; H04B 10/808; H04B 10/40; Y02E 10/50
  See application file for complete search history.

(56) References Cited

U.S. PATENT DOCUMENTS

| | | | | |
|---|---|---|---|---|
| 8,646,991 B2* | 2/2014 | Sakurai | ............... | G02B 6/3817 398/141 |
| 9,523,827 B2* | 12/2016 | Sano | ............... | G02B 6/4293 |
| 9,544,058 B2* | 1/2017 | Coffey | ............... | G02B 6/3895 |
| 9,696,506 B2* | 7/2017 | Wu | ............... | H05K 7/20409 |
| 10,541,758 B2* | 1/2020 | Goergen | ............... | H04M 19/08 |
| 11,956,090 B2* | 4/2024 | Cao | ............... | G02B 6/4274 |
| 2007/0237463 A1* | 10/2007 | Aronson | ............... | G02B 6/4416 385/89 |
| 2007/0253168 A1* | 11/2007 | Miller | ............... | G02B 6/4246 361/719 |
| 2010/0303465 A1* | 12/2010 | Dahlfort | ............... | G02B 6/4201 398/115 |
| 2011/0086539 A1* | 4/2011 | Aguren | ............... | H01R 13/641 439/490 |
| 2011/0221601 A1* | 9/2011 | Aguren | ............... | G02B 6/3895 340/653 |
| 2011/0221609 A1* | 9/2011 | Aguren | ............... | G02B 6/4284 340/687 |
| 2011/0229083 A1* | 9/2011 | Dainese J nior | .... | G02B 6/3823 385/74 |
| 2011/0262074 A1* | 10/2011 | Shirk | ............... | G02B 6/0008 385/52 |
| 2012/0301134 A1* | 11/2012 | Davari | ............... | H04L 43/0817 398/9 |
| 2014/0258742 A1* | 9/2014 | Chien | ............... | H04L 12/10 713/300 |
| 2016/0054527 A1* | 2/2016 | Tang | ............... | G02B 6/3895 439/155 |
| 2016/0057518 A1* | 2/2016 | Neudorf | ............... | G02B 6/4292 398/45 |
| 2016/0202434 A1* | 7/2016 | Masahiko | ............... | G02B 6/3893 385/14 |
| 2017/0269316 A1* | 9/2017 | Chang | ............... | H01L 24/81 |
| 2018/0084873 A1 | 3/2018 | Kallman et al. | | |
| 2018/0149819 A1* | 5/2018 | Rivaud | ............... | G02B 6/3814 |
| 2019/0089467 A1* | 3/2019 | Goergen | ............... | G02B 6/4293 |
| 2019/0219780 A1* | 7/2019 | Andrus | ............... | G02B 6/4284 |
| 2020/0044751 A1* | 2/2020 | Goergen | ............... | H04L 12/12 |
| 2020/0137915 A1* | 4/2020 | Morihata | ............... | G02B 6/0008 |
| 2020/0153515 A1* | 5/2020 | Goergen | ............... | G01J 1/4257 |
| 2020/0195350 A1* | 6/2020 | Matsui | ............... | G02B 6/4281 |
| 2020/0367392 A1* | 11/2020 | Long | ............... | H01R 13/6582 |
| 2020/0386954 A1* | 12/2020 | Lan | ............... | G02B 6/4261 |
| 2021/0075163 A1* | 3/2021 | Takai | ............... | H05K 1/141 |
| 2021/0126392 A1* | 4/2021 | Briant | ............... | G02B 6/4292 |
| 2021/0194173 A1* | 6/2021 | Yang | ............... | H01R 13/6594 |
| 2022/0019040 A1* | 1/2022 | Lu | ............... | G02B 6/4246 |
| 2022/0021457 A1* | 1/2022 | Lu | ............... | H04B 10/40 |
| 2022/0102880 A1* | 3/2022 | Huang | ............... | H01R 13/6658 |
| 2023/0194812 A1* | 6/2023 | Gao | ............... | H01R 13/10 385/88 |
| 2023/0204883 A1* | 6/2023 | Gao | ............... | H01R 13/08 385/92 |
| 2023/0288654 A1* | 9/2023 | Ge | ............... | G02B 6/4281 |
| 2024/0106173 A1* | 3/2024 | Duan | ............... | G02B 6/00 |
| 2024/0361540 A1* | 10/2024 | Kao | ............... | G02B 6/4277 |
| 2025/0004224 A1* | 1/2025 | Huang | ............... | H01R 13/7172 |

FOREIGN PATENT DOCUMENTS

| | | |
|---|---|---|
| CN | 206461130 U | 9/2017 |
| CN | 207977900 U | 10/2018 |
| CN | 108051893 B | 1/2020 |
| CN | 111129876 A | 5/2020 |
| CN | 111396764 A | 7/2020 |
| CN | 111413770 A | 7/2020 |
| JP | 2004259554 A | 9/2004 |

* cited by examiner (a)

(b)

OPTICAL MODULE

CROSS-REFERENCE TO RELATED APPLICATIONS

This application is a continuation of International Application No. PCT/CN2021/090669, filed on Apr. 28, 2021, which claims priority to Chinese Patent Application No. 202010831724.6, filed on Aug. 18, 2020 and Chinese Patent Application No. 202011004279.2, filed on Sep. 22, 2020, all of which are herein incorporated by reference in their entireties.

TECHNICAL FIELD

This application relates to the field of optical communication technologies, and in particular, to an optical module.

BACKGROUND

Power over Ethernet (PoE) is a technology that supplies power to some devices (such as an internet protocol (IP) telephone, an access point (AP), and a network camera) by using cables that transmit data signals during transmission of the data signals.

For example, a switch and an AP may be connected by using a composite cable in which an optical fiber and a copper wire are wrapped. For example, an optical module is inserted into a panel of the switch, and may be denoted as a first optical module. An optical module is inserted into a panel of the AP, and may be denoted as a second optical module. Then, the first optical module and the second optical module are connected by using a composite cable, so as to implement a connection between the switch and the AP.

To implement the foregoing connection, correspondingly, each end of the composite cable has an optical fiber connector and a power connector, and each of panels of the switch and the AP has an optical port and an electrical port. The optical port has an optical interface configured to connect to the optical fiber connector, and the electrical port has an electrical interface configured to connect to the power connector.

In this way, the first optical module is inserted into the optical port of the switch, the second optical module is inserted into the optical port of the AP, the optical fiber connector at one end of the composite cable is inserted into the first optical module, the power connector is inserted into the electrical port of the switch, the optical fiber connector at the other end of the composite cable is inserted into the second optical module, and the power connector is inserted into the electrical port of the AP, so that the switch and the AP are connected by using the two optical modules and the composite cable.

The foregoing solution is not conducive to miniaturization development of optical communication devices such as switches and APs.

SUMMARY

This application provides an optical module, to overcome a problem in a related technology. The technical solutions are as follows.

According to a first aspect, an optical module is provided. The optical module includes a housing, an optical component, and a power supply component.

A second end of the housing is provided with a second socket, and the second end of the housing is an end part that is configured to be inserted into an optical communication device.

The optical component includes a second optical connector, and the power supply component includes a second electrical connector.

Both the optical component and the power supply component are located in the housing, both the second optical connector and the second electrical connector are located in the second socket, and positions of the second optical connector and the second electrical connector are independent of each other.

In an example, the optical module not only has an optical-to-electrical conversion function, but also has the power supply component for implementing PoE. The power supply component does not change an original structural feature of the optical module, and does not affect a size of the optical module. In this way, a power connector of the composite cable is electrically connected to the optical communication device by using the optical module, and the power connector of the composite cable does not need to be inserted into the optical communication device, so that panel space of the optical communication device can be reduced, and miniaturization development of the communication device is facilitated.

In a possible implementation, the second electrical connector includes a second electrical connector conductive part.

The second electrical connector conductive part is fastened to a pluggable guide block that is of the optical module and that is located in the second socket.

The second end of the housing is configured to be inserted into an optical communication device that matches a standard optical module packaging type.

The second end of the housing is configured to be inserted into the optical communication device that matches the standard optical module packaging type. It may also be understood that the second end of the housing is configured to be inserted into an optical communication device that matches the optical module, and the optical module is any one of the standard optical module packaging type.

In an example, because positions of the second optical connector and the second electrical connector are independent of each other, and the second electrical connector conductive part is fastened to the center pillar of the optical module, the second socket of the optical module can alternatively be inserted into an optical cage that does not include a power connector, to implement an electrical connection between the second optical connector of the optical module and an electrical interface in the optical cage. The second socket of the optical module is compatible, so that an application range of the optical module can be increased, wide application of the optical module can be enhanced, and use flexibility of the optical module can be improved.

In a possible implementation, the second electrical connector conductive part is a strip-shaped metal sheet.

The strip-shaped metal sheet is located on a surface that is of the pluggable guide block and that is opposite to the second optical connector, and a strip direction of the strip-shaped metal sheet is parallel to an insertion/removal direction of the optical module.

In an example, the second electrical connector conductive part is a strip-shaped metal sheet, and the strip-shaped metal sheet is located on a surface that is of the pluggable guide block and that faces the second optical connector. For example, a surface of the strip-shaped metal sheet and a surface of the pluggable guide block are located in a same plane. In this way, although the strip-shaped metal sheet is additionally disposed in the pluggable guide block of the optical module, because the strip-shaped metal sheet is located on the surface of the pluggable guide block, insertion of a second end of the optical module into the optical cage is not affected. Therefore, the second electrical connector conductive part of the strip-shaped metal sheet can make the second end of the optical module compatible.

In a possible implementation, the second electrical connector conductive part is a strip-shaped spring, and includes a straight part and a bent part.

A mounting groove is provided on a surface that is of the pluggable guide block and that is opposite to the second optical connector, the straight part of the strip-shaped spring is located in the pluggable guide block, the bent part of the strip-shaped spring is located in the mounting groove, and a bending position of the bent part extends out of an opening of the mounting groove.

In an example, the second electrical connector conductive part is a strip-shaped spring, a straight part of the strip-shaped spring is fastened in the pluggable guide block, and a bent part of the strip-shaped spring is suspended in the mounting groove. In this way, the bent part can move in the mounting groove in an up-down direction perpendicular to the insertion/removal direction. In this way, even if the second end of the optical module is inserted into an optical cage that does not include a power interface, because the bent part of the strip-shaped spring can be pressed into the mounting groove, insertion of the second end of the optical module into the optical cage is not affected. Therefore, the second electrical connector conductive part of the strip-shaped spring can make the second end of the optical module compatible.

In a possible implementation, the second electrical connector conductive part is a spring pin.

The spring pin is located in the pluggable guide block, and an end part of the spring pin extends out of the pluggable guide block.

In an example, the second electrical connector conductive part is a spring pin, a tube of the spring pin is fastened in the pluggable guide block, and a pin shaft of the spring pin extends out of an outer end face of the pluggable guide block, but the pin shaft can extend or retract in the tube. Therefore, even if the second end of the optical module is inserted into an optical cage that does not include a power interface, because the pin shaft of the spring pin can be retracted into the tube, the insertion of the second end of the optical module into the optical cage is not affected. Therefore, the second electrical connector conductive part of the spring pin can make the second end of the optical module compatible.

In a possible implementation, the pluggable guide block includes a body and a protective part.

The protective part is fixedly connected to the body, and the protective part is configured as follows.

When the optical module is inserted into the optical communication device, the protective part can enable a pin shaft of the spring pin to be in close contact with a contact point of the optical communication device; or when the optical module is not inserted into the optical communication device, the protective part can protect the pin shaft of the spring pin.

In an example, when the optical module is not inserted into the optical communication device, because the pin shaft of the spring pin is located in the protective part, the protective part encloses the pin shaft. In this way, even if the optical module falls to the ground, the pin shaft is not damaged due to existence of the protective part, and the pin shaft is protected.

In a possible implementation, the protective part includes a slider and a first elastic part, and an elastic force of the first elastic part is less than an elastic force of the spring pin.

An end part of the body is provided with a sliding slot, the slider and the first elastic part are both located in the sliding slot, and the first elastic part is connected between a bottom of the sliding slot and the slider.

One part of the spring pin is located in the body, and the other part of the spring pin is located in the slider. The slider can slide relative to the body and the spring pin, and a sliding direction is parallel to an insertion/removal direction of the optical module.

When the optical module is inserted into the optical communication device, the slider is retracted into the sliding slot, so that the pin shaft of the spring pin is in close contact with the contact point of the optical communication device; or when the optical module is not inserted into the optical communication device, the slider extends out of the sliding slot to protect the pin shaft of the spring pin.

In an example, elasticity of the first elastic part is less than elasticity of the spring pin. When the second end of the optical module is inserted into the optical cage, the optical cage pushes the slider to slide into the sliding slot, so that the pin shaft of the spring pin is closely connected to the power interface in the optical cage, to ensure good contact.

In an example, when the second end of the optical module is not inserted into the optical cage, the first elastic part may be in a natural state or a compressed state, the slider extends out of the sliding slot, and the slider encloses the pin shaft of the spring pin. Even if the second end of the optical module falls to the ground, the slider touches the ground first, and does not damage the pin shaft, thereby protecting the pin shaft.

In a possible implementation, the protective part includes a pressing part, a second elastic part, and an L-shaped rod.

The pin shaft of the spring pin is provided with a groove, a tube wall of a tube of the spring pin is provided with a through hole, and when the groove of the pin shaft is opposite to the through hole of the tube, the pin shaft is accommodated in the tube.

One part of the pressing part is located outside the body, and the other part of the pressing part is located in the body, the spring pin, the second elastic part and the L-shaped rod are all located in the body. The pressing part, the second elastic part, and a first rod of the L-shaped rod are sequentially connected, and a second rod of the L-shaped rod is opposite to the through hole of the tube.

When the optical module is inserted into the optical communication device, the pressing part is in a pressed state, and an end part of the second rod of the L-shaped rod is located outside the tube, so that the pin shaft is in close contact with the contact point of the optical communication device.

When the optical module is not inserted into the optical communication device, and the pin shaft is retracted into the tube, an end part of the second rod of the L-shaped rod is located in the groove of the pin shaft, so that the pin shaft is kept to be retracted into the pin tube.

In an example, when the second end of the optical module is not inserted into the optical cage, the pin shaft of the spring pin is located in the tube, and the end part of the L-shaped rod passes through the tube and is clamped into the groove of the pin shaft, so that the pin shaft is kept in the tube. In this way, even if the second end of the optical module falls to the ground, because the pin shaft is located in the tube, the pin shaft is not damaged, so that the pin shaft is protected.

In an example, when the second end of the optical module is inserted into the optical cage, a side wall of the optical cage presses the pressing part, so that the pressing part extends into the body of the pluggable guide block, and the L-shaped rod leaves the groove of the pin shaft. In this case, the pin shaft has an action force towards the optical cage under an action of an internal spring, so that the pin shaft of the spring pin is closely connected to the power interface in the optical cage, to ensure good contact.

In a possible implementation, the protective part includes a pressing part and a U-shaped part.

A tube of the spring pin is provided with an axial strip-shaped hole, the pin shaft of the spring pin is provided with a bump, and the bump is located in the axial strip-shaped hole.

One part of the pressing part is located outside the body, and the other part of the pressing part is located in the body, the spring pin and the U-shaped part are both located in the body, a first end of the U-shaped part is located at the pressing part, and a second end of the U-shaped part is located at the bump of the pin shaft.

When the optical module is inserted into the optical communication device, the pressing part is in a pressed state, the pin shaft extends out of the tube under a push of the U-shaped rod, so as to be in close contact with the contact point of the optical communication device. When the optical module is not inserted into the optical communication device, the pressing part is in an unpressed state, and the pin shaft is retracted into the tube.

In an example, when the optical module is not inserted into the optical cage, the pressing part extends out of the outer end face of the body, and the U-shaped part no longer pushes the pin shaft of the spring pin, so that the pin shaft is located in the tube. In this way, even if the second end of the optical module falls to the ground, because the pin shaft is located in the tube, the pin shaft is not damaged, so that the pin shaft is protected.

When the optical module is inserted into the optical cage, the optical cage pushes the pressing part, so that the pressing part enters the body of the pluggable guide block, and the U-shaped part applies a push force to the pin shaft in a direction of extending from the tube, so that the pin shaft of the spring pin is closely connected to the power interface in the optical cage, to ensure good contact.

In a possible implementation, the power supply component further includes a second rigid circuit board.

One end of the second rigid circuit board is located in the second socket, and the second electrical connector conductive part of the second electrical connector is an edge connector located on a surface of the second rigid circuit board.

In an example, the power supply line of the power supply component includes a second rigid circuit board. In this way, a surface of a part that is of the second rigid circuit board and that extends into the second socket may have an edge connector, and the edge connector may be used as a conductive part of the second electrical connector. The second rigid circuit board not only has a flat cable used to implement an electrical connection between the first electrical connector and the second electrical connector, but also may have some components installed, to reduce a quantity of components on a first rigid circuit board of the optical component. For another example, a processing chip may be mounted on a surface of the second rigid circuit board, to increase a processing speed of the optical module.

In a possible implementation, the second rigid circuit board and the first rigid circuit board of the optical component are vertically located in parallel in the housing.

In another aspect, an optical communication device is provided. The optical communication device includes a chassis, a mainboard, and an optical-to-electrical conversion assembly.

A panel of the chassis is provided with an optical cable socket, and the optical-to-electrical conversion assembly includes an optical component and a power supply component.

The mainboard, the optical component, and the power supply component are all located in the chassis. The optical component and the power supply component are all located on a surface of the mainboard, and an optical connector of the optical component and an electrical connector of the power supply component are both located in the optical cable socket.

In an example, the optical communication device is integrated with the optical-to-electrical conversion assembly. In this case, when the optical communication device is connected to another device, only an optical cable or a composite cable needs to be inserted, and an optical module does not need to be additionally inserted. Therefore, the connection operation is simple, and loss of the optical module can be avoided. In addition, a case in which a connection fails due to mismatching between the optical module and the optical communication device can be avoided.

In a possible implementation, both the optical connector of the optical component and the electrical connector of the power supply component are located in the optical cable socket, and positions of the optical connector of the optical component and the electrical connector of the power supply component are independent of each other, so that the optical cable socket is configured to insert a cable, and the cable may be a composite cable or an optical cable.

In an example, the optical cable socket of the optical communication device is compatible, so that an optical cable that does not include a power connector can be inserted into the optical cable socket and connected to an optical connector in the optical cable socket, to implement optical signal transmission. Therefore, wide application of the optical communication device can be enhanced, and use flexibility can be improved.

According to a second aspect, a communication device is provided. The communication device includes a chassis, a mainboard, and an optical-to-electrical conversion assembly.

A panel of the chassis is provided with an optical cable socket, and the optical-to-electrical conversion assembly includes an optical component and a power supply component.

The mainboard, the optical component, and the power supply component are all located in the chassis, and the optical component and the power supply component are both located on a surface of the mainboard. Positions of an optical connector of the optical component and an electrical connector of the power supply component are all corresponding to a position of the optical cable socket. For example, the optical connector of the optical component is located in the optical cable socket, and the electrical connector of the power supply component is located at any position in the optical cable socket independent of that of the optical connector of the optical component.

In an example, the communication device is integrated with the optical-to-electrical conversion assembly. In this case, when the communication device is connected to another device, only an optical cable or a composite cable needs to be inserted, and an optical module does not need to be additionally inserted. Therefore, the connection operation is simple, and loss of the optical module can be avoided. In addition, a case in which a connection fails due to mismatching between the optical module and the communication device can be avoided.

In a possible implementation, both the optical connector of the optical component and the electrical connector of the power supply component are located in the optical cable socket, and positions of the optical connector of the optical component and the electrical connector of the power supply component are independent of each other, so that the optical cable socket is configured to insert a cable, and the cable may be a composite cable or an optical cable.

In an example, the optical cable socket of the communication device is compatible, so that an optical cable that does not include a power connector can be inserted into the optical cable socket and connected to an optical connector in the optical cable socket, to implement optical signal transmission. Therefore, wide application of the communication device can be enhanced, and use flexibility can be improved.

According to a third aspect, a PoE device is provided. The PoE device includes the optical module in the first aspect and the implementations of the first aspect.

Figure 1:
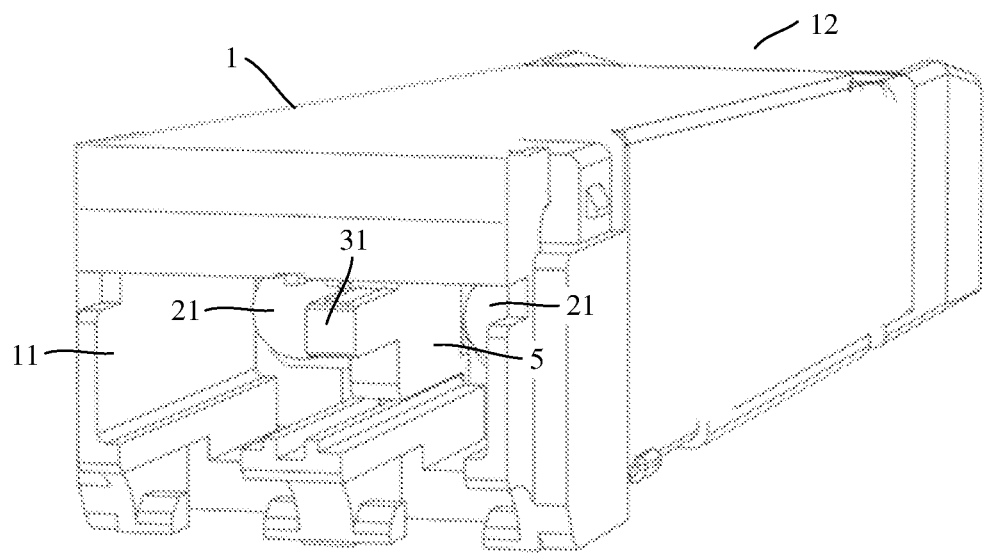
FIG. 1 is a schematic diagram of a structure of an optical module according to this application.

DESCRIPTION OF REFERENCE NUMERALS 1, housing; 11, first socket; 12, second socket; 111, strip-shaped guide groove;
2, optical component; 21, first optical connector; 22, optical-to-electrical conversion component; 23, second optical connector;
221, first rigid circuit board; 222, conversion component;
3, optical component; 31, first electrical connector; 32, power supply line; 33, second electrical connector;
311, first electrical connector conductive part; 321, second rigid circuit board; 322, cable; 323, flexible circuit board; 331, second electrical connector conductive part;
3111, first bent strip; 3111a, first segment; 3111b, second segment; 3111c, third segment;
3112, second bent strip; 3112a, fourth segment; 3112b, fifth segment; 3112c, sixth segment;
3311, straight part; 3312, bent part; 3312a, bending position; 3313, pin shaft; 3313a, groove; 3313b, bump; 3314, tube; 3314a, through hole; 3314b, axial strip-shaped hole;
4, pluggable guide block; 40, body; 41, mounting groove; 42, slider; 43, first elastic part; 44, pressing part; 45, second elastic part; 46, L-shaped rod; 47, U-shaped part;
401, sliding slot; 461, first rod; 462, second rod;
5, center pillar; 51, support plate; 52, guiding and limiting plate; 53, strip-shaped guide block;
521, first plate body; 522, second plate body; 523, groove;
100, chassis; 200, mainboard; 300, optical-to-electrical conversion assembly; and 600, optical cage.

DETAILED DESCRIPTION OF ILLUSTRATIVE EMBODIMENTS

In some related solutions, for each optical electrical composite cable, at least two ports need to be disposed on a panel of a communication device, such as a switch and an AP. One port is used as an optical port and is connected to an optical fiber in the optical electrical composite cable by using an optical module, and the other port is used as an electrical port to insert a power connector of the optical electrical composite cable. Each optical electrical composite cable occupies a relatively large panel size, which is unfavorable to miniaturization development of communication devices such as switches and APs.

The optical electrical composite cable, also referred to as a composite cable for short, is a cable in which an optical fiber and a copper wire are wrapped. The optical fiber is used to transmit an optical signal, the copper wire is used to transmit electric energy, and the transmission of the electric energy may also be referred to as electric energy transmission and power transmission.

Embodiments of this application provide an optical module. The optical module includes an optical component configured to implement optical-to-electrical conversion and a power supply component configured to implement power transmission. Therefore, the optical module may also be referred to as an optical electrical composite module, or a composite module for short. Therefore, the optical module may be configured to perform conversion between an optical signal and an electrical signal, and may be further configured to implement PoE.

The optical module may be applied to a connection between a switch and an AP. An optical module is inserted into a panel of the switch and a panel of the AP separately. The optical module inserted into the switch is connected to the optical module inserted into the AP by using a composite cable, to implement a connection between the switch and the AP.

A first end of the optical module is configured to insert the composite cable, and a second end of the optical module is configured to be inserted into a communication device (for example, the switch and the AP).

In this case, a panel of the communication device has a port (the port may also be referred to as a socket, that is, a socket of an optical cage of the communication device) configured to insert the optical module. The port has an electrical interface connected to an electrical connector (that is, a second optical connector mentioned below) of an optical component of the optical module, and the port further has an electrical interface connected to an electrical connector (that is, a second electrical connector mentioned below) of a power supply component of the optical module. Such a communication device may be referred to as an updated communication device.

Similarly, an end part of the composite cable has an optical fiber connector connected to an optical connector (that is, a first optical connector mentioned below) of the optical component of the optical module, and an end part of the composite cable further has a power connector connected to the electrical connector of the optical module.

In this way, both optical signal transmission and power transmission can be performed between the composite cable and the optical module, and both electrical signal transmission and power transmission can be performed between the optical module and the communication device.

It can be learned that the optical module includes a component (that is, the optical component mentioned below) for implementing an optical-to-electrical conversion function and a component (that is, the power supply component mentioned below) for implementing a PoE function, so that a panel of a communication device that matches the optical module only needs to have a port for inserting the optical module, and the port has an interface for transmitting an electrical signal with the optical component and an interface for transmitting power with the power supply component. This reduces a size of the panel of the communication device and facilitates miniaturization development of the communication device.

Certainly, because the first end that is of the optical module and that is configured to insert the composite cable is compatible, the optical module may be used together with a composite cable that includes a power connector, or may be used together with a conventional optical cable that does not include a power connector. In other words, the first end of the optical module not only can be configured to insert the composite cable, but also can be configured to insert the optical cable.

Similarly, because the second end that is of the optical module and that is configured to be inserted into the communication device is compatible, the optical cage of the communication device may have only an electrical interface connected to the electrical connector (that is, the second optical connector mentioned below) of the optical component of the optical module, and does not have an electrical interface connected to the electrical connector (that is, the second electrical connector mentioned below) of the power supply component of the optical module. Such a communication device may be referred to as a communication device before update, and the optical module in this embodiment may also be used together with the communication device before update. Therefore, the second end of the optical module can be inserted into a communication device that includes a power connector in an optical cage, and can alternatively be inserted into a communication device that does not include a power connector in an optical cage.

The following should be noted.

The optical module in this embodiment may be any one of an optical receiving module, an optical transmitting module, an optical transceiver integrated module, and an optical forwarding module.

The optical module described in this embodiment may be either a hot-pluggable optical module or a non-hot-pluggable optical module.

The optical module described in this embodiment may be any one of a standard packaging type, for example, may be a small form pluggable (SFP) optical module, a quad small form factor pluggable-double density (QSFP-DD) optical module, a C form factor pluggable (CFP) optical module, a gigabit interface converter (GBIC) optical module, a 10 gigabit small form pluggable (XFP) optical module, and the like.

Figure 2:
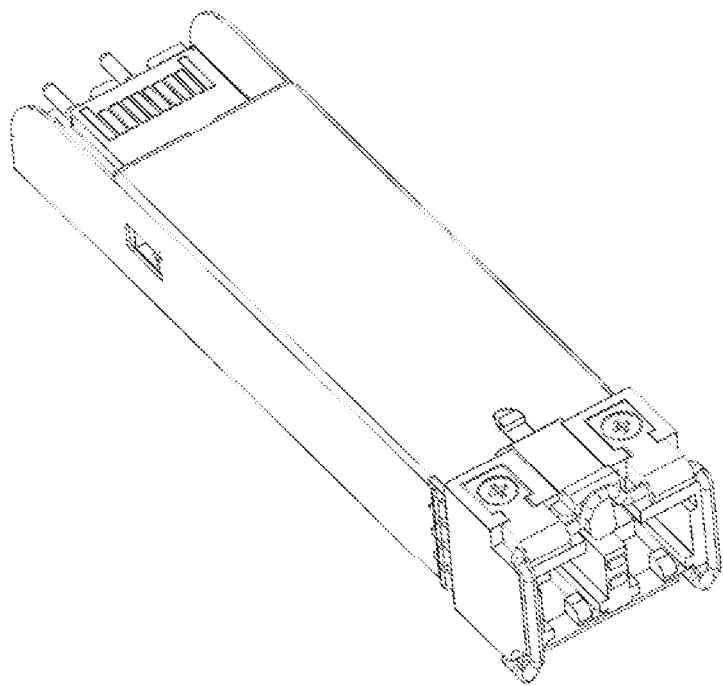
FIG. 2 is a schematic diagram of a structure of an optical module according to this application.
Figure 3:
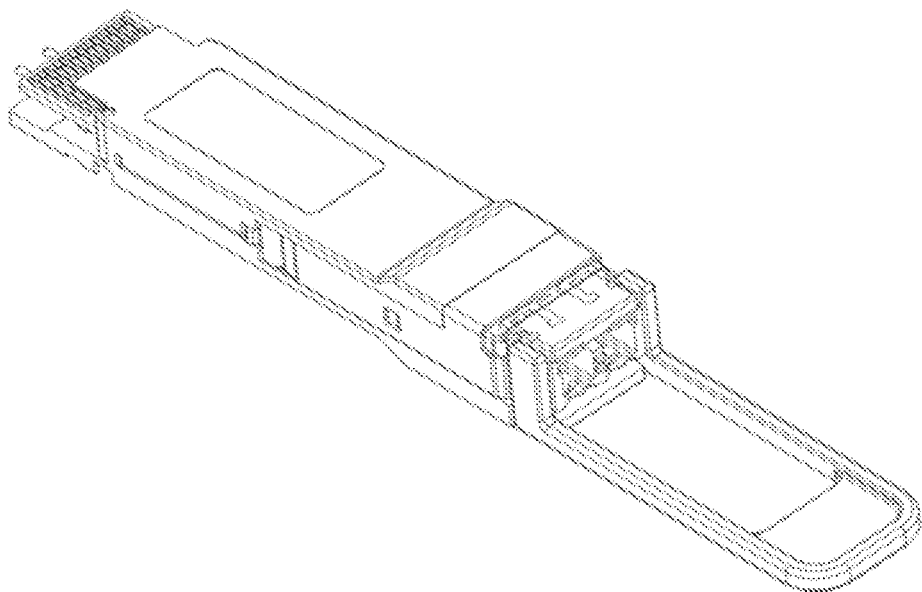
FIG. 3 is a schematic diagram of a structure of an optical module according to this application.
Figure 4:
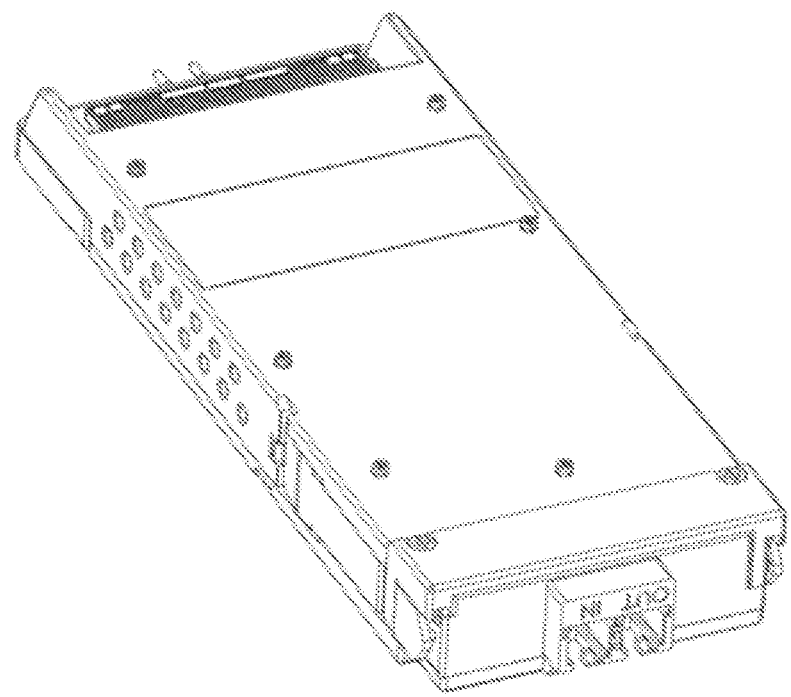
FIG. 4 is a schematic diagram of a structure of an optical module according to this application.

For example, the optical module may be an optical module shown in FIG. 1, and the optical module is an SFP optical module. For another example, the optical module may alternatively be an optical module shown in FIG. 2, and the optical module is an SFP optical module. A difference between the SFP optical module shown in FIG. 1 and the SFP optical module shown in FIG. 2 lies in a structure form of a front panel. For another example, the optical module may alternatively be an optical module shown in FIG. 3, and the optical module is a QSFP-DD optical module. For another example, the optical module may alternatively be an optical module shown in FIG. 4. The optical module is a CFP2 optical module, and the CFP2 optical module is an optical module whose size is half of a size of a CFP optical module.

A specific type of the optical module is not specifically limited in this embodiment, and the optical module in this embodiment may be an optical module packaged in any standard packaging format. For ease of description, an optical module whose packaging type is SFP shown in FIG. 1 may be used as an example. An optical module in another form is similar to the optical module, and details are not described again. The following describes in detail a specific structure of a component for implementing an optical-to-electrical conversion function and a specific structure of a component for implementing a PoE function that are of the optical module.

Figure 5:
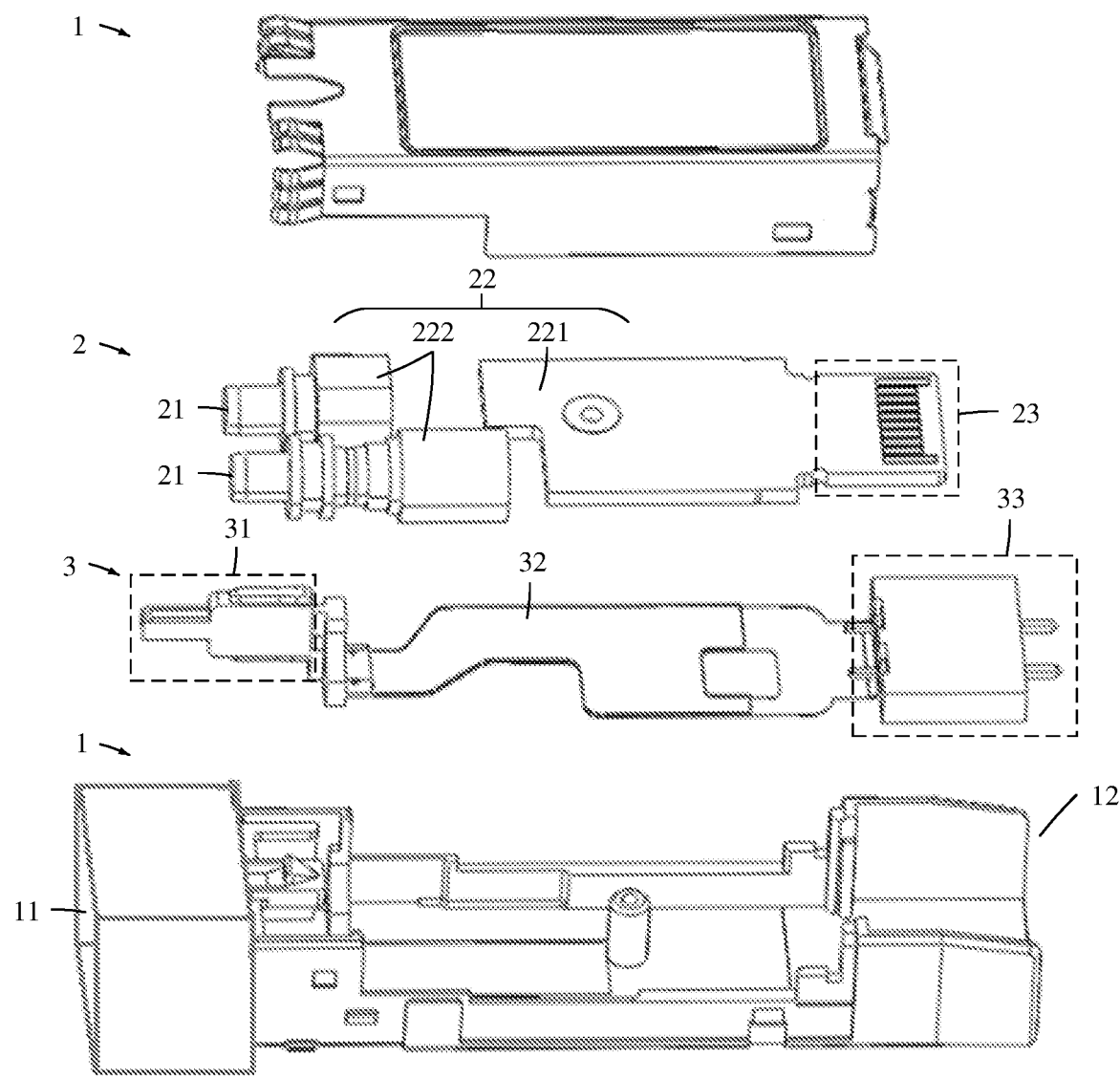
FIG. 5 is a schematic diagram of an exploded structure of an optical module according to this application.

FIG. 5 is a schematic diagram of an exploded structure of the optical module. The optical module includes a housing 1, an optical component 2, and a power supply component 3.

The housing 1 is used as a protective housing of the optical module, and is configured to protect components inside the optical module, so as to implement protection and dustproof and waterproof functions. The optical component 2 is a component configured to implement an optical-to-electrical conversion function. The power supply component 3 is a component configured to implement a PoE function.

To better understand the optical module, the following briefly describes main structures and relative position relationships of the housing 1, the optical component 2, and the power supply component 3.

(1) The Housing 1 of the Optical Module

Figure 6:
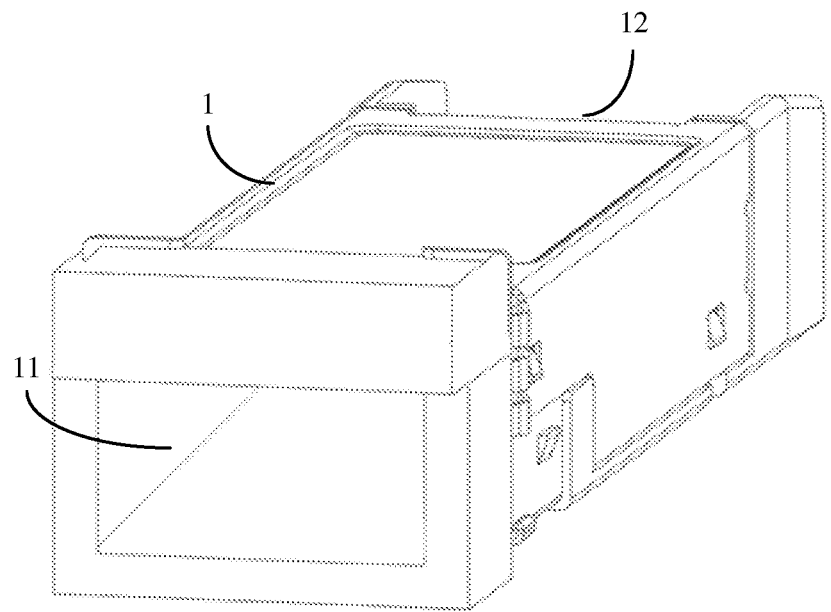
FIG. 6 is a schematic diagram of a structure of a housing of an optical module according to this application.

As shown in FIG. 6, the optical module may be a cuboid box-shaped structure. Correspondingly, the housing 1 may also be a cuboid box-shaped structure. In an example, the housing 1 may be a cuboid box-shaped structure with openings at two ends in a length direction, one of the openings at the two ends is used as a first socket 11, and the other is used as a second socket 12. In another example, the housing 1 may include an upper cover and a base, and the upper cover and the base are fastened to form the housing 1. For example, the upper cover may have a cover-shaped structure, and covers the base. For another example, the upper cover has a plate shape, the base has a box shape without a cover, and the base is covered by the upper cover. A specific structure of the upper cover and a specific structure of the base are not limited in this embodiment, so that the upper cover and the base may be fastened to form a box-shaped structure with openings at two ends.

The first socket 11 (located at a first end of the housing 1) of the housing 1 is configured to insert a composite cable, so as to implement an optical fiber connection between the optical module and the composite cable. The second socket 12 (located at a second end of the housing 1) of the housing 1 is configured to be inserted into an optical cage of a communication device, so as to implement an electrical connection between the optical module and the communication device.

The Optical Component 2

Figure 7:
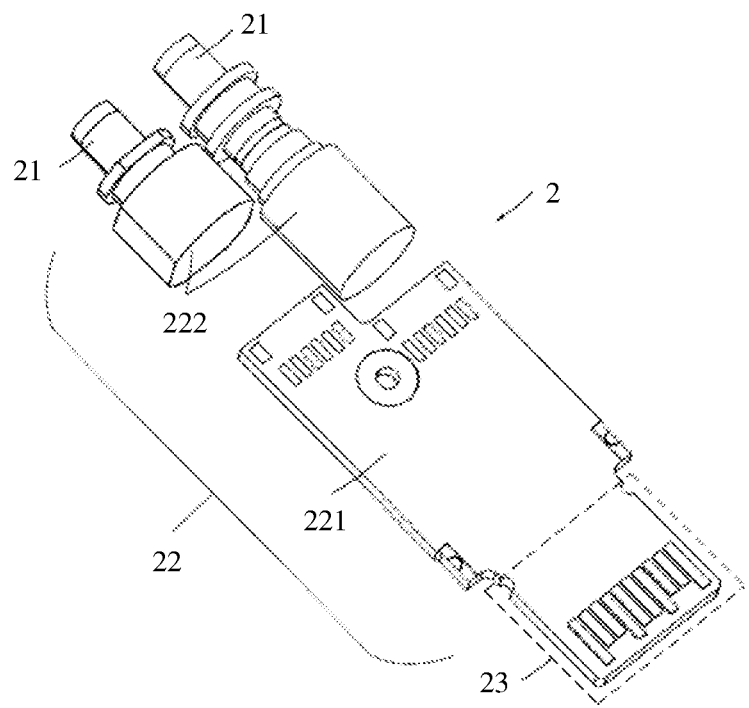
FIG. 7 is a schematic diagram of a structure of an optical component of an optical module according to this application.

The optical component 2 may also be referred to as an optoelectronic component. As shown in FIG. 7, the optical component 2 may include a first optical connector 21, an optical-to-electrical conversion component 22, and a second optical connector 23. One end of the optical-to-electrical conversion component 22 is connected to the first optical connector 21, and the other end is connected to the second optical connector 23. A connection between the first optical connector 21 or the second optical connector 23 and the optical-to-electrical conversion component 22 may include a physical connection and an electrical connection.

The first optical connector 21 is an optical fiber connector, and is configured to connect to an optical fiber connector of a composite cable, to implement optical signal transmission. The second optical connector 23 is an electrical connector, and is configured to implement an electrical connection to an electrical interface in an optical cage of a communication device, to implement electrical signal transmission.

In order to distinguish from two electrical connectors of the power supply component 3, the electrical connector at the second end of the optical module is referred to as the second optical connector 23 in this specification. However, the second optical connector 23 is actually an electrical connector rather than an optical fiber connector.

As shown in FIG. 7, the optical-to-electrical conversion component 22 includes a first rigid circuit board 221 and a conversion component 222. The conversion component 222 includes components required for implementing an optical-to-electrical conversion function, for example, may include components such as a laser, a detector, an amplifier, a clock data recovery apparatus, a driver chip, and a signal processor. One end of the first rigid circuit board 221 is connected to the conversion component 222, a surface of the other end of the first rigid circuit board 221 has an edge connector, and the edge connector forms a conductive part of the second optical connector 23. One end that is of the conversion component 222 and that is away from the first rigid circuit board 221 is connected to the first optical connector 21, so as to transmit a converted optical signal to the composite cable through a first optical connector 21.

Figure 8:
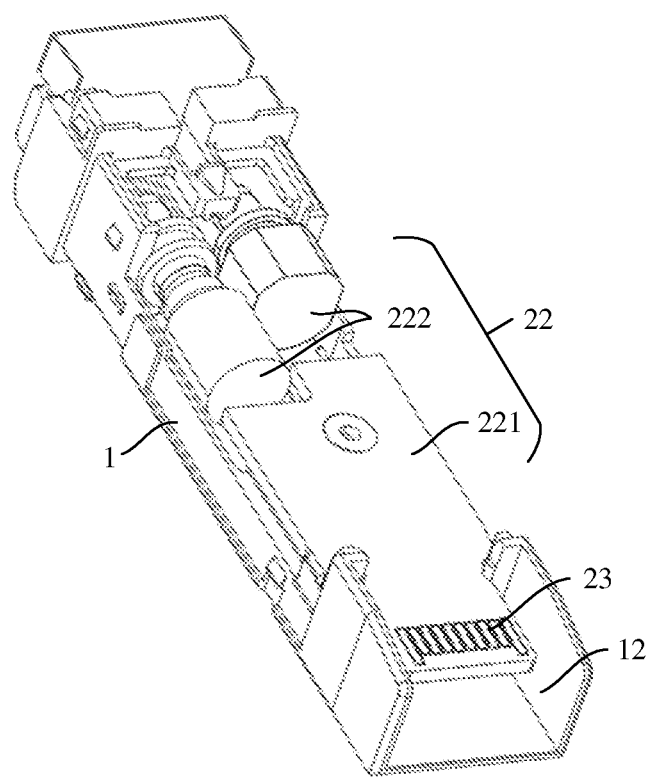
FIG. 8 is a schematic diagram of a structure of an optical component of an optical module in a housing according to this application.

An assembly relationship between the optical component 2 and the housing 1 may be shown in FIG. 8. Both the first rigid circuit board 221 and the conversion component 222 of the optical-to-electrical conversion component 22 are located in the housing 1, and one end that is of the first rigid circuit board 221 and that is away from the conversion component 222 is located in the second socket 12, so that an edge connector on a surface of the end that is of the first rigid circuit board 221 and that is away from the conversion component 222 is located in the second socket 12. In this way, the second optical connector 23 is located in the second socket 12. The first optical connector 21 connected to the conversion component 222 is located in the first socket 11 of the housing 1, as shown in FIG. 1.

The optical module may be a dual-fiber bi-directional optical module. Correspondingly, as shown in FIG. 7, there are two first optical connectors 21, one is used as a transmit end, and the other is used as a receive end. A connection structure between the optical component 2 and the circuit board in FIG. 7 is not shown. The optical module may alternatively be a single-fiber bi-directional optical module. Correspondingly, there is one first optical connector 21, which serves as both a transmit end and a receive end. This embodiment does not limit whether the optical module is specifically a dual-fiber bi-directional module or a single-fiber bi-directional module, and the dual-fiber bi-directional module is used as an example in the accompanying drawings.

The Power Supply Component 3

The power supply component 3 is configured to implement power transmission in power over Ethernet. As shown in FIG. 5, the power supply component 3 includes a first electrical connector 31, a power supply line 32, and a second electrical connector 33. One end of the power supply line 32 is connected to the first electrical connector 31, and the other end of the power supply line 32 is connected to the second electrical connector 33.

The first electrical connector 31 and the second electrical connector 33 are both electrical connectors. The first electrical connector 31 is electrically connected to a power connector of a composite cable, and the second electrical connector 33 is electrically connected to a power connector in an optical cage of a communication device.

Figure 9:
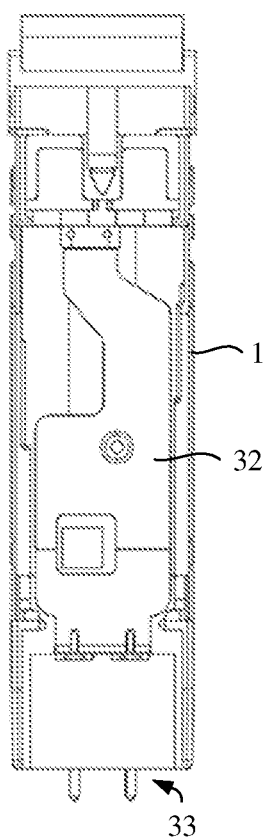
FIG. 9 is a schematic diagram of a structure of a power supply component of an optical module in a housing according to this application.

An assembly relationship between the power supply component 3 and the housing 1 may be as follows. As shown in FIG. 9, the power supply line 32 is located in the housing 1, the first electrical connector 31 is located at the first socket 11, and the second electrical connector 33 is located at the second socket 12. The first electrical connector 31 is located at the first socket 11. For example, as shown in FIG. 1, the first electrical connector 31 may be located in the first socket 11. For another example, the first electrical connector 31 may alternatively be located around the first socket 11. Details are described below.

After the power supply component 3 is mounted in the housing 1, the first electrical connector 31 may not affect a structural feature of the first socket 11 at the first end of the optical module. In this way, although the power supply component 3 is additionally disposed in the optical module, the first socket 11 at the first end of the housing 1 can still be configured to insert an optical cable. The second electrical connector 33 may also not affect a structural feature of the second socket 12 at the second end of the optical module. In this way, the second socket 12 at the second end of the housing 1 can still be inserted into an optical cage that does not include a power connector.

In this way, both ends of the optical module are compatible. Therefore, even if an optical cable that does not include a power connector can even still be inserted into the first socket 11 of the optical module, and is connected to the first optical connector 21 in the first socket 11. Even if the optical cage does not include a power connector, the second socket 12 of the optical module can still be inserted into the optical cage, and is electrically connected to an electrical connector in the optical cage.

It can be learned from the foregoing that the optical module is integrated with the power supply component 3, so that after the optical module is inserted into a communication device, not only an optical fiber connection can be implemented, but also power transmission can be implemented. Therefore, a panel of the communication device into which the optical module is inserted needs to have only a port that matches the optical module, and no power port for implementing power transmission needs to be additionally disposed. This further can reduce a size of the panel of the communication device and facilitate miniaturization development of the communication device.

It should be noted that, unless otherwise specified in the following, the optical fiber connector of the composite cable or the optical cable is an optical fiber connector that matches the first optical connector 21 of the optical module, so that the optical fiber connector of the composite cable or the optical cable can be connected to the first optical connector 21. Similarly, the electrical interface of the optical cage of the communication device is an electrical interface that matches the second optical connector 23 (the second optical connector 23 is an electrical connector) of the optical module, so that the first optical connector 23 can be inserted into the electrical interface of the optical cage to implement transmission of an electrical signal.

In this application, the power supply component 3 is additionally disposed based on a common optical module (which may also be referred to as a conventional optical module). The following sequentially describes structures of the first electrical connector 31, the power supply line 32, and the second electrical connector 33 of the power supply component 3, and positions of the first electrical connector 31, the power supply line 32, and the second electrical connector 33 in the housing 1.

The First Electrical Connector 31 of the Power Supply Component 3

To implement compatibility of the first socket 11, positions of the first electrical connector 31 and the first optical connector 21 are independent of each other, so that the first electrical connector 31 does not affect the first optical connector 21.

In this case, position distribution of the first electrical connector 31 may be as follows.

A first electrical connector conductive part 311 of the first electrical connector 31 is exposed from the housing 1 and is located at any position at the first end of the housing 1. Positions of the first optical connector 21 and the first electrical connector 31 are independent of each other, so that the first socket 11 is compatible.

Figure 10:
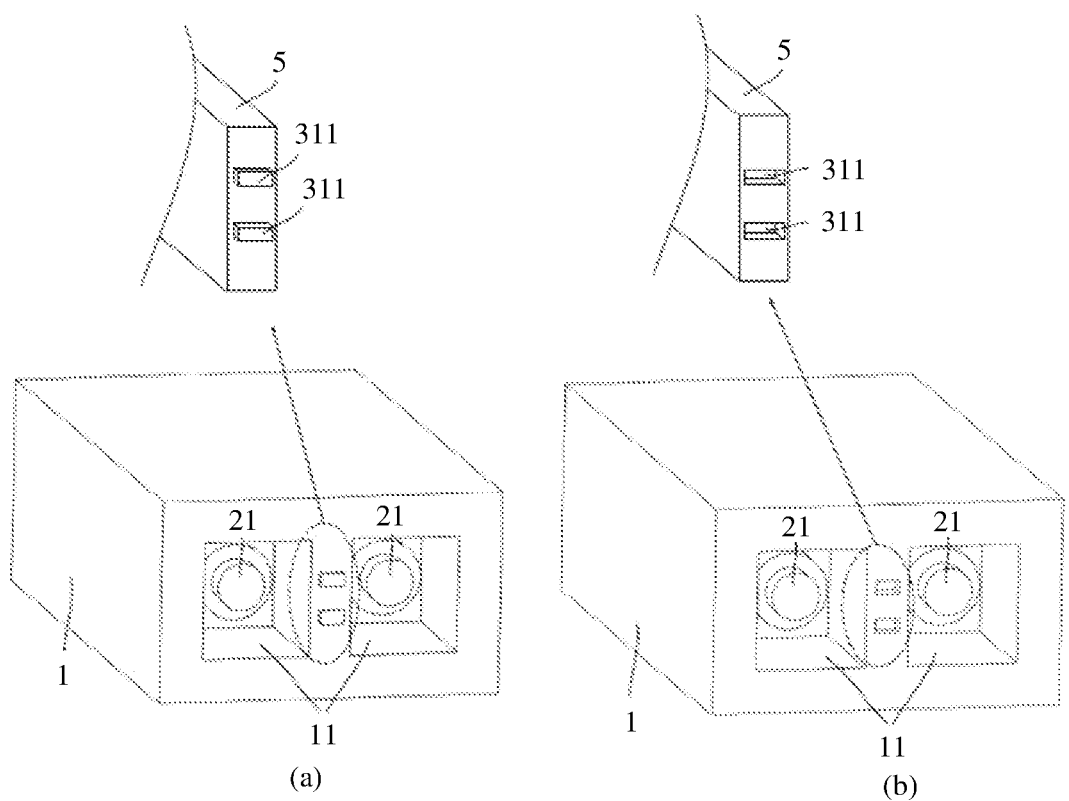
FIG. 10 is a schematic diagram of a structure of a position of a first electrical connector conductive part of an optical module according to this application.
Figure 11:
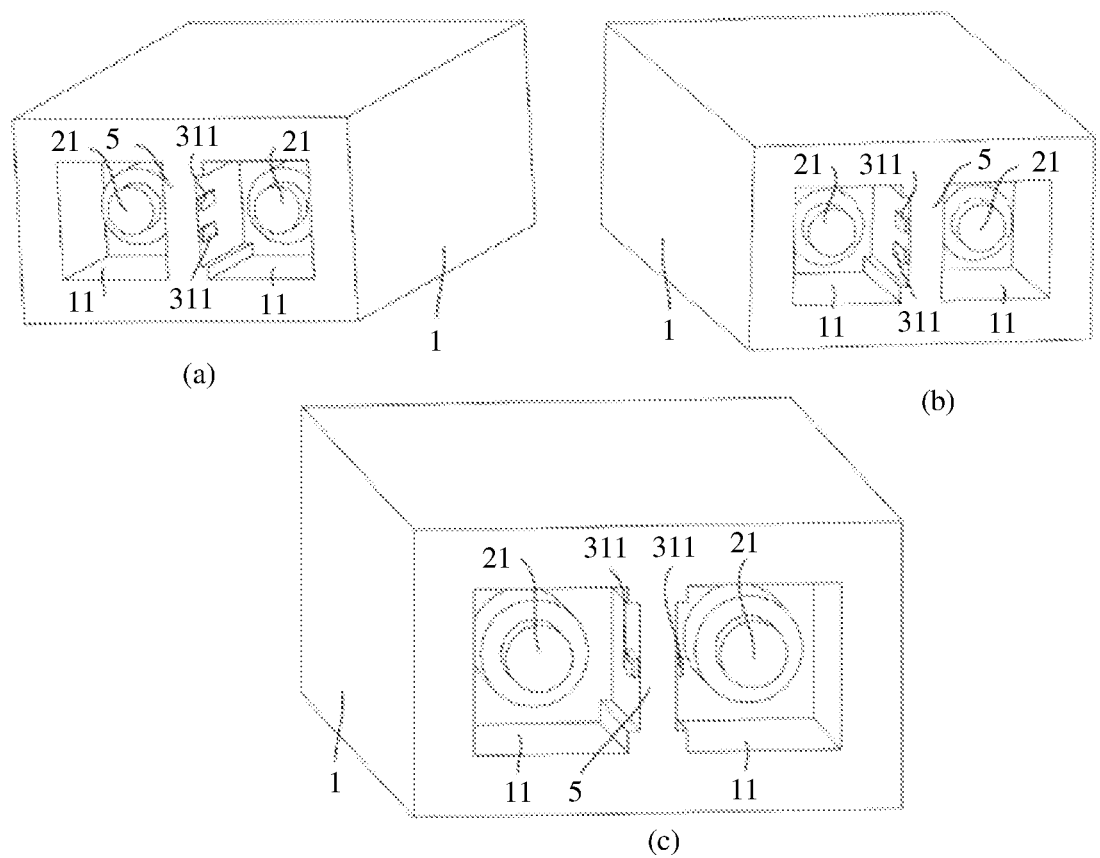
FIG. 11 is a schematic diagram of a structure of a position of a first electrical connector conductive part of an optical module according to this application.

As shown in FIG. 10 and FIG. 11, the first electrical connector conductive part 311 of the first electrical connector 31 is fastened to a center pillar 5 of the optical module.

A feature of the center pillar 5 is described in detail in the following when the first electrical connector conductive part 311 of the first electrical connector 31 is described. Both the center pillar 5 and the first optical connector 21 are located in the first socket 11. For example, as shown in FIG. 10, there are two first optical connectors 21, and the optical module is an optical module with dual optical connectors. In this case, both the center pillar 5 and the two first optical connectors 21 are located in the first socket 11, the center pillar 5 is located between the two first optical connectors 21, and the center pillar 5 divides the first socket 11 into two sub-sockets.

A solution in which the first electrical connector conductive part 311 is fastened to the center pillar 5 may further include the following several possible cases.

As shown in FIG. 10, an end part of the first electrical connector conductive part 311 is located on an outer end face of the center pillar 5. For example, for the first electrical connector conductive part 311, the end part of the first electrical connector conductive part 311 is flush with the outer end face of the center pillar 5. For another example, as shown in (b) in FIG. 10, the outer end face of the center pillar 5 has a groove, the first electrical connector conductive part 311 is located in the groove, and the outer end face of the first electrical connector conductive part 311 is lower than the outer end face of the center pillar 5.

For another example, a length of the center pillar 5 is less than a standard length. As shown in (a) in FIG. 10, the first electrical connector conductive part 311 is a column-shaped structure, and the end part of the first electrical connector conductive part 311 extends out of the outer end face of the center pillar 5. A sum of a length of a part that is of the first electrical connector conductive part 311 and that extends out of the center pillar 5 and a length of the center pillar 5 is less than or equal to the standard length. The standard length is a length of the center pillar 5 obtained when the optical module is packaged based on a standard packaging type, or a conventional length of a center pillar of an optical module that does not include the power supply component 3.

In this way, although the first electrical connector conductive part 311 extends out of the outer end face of the center pillar 5, the first electrical connector conductive part 311 does not block insertion of an optical cable that does not include a power connector into the first socket 11, so that when an optical fiber connector of the optical cable is inserted, it is avoided that the optical fiber connector fails to be connected to the first optical connector 21 due to touching the first electrical connector conductive part 311 first, and the first socket 11 is compatible.

As shown in FIG. 11, the first electrical connector conductive part 311 is located on an inner wall surface of the center pillar 5. For example, as shown in (a) and (b) in FIG. 11, two first electrical connector conductive parts 311 are located on a same inner wall surface of the center pillar 5. For another example, as shown in (c) in FIG. 11, one first electrical connector conductive part 311 is located on one inner wall surface of the center pillar 5, and the other first electrical connector conductive part 311 is located on the other inner wall surface of the center pillar 5.

An outer surface of the first electrical connector conductive part 311 may be higher than the inner wall surface of the center pillar 5, and the outer surface of the first electrical connector conductive part 311 may alternatively be lower than the inner wall surface of the center pillar 5. For example, as shown in (c) in FIG. 11, an inner wall of the center pillar 5 has a groove, and the first electrical connector conductive part 311 is located in the groove, so that the outer surface of the first electrical connector conductive part 311 is lower than the inner wall surface of the center pillar 5. The outer surface of the first electrical connector conductive part 311 may alternatively be flush with the inner wall surface of the center pillar 5. This is not limited in this application, provided that an optical cable that does not include a power connector can be inserted into the first socket 11 and is connected to the first optical connector 21.

As shown in FIG. 12 to FIG. 14 and FIG. 17, the first electrical connector conductive part 311 of the first electrical connector 31 is fastened to an end face of a first end of the housing 1.

Figure 12:
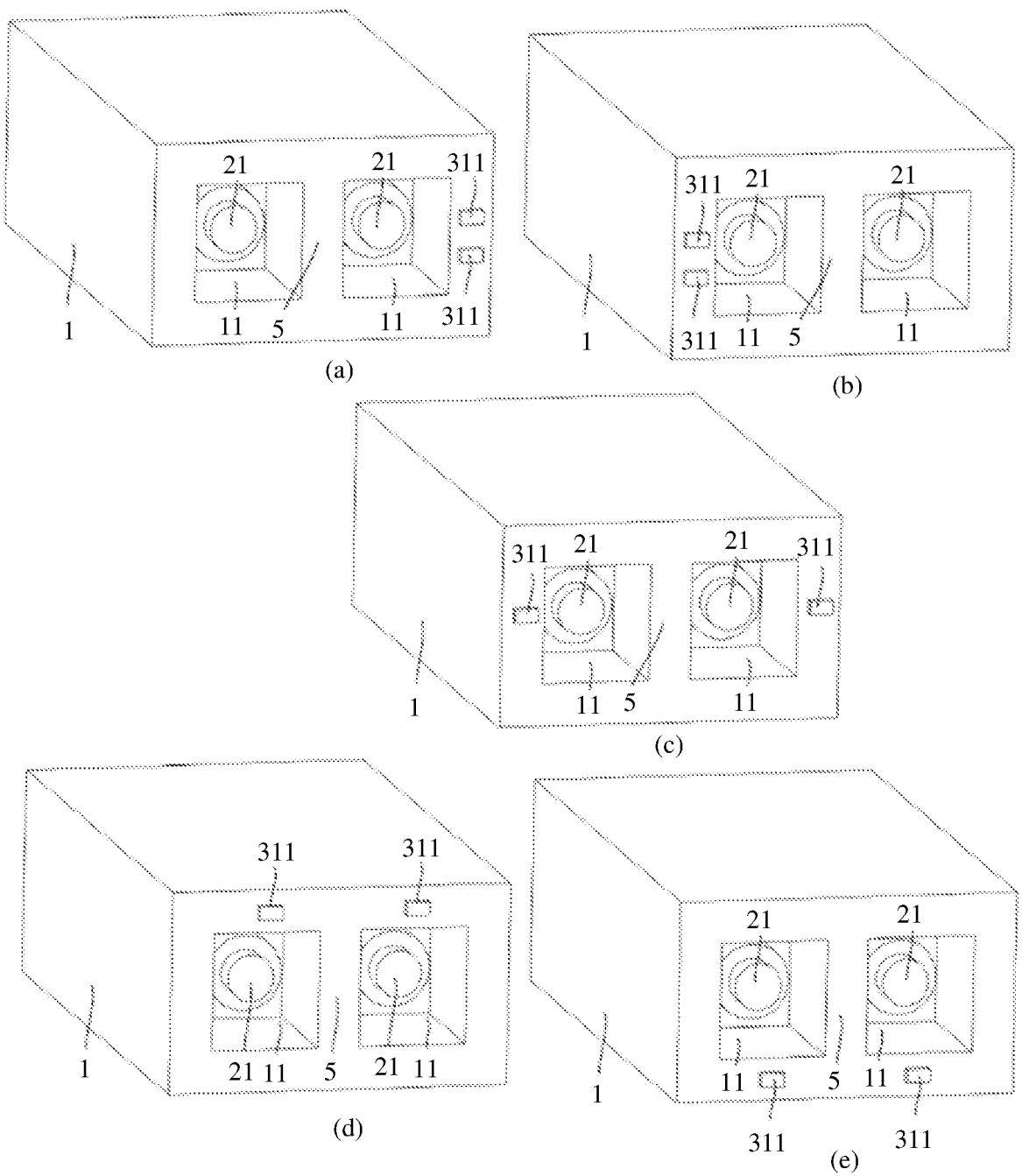
FIG. 12 is a schematic diagram of a structure of a position of a first electrical connector conductive part of an optical module according to this application.
Figure 13:
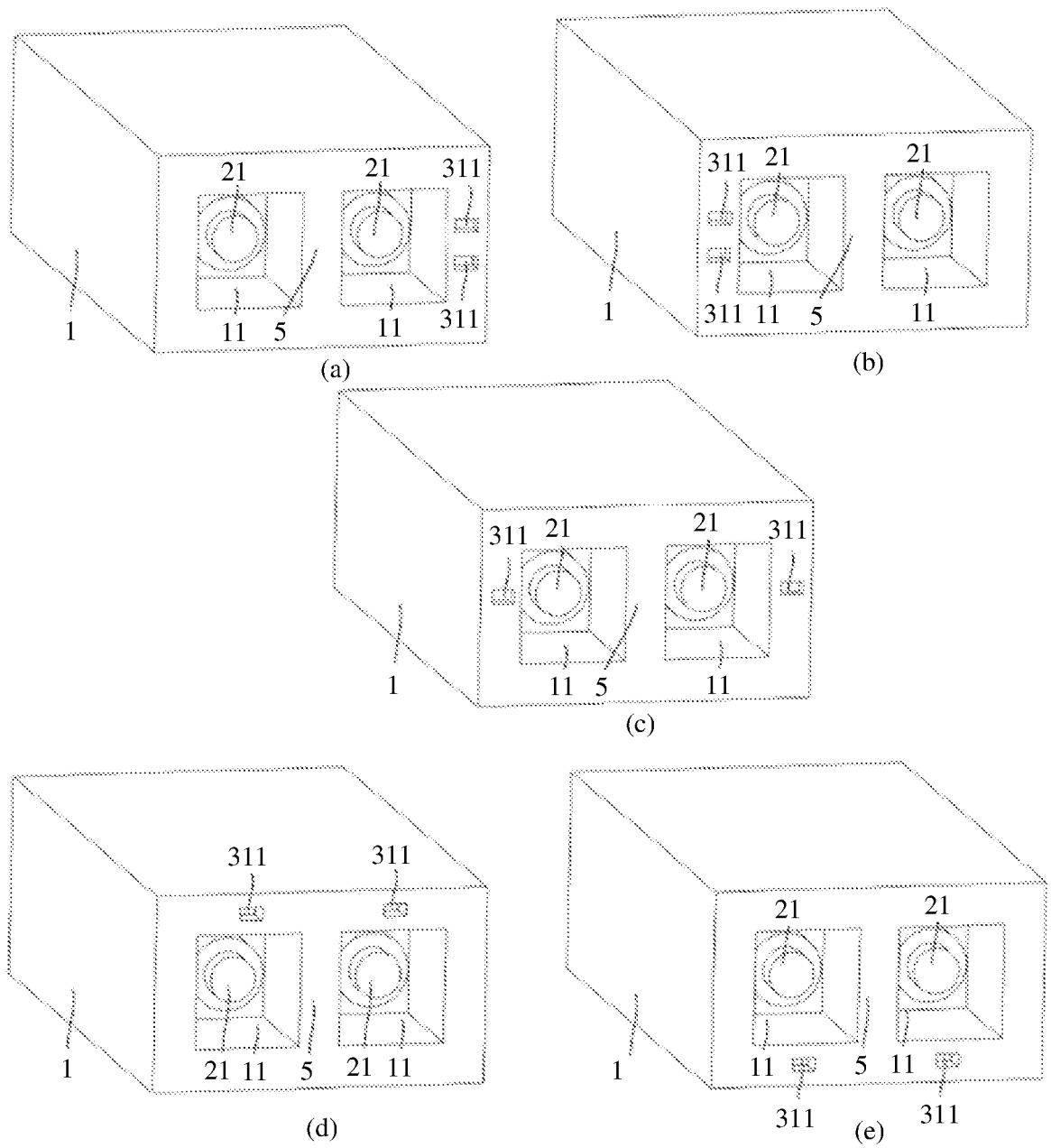
FIG. 13 is a schematic diagram of a structure of a position of a first electrical connector conductive part of an optical module according to this application.

An outer surface of the first electrical connector conductive part 311 may be flush with an outer end face of the first end of the housing 1. As shown in FIG. 12, the outer surface of the first electrical connector conductive part 311 may alternatively protrude from the outer end face of the first end of the housing 1. As shown in FIG. 13, the outer surface of the first electrical connector conductive part 311 may alternatively recess on the outer end face of the first end of the housing 1. In a case in which the outer surface of the first electrical connector conductive part 311 recess on the outer end face of the first end of the housing 1, the outer end face of the first end of the housing 1 has a groove, and the first electrical connector conductive part 311 is located in the groove. For example, an end part of the first electrical connector conductive part 311 is lower than an opening of the groove.

The first electrical connector conductive part 311 may be in a shape of a cylinder, a rectangular column, or the like. This is not limited in this application.

In an example, a solution in which the first electrical connector conductive part 311 is fastened to the end face of the first end of the housing 1 may further include the following several possible cases.

For example, as shown in FIG. 12 and FIG. 13, the two first electrical connector conductive parts 311 may be located on an outer end face of a same sidewall of the first socket 11. For example, the two first electrical connector conductive parts 311 are located on an outer end face of a left sidewall or an outer end face of a right sidewall of the first socket 11, or the two first electrical connector conductive parts 311 are located on an outer end face of a top wall or an outer end face of a bottom wall of the first socket 11. For another example, as shown in FIG. 12 and FIG. 13, two first electrical connector conductive parts 311 may be located on outer end faces of different sidewalls of the first socket 11. For example, one first electrical connector conductive part 311 is located on an outer end face of a left sidewall, and the other first electrical connector conductive part 311 is located on an outer end face of a right sidewall.

Figure 14:
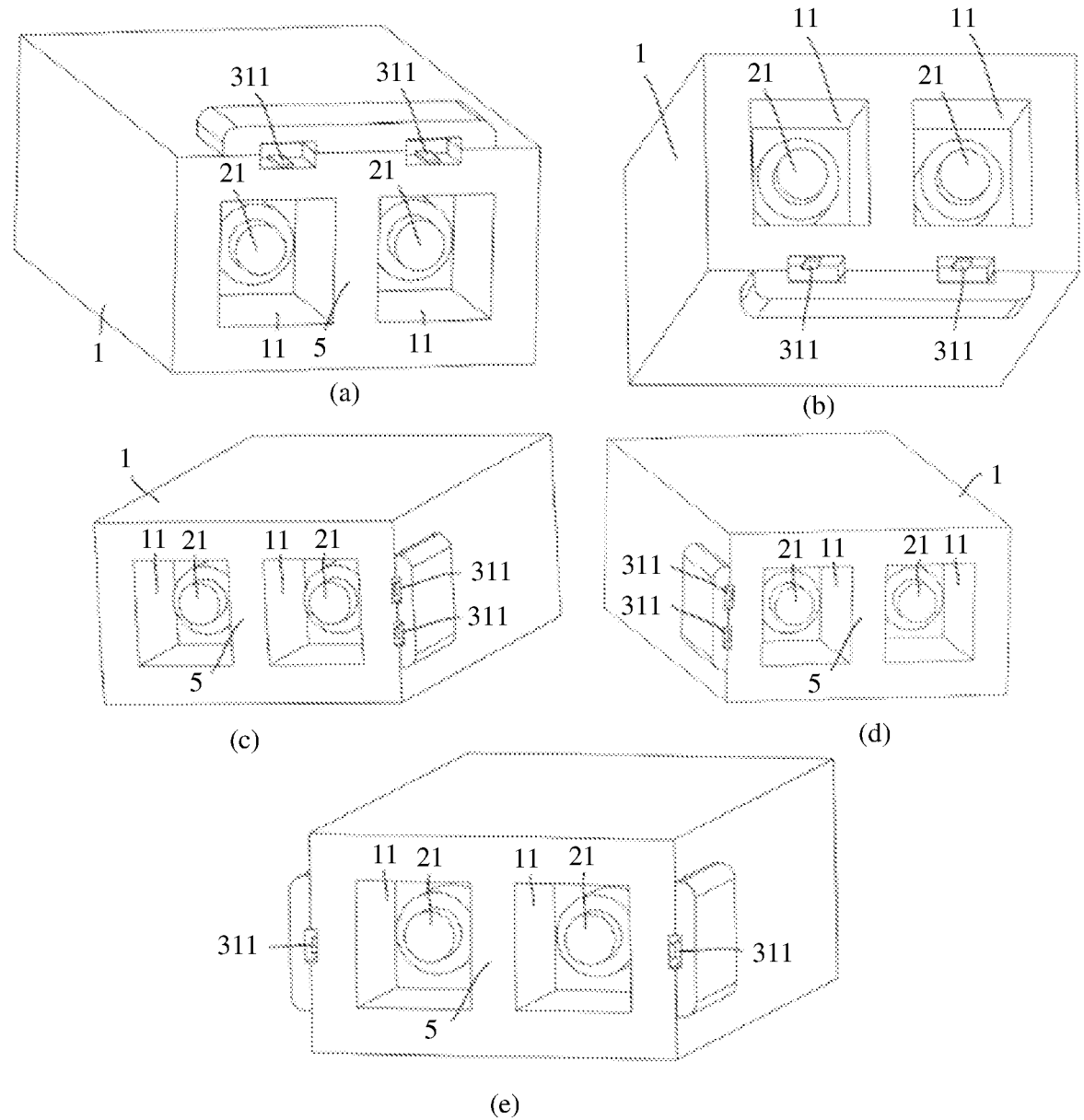
FIG. 14 is a schematic diagram of a structure of a power supply component of an optical module in a housing according to this application.

For another example, as shown in FIG. 14, the first electrical connector conductive part 311 is located at an outer edge of the first end of the housing 1, the outer edge of the first end of the housing 1 has a boss structure, a groove is provided at a joint between the boss structure and the outer edge of the first end of the housing 1, and the first electrical connector conductive part 311 is located in the groove.

Figure 15:
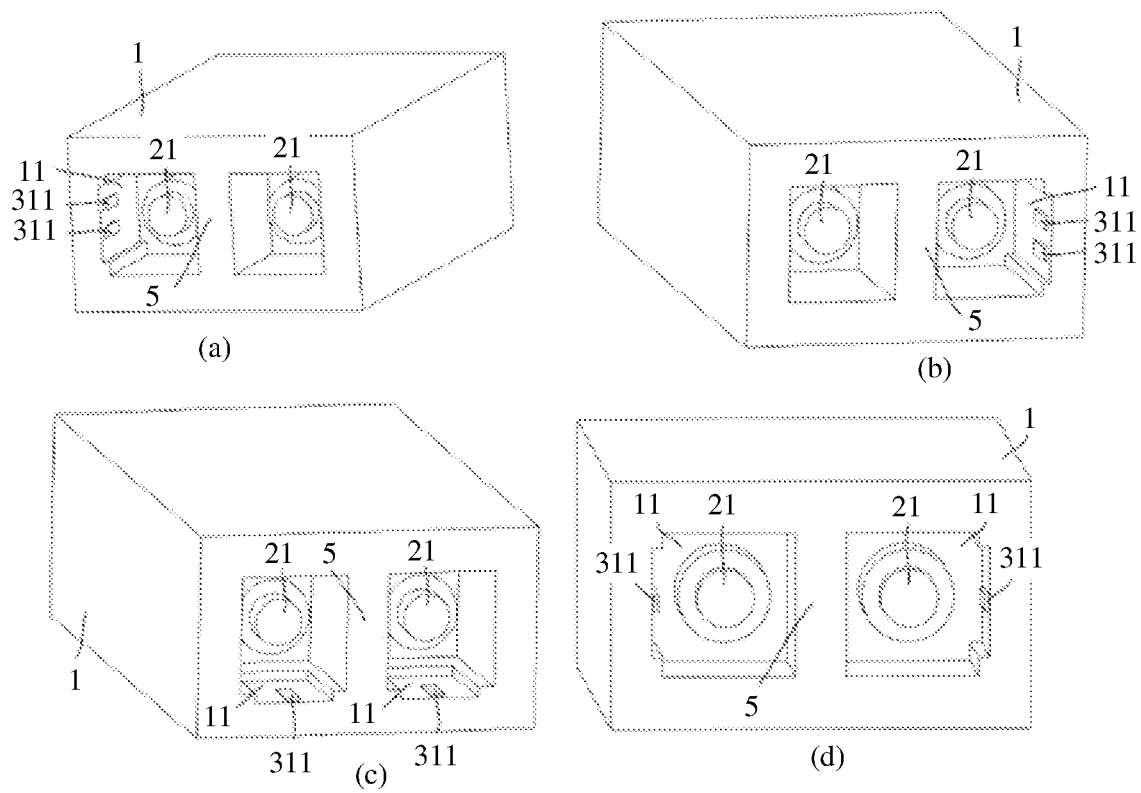
FIG. 15 is a schematic diagram of a structure of a position of a first electrical connector conductive part of an optical module according to this application.

As shown in FIG. 15, the first electrical connector conductive part 311 of the first electrical connector 31 is located on an inner wall of the first socket 11.

For example, as shown in (a), (b), and (c) in FIG. 15, the two first electrical connector conductive parts 311 are located on a same inner wall of the first socket 11. For another example, as shown in (d) in FIG. 15, one first electrical connector conductive part 311 is located on one inner wall of the first socket 11, and the other first electrical connector conductive part 311 is located on the other inner wall of the first socket 11. For example, the center pillar 5 is located in the first socket 11 for dividing the first socket 11 into two left and right sub-sockets. As shown in (d) in FIG. 15, one first electrical connector conductive part 311 is located on an inner wall of one sub-socket, and the other first electrical connector conductive part 311 is located on an inner wall of the other sub-socket.

An outer surface of the first electrical connector conductive part 311 may be higher than the inner wall of the first socket 11. The outer surface of the first electrical connector conductive part 311 may alternatively be lower than the inner wall of the first socket 11. For example, as shown in (c) in FIG. 15, the inner wall of the center pillar 5 has a groove, and the first electrical connector conductive part 311 is located in the groove, so that the outer surface of the first electrical connector conductive part 311 is lower than the inner wall surface of the first socket 11. The outer surface of the first electrical connector conductive part 311 may alternatively be flush with the inner wall of the first socket 11. This is not limited in this application, provided that an optical cable that does not include a power connector can be inserted into the first socket 11 and is connected to the first optical connector 21.

Figure 16:
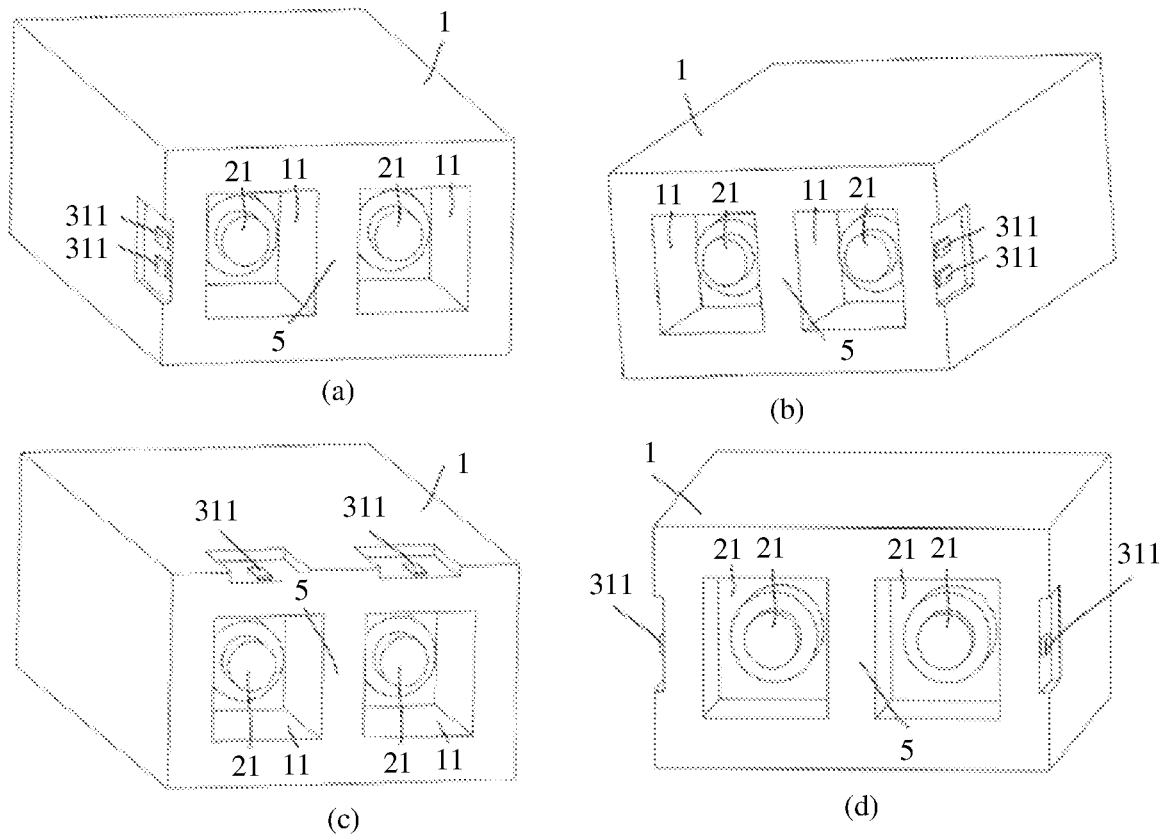
FIG. 16 is a schematic diagram of a structure of a position of a first electrical connector conductive part of an optical module according to this application.
Figure 17:
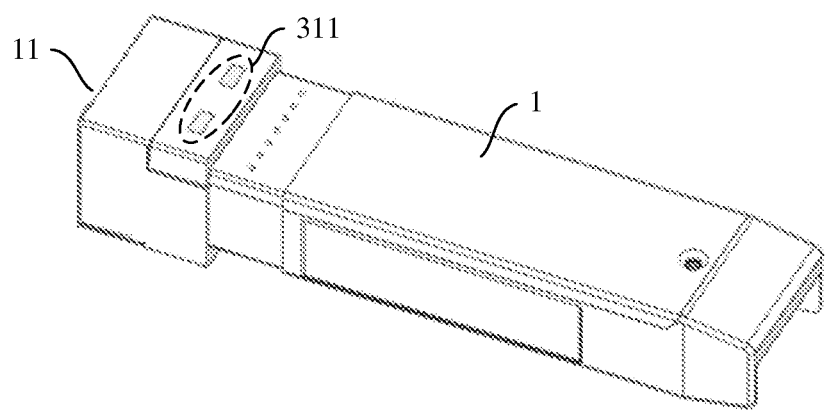
FIG. 17 is a schematic diagram of a structure of a position of a first electrical connector conductive part of an optical module according to this application.

As shown in FIG. 16 and FIG. 17, the first electrical connector conductive part 311 of the first electrical connector 31 is located on an outer wall that is of the housing 1 and that is close to the first socket 11. The outer wall may be an outer surface of a top wall, an outer surface of a bottom wall, or an outer surface of a sidewall.

As shown in FIG. 16, the outer wall that is of the housing 1 and that is close to the first socket 11 may have a groove, and the first electrical connector conductive part 311 may be located in the groove.

For example, as shown in (a), (b), and (c) in FIG. 16, and as shown in FIG. 17, the two first electrical connector conductive parts 311 are located on a same outer wall. For another example, as shown in (d) in FIG. 16, one first electrical connector conductive part 311 is located on an outer wall, and the other first electrical connector conductive part 311 is located on another outer wall.

The position distribution of the first electrical connector conductive part 311 may be applied to an optical module with dual optical connectors, or may be applied to an optical module with a single optical connector. Although the optical module with dual optical connectors is used as an example in the figure, this is not limited, and may also be applied to an optical module with a single optical connector.

Figure 18:
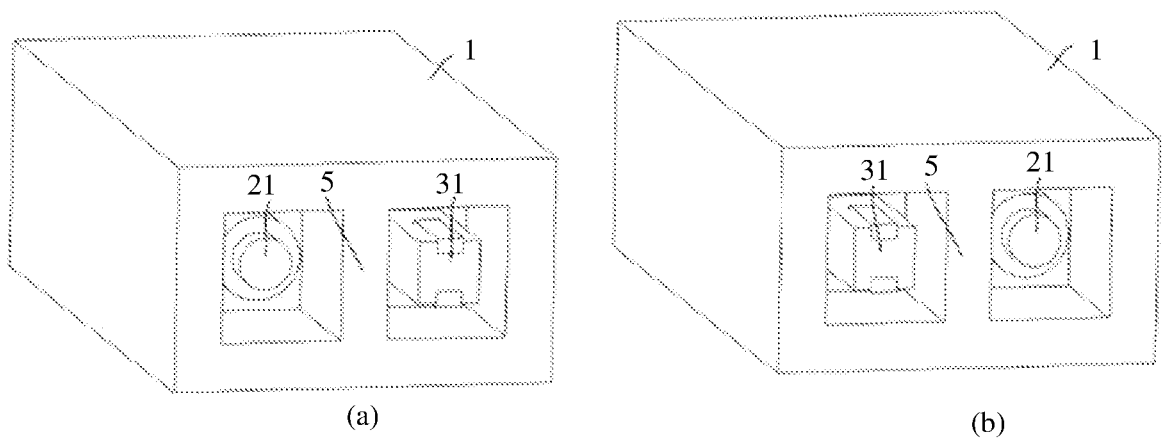
FIG. 18 is a schematic diagram of a structure of a position of a first electrical connector conductive part of an optical module according to this application.
Figure 19:
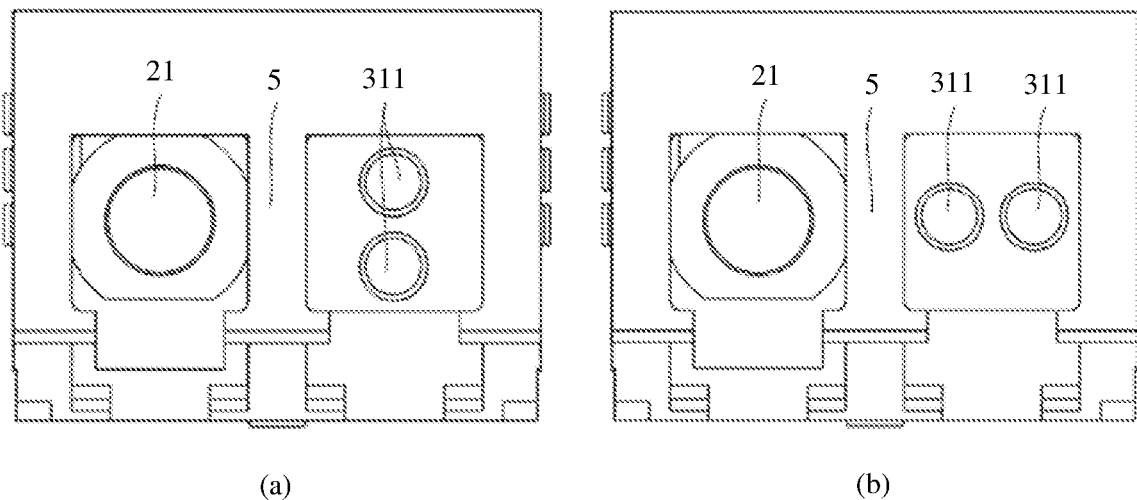
FIG. 19 is a schematic diagram of a structure of a position of a first electrical connector conductive part of an optical module according to this application.

In addition, for an optical module with a single optical connector, the first electrical connector 31 of the optical module may alternatively be distributed in the following manner. As shown in FIG. 18 and FIG. 19, there is one first optical connector 21; the first optical connector 21 is located on a first side of the center pillar 5 of the optical module, the first electrical connector 31 is located on a second side of the center pillar 5, and the first side and the second side of the center pillar 5 are opposite.

In an example, as shown in FIG. 18, the first electrical connector 31 may be in a column-shaped structure, and is located on the second side of the center pillar 5. The first electrical connector 31 includes a column body and a first electrical connector conductive part 311, and the first electrical connector conductive part 311 is located on a surface of the column body.

In another example, as shown in FIG. 19, the first electrical connector conductive part 311 may be on the second side of the center pillar 5 and is located on an outer end face of the first end of the housing 1. For example, the first electrical connector conductive part 311 is an outer end face that protrudes from the first end of the housing 1. For another example, the first electrical connector conductive part 311 recesses on an outer end face of the first end of the housing 1. The first electrical connector conductive part 311 may be in a shape of a rectangular column, a cylinder, or the like. The two first electrical connector conductive parts 311 may be arranged from top to bottom, or may be arranged from left to right.

The foregoing is about the position distribution of the first electrical connector conductive part 311 and the specific shape of the first electrical connector conductive part 311. Regardless of how the first electrical connector conductive part 311 is distributed or what the specific shape of the first electrical connector conductive part 311 is, after the first electrical connector conductive part 311 is disposed in the first socket 11 or around the first socket 11, positions of the first electrical connector conductive part 311 and the first optical connector 21 are independent of each other, and the first electrical connector conductive part 311 does not affect a connection between an optical fiber connector of an optical cable and the first optical connector 21.

In this way, for a composite cable that includes a power connector and that matches the first electrical connector conductive part 311, after the composite cable is inserted into the first socket 11, an optical fiber connector of the composite cable is connected to the first optical connector 21 in the first socket 11, to implement optical signal transmission. The power connector of the composite cable is electrically connected to the first electrical connector conductive part 311, to implement power transmission.

In addition, for an optical cable that does not include a power connector, because the first electrical connector conductive part 311 does not block insertion of an optical fiber connector of the optical cable, the optical fiber connector of the optical cable can be connected to the first optical connector 21, so as to implement optical signal transmission.

It can be learned that the first end of the optical module has both the first optical connector 21 and the first electrical connector 31. Therefore, it is unnecessary to dispose, on a panel of a communication device (such as a switch and an AP) into which the optical module is inserted, a power interface configured to insert a power connector of a composite cable. This reduces a size of the panel of the communication device and facilitates miniaturization development of the communication device.

In addition, the first socket 11 at the first end of the optical module can be configured to insert the composite cable that includes the power connector and that matches the first electrical connector conductive part 311, and the optical cable that does not include the power connector, so that the first socket 11 of the optical module is compatible, an application scenario of the optical module is expanded, use flexibility of the optical module is improved, and it is easy for cable onsite preparation.

The foregoing is about the position distribution of the first electrical connector 31. The following describes several structural forms of the first electrical connector 31.

In one structural form, the first electrical connector conductive part 311 of the first electrical connector 31 includes a bent strip, for example, includes two bent strips. For details, refer to the following.

The first electrical connector 31 and the first optical connector 21 are independent of each other in position and are located in the first socket 11, so that the first socket 11 is compatible, and can be configured to insert any cable that matches the packaging type of the optical module. In this way, the composite cable that includes the power connector can be inserted into the first socket 11, and the optical cable that does not include the power connector can also be inserted into the first socket 11. The composite cable that includes the power connector includes a power connector that matches the first electrical connector 31 at an end part of the composite cable; and the optical cable that does not include the power connector includes no power connector at an end part of the composite cable, and includes only an optical fiber connector.

Figure 20:
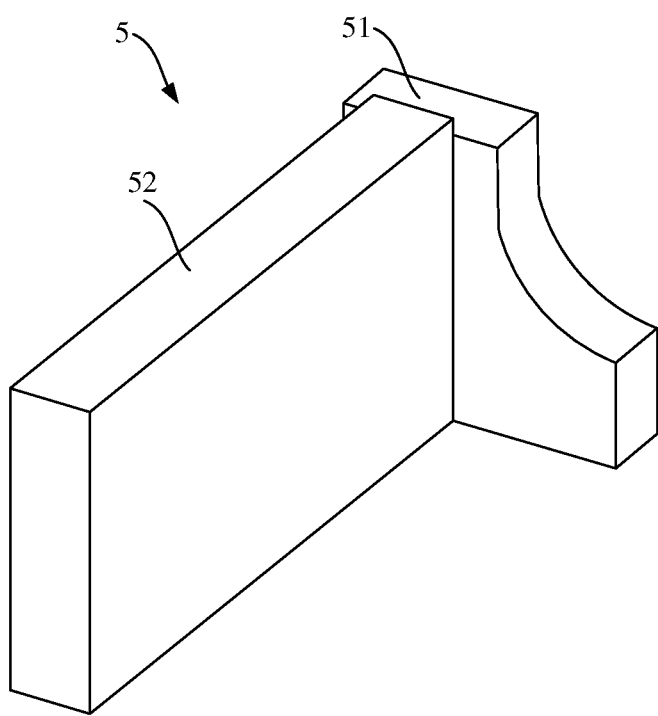
FIG. 20 is a schematic diagram of a structure of a center pillar of an optical module according to this application.
Figure 21:
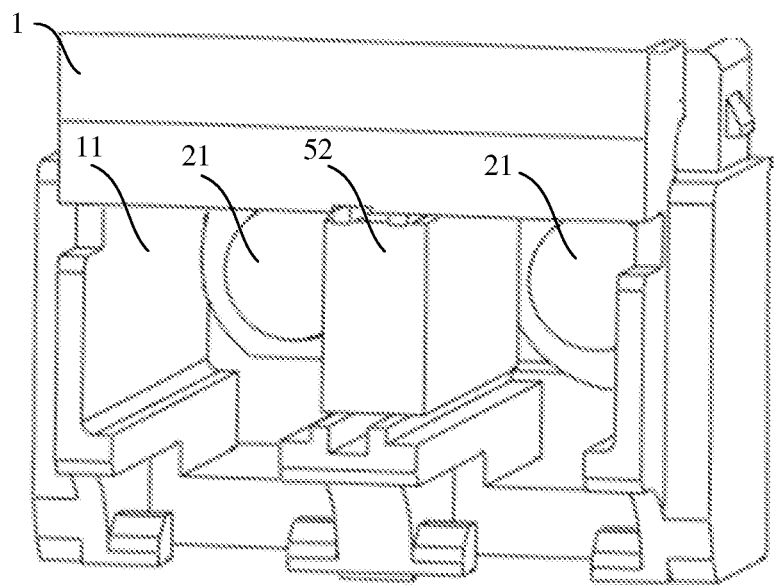
FIG. 21 is a schematic diagram of a structure at a first end of an optical module according to this application.

As described above, the optical module includes the center pillar 5. FIG. 20 is a schematic diagram of the center pillar 5. As shown in FIG. 21, the center pillar 5 is located in the first socket 11, and is used to support the first optical connector 21, and further implement a guiding and limiting function, so that an optical fiber connector of a composite cable is accurately inserted into the first socket 11 and is connected to the first optical connector 21 in the first socket 11, to implement optical signal transmission.

The center pillar 5 is a structure included in an optical module of a standard packaging type. Therefore, for an optical module that does not include the power supply component 3, the center pillar 5 is alternatively mounted in the first socket 11 of the optical module.

As shown in FIG. 20, the center pillar 5 includes a support plate 51 and a guiding and limiting plate 52, and an end part of the guiding and limiting plate 52 in a length direction is connected to a surface of the support plate 51. As shown in FIG. 21, the center pillar 5 is located in the housing 1 and close to a first end, the support plate 51 is close to the inside of the housing 1, and the guiding and limiting plate 52 is close to the outside of the housing 1. In this way, the support plate 51 and a sidewall of the housing 1 enclose the first socket 11, and the guiding and limiting plate 52 divides the first socket 11 into two sub-sockets. For an optical module with dual optical connectors, there are two first optical connectors 21, one first optical connector 21 is located on one side of the guiding and limiting plate 52, and the other first optical connector 21 is located on the other side of the guiding and limiting plate 52. The two first optical connectors 21 are both located on the support plate 51, and the support plate 51 supports the two first optical connectors 21 in the first socket 11.

The support plate 51 is horizontally disposed in the housing 1, and may also be referred to as a beam.

Figure 22:
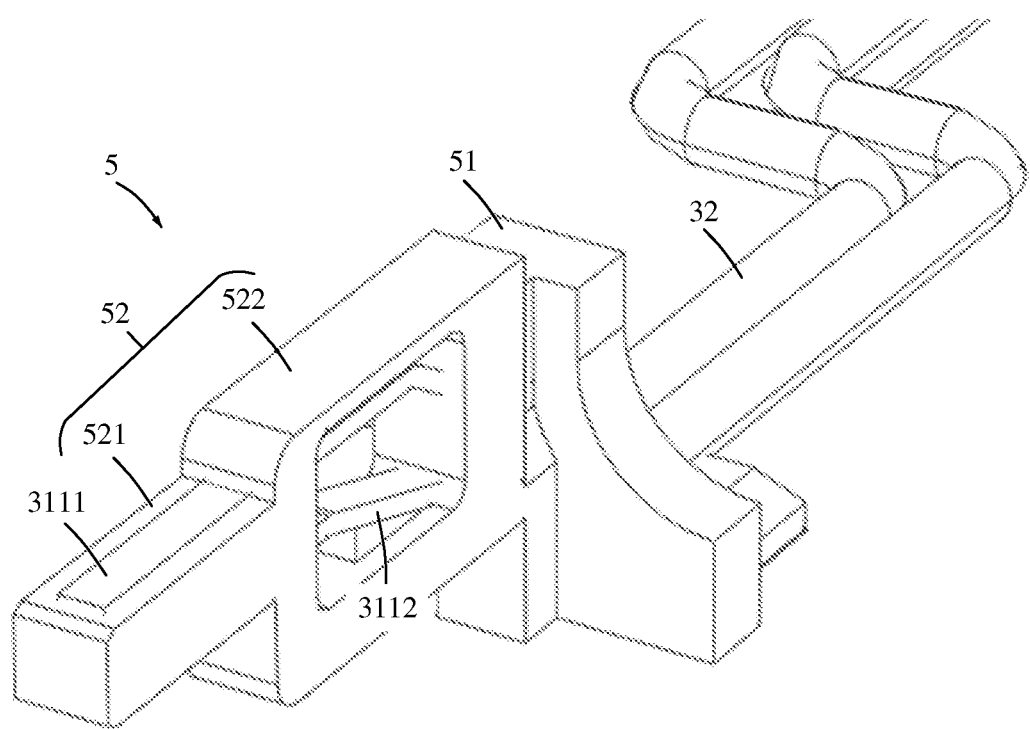
FIG. 22 is a schematic diagram of a structure of a first electrical connector conductive part in a center pillar according to this application.

To implement compatibility of the first socket 11, correspondingly, as shown in FIG. 22, the first electrical connector conductive part 311 of the first electrical connector 31 may be fastened to the center pillar 5, without affecting the first socket 11. For example, a size and a position of the first socket 11 are not affected, so that the first socket 11 is compatible.

For example, one part of the first electrical connector conductive part 311 is fastened to the guiding and limiting plate 52, and the other part of the first electrical connector conductive part 311 is fastened to the support plate 51. A first end of the first electrical connector conductive part 311 may be located on a surface of the guiding and limiting plate 52, or may extend out of an outer end face of the guiding and limiting plate 52. A second end of the first electrical connector conductive part 311 may be located in the support plate 51, or may extend out of the support plate 51. The first end of the first electrical connector conductive part 311 is an end part configured to be electrically connected to a power connector of a composite cable, and the second end of the first electrical connector conductive part 311 is an end part configured to be electrically connected to the power supply line 32.

In an example, the first electrical connector conductive part 311 mounted in the center pillar 5 can meet a requirement that a current passing through is greater than or equal to a target current value, and can meet a specified safety range under a target voltage.

In order to install the first electrical connector conductive part 311 in limited space of the center pillar 5, the target current value may be set based on an actual situation. For example, the target current value may be 2 A, or may be a current value greater than 2 A, which is not limited in this embodiment.

The target voltage may also be set based on an actual situation. For example, the target voltage may be 48 V. Each voltage usually corresponds to a specified safety range. For example, a specified safety range corresponding to 48 V may be 2 millimeters.

Because a value of a current passing through the first electrical connector conductive part 311 is related to a voltage applied to the first electrical connector conductive part 311 and a resistance of the first electrical connector conductive part 311, and the resistance of the first electrical connector conductive part 311 is related to a cross-sectional area of the first electrical connector conductive part, when a power supply voltage (for example, 48 V) is known, the cross-sectional area of the first electrical connector conductive part 311 may be adjusted, so that the first electrical connector conductive part 311 can allow a current with a value greater than or equal to the target current value to pass through.

As described above, the first electrical connector conductive part 311 includes two bent strips, which are respectively a first bent strip 3111 and a second bent strip 3112. A distance between the first bent strip 3111 and the second bent strip 3112 meets the specified safety range under the target voltage. For example, if a voltage provided for the first bent strip 3111 and the second bent strip 3112 is 48 V, a minimum spacing between the first bent strip 3111 and the second bent strip 3112 is greater than or equal to 2 millimeters.

One of the first bent strip 3111 and the second bent strip 3112 is configured to connect to a positive electrode of a power supply, and the other is configured to connect to a negative electrode of the power supply. For example, the first bent strip 3111 is configured to connect to +48 V, and the second bent strip 3112 is configured to connect to −48 V.

Figure 23:
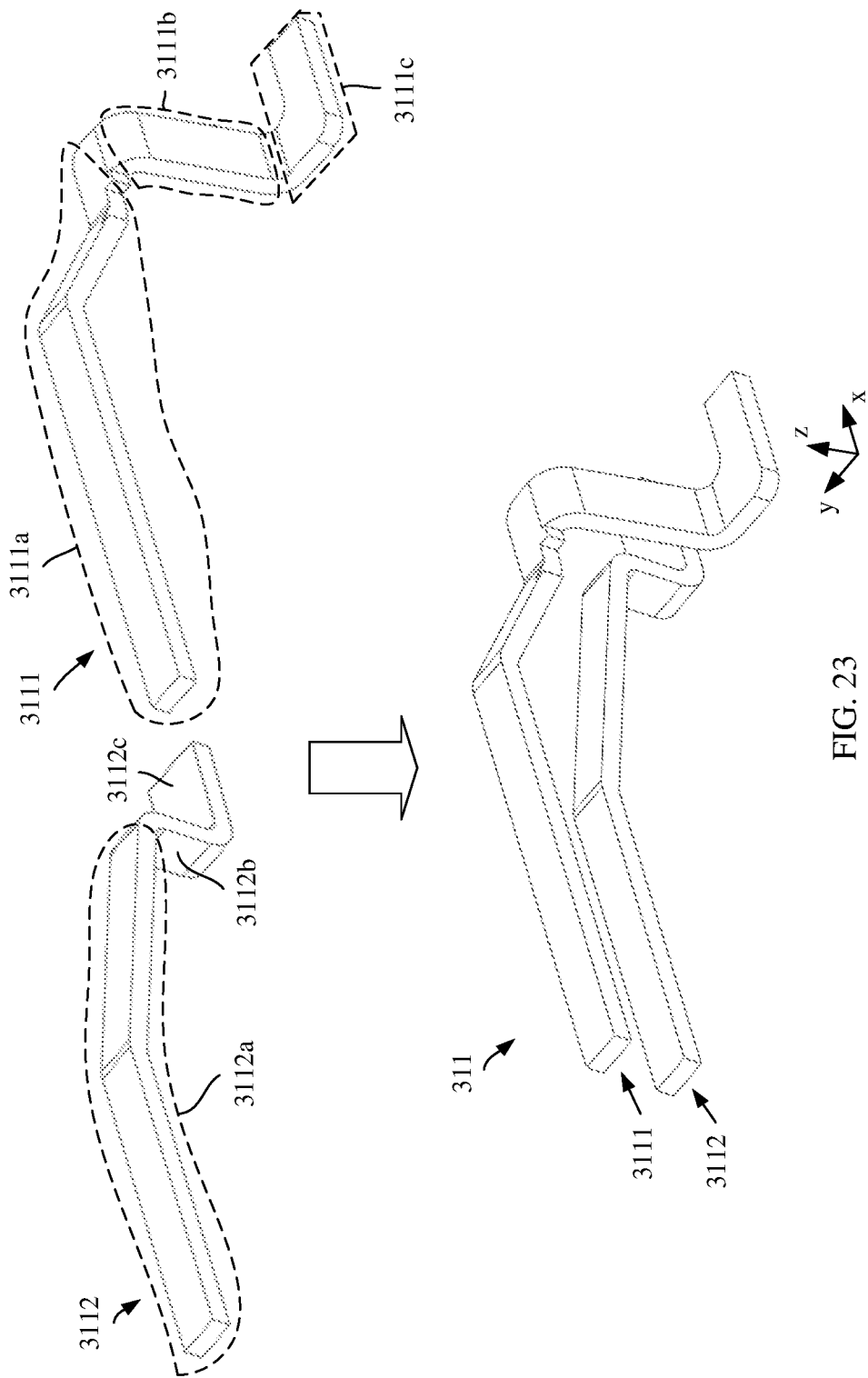
FIG. 23 is a schematic diagram of a structure of a first electrical connector conductive part of an optical module according to this application.

As shown in FIG. 23, a part of the first bent strip 3111 and a part of the second bent strip 3112 may be arranged from top to bottom, and are located in a same vertical plane. A part of the first bent strip 3111 and a part of the second bent strip 3112 may be arranged from left to right, and are located in a same horizontal plane.

For example, as shown in FIG. 23, the first bent strip 3111 includes a first segment 3111a, a second segment 3111b, and a third segment 3111c that are sequentially connected. The second bent strip 3112 includes a fourth segment 3112a, a fifth segment 3112b, and a sixth segment 3112c that are sequentially connected. As shown in FIG. 23, arrangement of the first bent strip 3111 and the second bent strip 3112 in the center pillar 5 may be that the first segment 3111a of the first bent strip 3111 and the fourth segment 3112a of the second bent strip 3112 are arranged from top to bottom, and are located in a same vertical plane, and the third segment 3111c of the first bent strip 3111 and the sixth segment 3112c of the second bent strip 3112 are arranged from left to right, and are located in a same horizontal plane. As shown in FIG. 23, the top-bottom arrangement is top-bottom arrangement in a z-axis direction, and the left-right arrangement is left-right arrangement in a y-axis direction.

The following describes a structural feature of the first bent strip 3111 and a structural feature of the second bent strip 3112.

For the first bent strip 3111, as shown in FIG. 23, one end of the second segment 3111b is connected to a side part of the first segment 3111a, and the other end of the second segment 3111b is connected to a side part of the third segment 3111c. The first segment 3111a and the third segment 3111c are located on different sides of the second segment 3111b, and there is a height difference between the first segment 3111a and the third segment 3111c.

The first segment 3111a, the second segment 3111b, and the third segment 3111c are integrally formed by bending a metal strip (for example, a copper strip).

As shown in FIG. 23, one end of the second segment 3111b is connected to a side part of the first segment 3111a, and a joint of the two is bent once. The bending is to make the first bent strip 3111 extend downward (for example, in a negative direction of a z-axis), so that the height difference is formed between the first segment 3111a and the third segment 3111c. After the bending, the first segment 3111a and the second segment 3111b are not in a same vertical plane, and therefore, the bending may be referred to as a bending for changing a direction.

As shown in FIG. 23, the other end of the second segment 3111b is connected to the side part of the third segment 3111c, and a joint of the two is bent once. The bending is to make the first bent strip 3111 extend toward in a negative direction of a y-axis, so that the first segment 3111a and the third segment 3111c are located on different sides of the second segment 3111b. For example, the first segment 3111a is located on a first surface of the second segment 3111b, and the third segment 3111c is located on a second surface of the second segment 3111b. After the bending, the second segment 3111b and the third segment 3111c are not in a same vertical plane, and therefore, the bending may be referred to as a bending for changing a direction.

It can be learned that the first bent strip 3111 includes at least two bendings for changing a direction.

The first segment 3111a may be a bent structure shown in FIG. 23. Certainly, the first segment 3111a may alternatively be a horizontal structure. This is not limited in this application, provided that the first bent strip 3111 can be mounted in the center pillar 5.

A connection between the first segment 3111a and the second segment 3111b may be a rounded-corner connection, and a connection between the second segment 3111b and the third segment 31n1c may also be a rounded-corner connection.

For the second bent strip 3112, as shown in FIG. 23, a bending of the second bent strip 3112 matches a bending of the first bent strip 3111.

The bending of the second bent strip 3112 is mainly intended to adapt to the bending of the first bent strip 3111, so as to widen a spacing between the two. In this way, a minimum spacing between the two meets a specified safety range (which may also be referred to as a safety regulation for short).

For example, one end of the fifth segment 3112b is connected to one end of the fourth segment 3112a, and the other end of the fifth segment 3112b is connected to an end part of the sixth segment 3112c. The fourth segment 3112a and the sixth segment 3112c are located on different sides of the fifth segment 3112b, and there is a height difference between the fourth segment 3112a and the sixth segment 3112c.

The fourth segment 3112a, the fifth segment 3112b, and the sixth segment 3112c are integrally formed by bending a metal strip (for example, a copper strip).

One end of the fifth segment 3112b is an end in a length direction of the fifth segment 3112b. Similarly, one end of the fourth segment 3112a is also an end in a length direction of the fourth segment 3112a.

As shown in FIG. 23, there is the height difference between the fourth segment 3112a and the sixth segment 3112c, one end of the fifth segment 3112b is connected to one end of the fourth segment 3112a, and the other end of the fifth segment 3112b is connected to an end part of the sixth segment 3112c. In this case, although a joint between the fourth segment 3112a and the fifth segment 3112b is bent, the fourth segment 3112a and the fifth segment 3112b are located in a same vertical plane. Therefore, the bending is a bending for not changing a direction. Similarly, although a joint between the fifth segment 3112b and the sixth segment 3112c is bent, the fifth segment 3112b and the sixth segment 3112c are located in a same vertical plane. Therefore, the bending is a bending for not changing a direction. It can be learned that the fourth segment 3112a, the fifth segment 3112b, and the sixth segment 3112c of the second bent strip 3112 are all located in a same vertical plane.

In an example, the first segment 3111a of the first bent strip 3111 and the fourth segment 3112a of the second bent strip 3112 are configured to electrically connect to a power connector of a composite cable. The third segment 3111c of the first bent strip 3111 and the sixth segment 3112c of the second bent strip 3112 are configured to electrically connect to the power supply line 32.

Both the third segment 3111c of the first bent strip 3111 and the sixth segment 3112C of the second bent strip 3112 are connection parts that are of the first electrical connector conductive part 311 and that are close to the power supply line 32.

The third segment 3111c of the first bent strip 3111 and the sixth segment 3112c of the second bent strip 3112 both are matched with the power supply line 32 in shape.

For example, if the power supply line 32 is a flexible circuit board, both the third segment 3111c of the first bent strip 3111 and the sixth segment 3112c of the second bent strip 3112 may have a sheet-shaped structure shown in FIG. 23, and both the third segment 3111c and the sixth segment 3112c are welded on a surface of the flexible circuit board.

For another example, if the power supply line 32 is a cable, both the third segment 3111c of the first bent strip 3111 and the sixth segment 3112C of the second bent strip 3112 may have a circular-ring-shaped structure, so that an end part of the power supply line 32 is fastened in the circular-ring-shaped structure.

The foregoing describes structural features of the first bent strip 3111 and the second bent strip 3112 of the first electrical connector conductive part 311. The following describes a mounting relationship of the first electrical connector conductive part 311 in the center pillar 5.

The mounting relationship of the first electrical connector conductive part 311 in the center pillar 5 may be as follows. As described above, the center pillar 5 includes the support plate 51 and the guiding and limiting plate 52. As shown in FIG. 22, a part of the first electrical connector conductive part 311 is fastened in the guiding and limiting plate 52, and a part of the first electrical connector conductive part 311 is fastened in the support plate 51. The first electrical connector conductive part 311 is exposed from the guiding and limiting plate 52, so as to be connected to the power connector of the composite cable. The first electrical connector conductive part 311 is exposed from the support plate 51, so as to be connected to the power supply line 32. For example, both the first segment 3111a of the first bent strip 3111 and the fourth segment 3112a of the second bent strip 3112 are exposed from the guiding and limiting plate 52, and both the third segment 3111c of the first bent strip 3111 and the sixth segment 3112C of the second bent strip 3112 are exposed from the support plate 51.

There are a plurality of manners in which both the first segment 3111a of the first bent strip 3111 and the fourth segment 3112a of the second bent strip 3112 are exposed from the guiding and limiting plate 52.

For example, one manner may be as follows. As shown in FIG. 22, the guiding and limiting plate 52 includes a first plate body 521 and a second plate body 522, a height of the first plate body 521 is less than a height of the second plate body 522, the first plate body 521 is located at an end of the second plate body 522, and an end part that is of the second plate body 522 and that is away from the first plate body 521 is located on a surface of the support plate 51. One part of the first segment 3111a of the first bent strip 3111 is located on an upper surface of the first plate body 521, and the other part is located in the second plate body 522. One part of the fourth segment 3112a of the second bent strip 3112 is located on a lower surface of the first plate body 521, and the other part is located in the second plate body 522.

The first plate body 521 is configured to match a socket of a power connector of a composite cable. Therefore, the first plate body 521 may also be referred to as a first electrical connector connection part, and may be made of an insulation material such as a plastic part. The second plate body 522 is mainly configured to fasten the first electrical connector conductive part 311. Therefore, the second plate body 522 may be referred to as a first electrical connector mounting part, and may be made of an insulation material such as a plastic part.

In an example, the first plate body 521 and the second plate body 522 are connected in a plurality of manners. For example, the first plate body 521 and the second plate body 522 may be connected through adhesive or a screw. For another example, an end part of the first plate body 521 and an end part of the second plate body 522 are fixedly connected through adhesive or a screw. For another example, the first plate body 521 and the second plate body 522 are integrally formed. As shown in FIG. 22, the first plate body 521 and the second plate body 522 are two parts of a plate body, and a height of the first plate body 521 is less than a height of the second plate body 522. This is because a top and a bottom of the second plate body 522 are respectively used to fixedly connect to a top and a bottom of the first socket 11, and a height of the second plate body 522 adapts to a height of the first socket 11. The first plate body 521 is configured to insert the power connector of the composite cable, and a height of the first plate body 521 adapts to the power connector of the composite cable. Therefore, the height of the first plate body 521 may not be equal to the height of the second plate body 522. Heights of the first plate body 521 and the second plate body 522 are not limited in this embodiment, and a person skilled in the art may flexibly select the heights based on an actual situation. For example, as shown in FIG. 22, one of two first horizontal parts 3111 is located on an upper surface of the first plate body 521, and the other is located on a lower surface of the first plate body 521. For another example, one of two first horizontal parts 3111 is located on one side surface of the first plate body 521, and the other is located on the other side surface of the first plate body 521. For another example, two first horizontal parts 3111 are located side by side on a same surface of the first plate body 521. How the two first horizontal parts 3111 are arranged on the surface of the first plate body 521 is not limited in this embodiment, and may be flexibly selected based on an actual situation.

In this way, when the composite cable is inserted into the first socket 11, the first plate body 521 may enter a socket of the power connector of the composite cable, so that the first segment 3111a of the first bent strip 3111 on the upper surface of the first plate body 521 and the fourth segment 3112a of the second bent strip 3112 on the lower surface of the first plate body 521 are electrically connected to a conductive part in the socket of the power connector. However, when an optical cable inserted into the first socket 11 does not include a power connector, because an outer end part of the first plate body 521 is actually an outer end part of the center pillar 5, insertion of the optical cable into the first socket 11 is not affected. Further, although the first electrical connector conductive part 311 is mounted in the center pillar 5, insertion of the optical cable into the first socket 11 is not affected, so that the first socket 11 is compatible.

Figure 24:
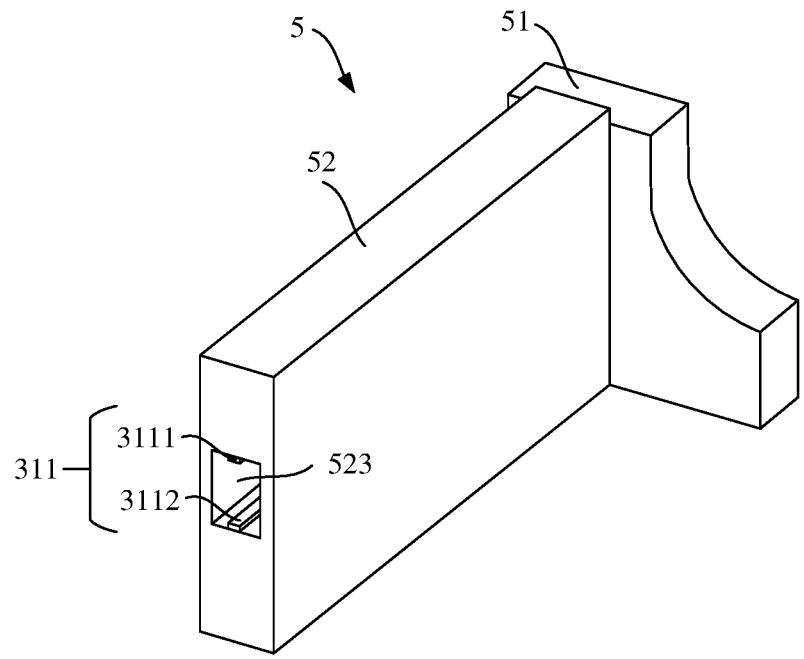
FIG. 24 is a schematic diagram of a structure of a first electrical connector conductive part in a center pillar according to this application.

For another example, in another manner in which both the first segment 3111a of the first bent strip 3111 and the fourth segment 3112a of the second bent strip 3112 are exposed from the guiding and limiting plate 52, as shown in FIG. 24, an end part that is of the guiding and limiting plate 52 and that is away from the support plate 51 has a groove 523. The first segment 3111*a* of the first bent strip 3111 is located on an upper groove wall of the groove 523, and the fourth segment 3112*a* of the second bent strip 3112 is located on a lower groove wall of the groove 523.

The groove 523 may also be referred to as a hollow structure. The groove 523 may be a column-shaped through hole shown in FIG. 24, or may be a cylindrical through hole, or may be a cross through hole, or the like. A specific structure of the groove 523 is not limited in this embodiment.

In this way, a plug of the power connector of the composite cable inserted into the first socket 11 may enter the groove 523, so that both the first bent strip 3111 on the upper groove wall of the groove 523 and the second bent strip 3112 on the lower groove wall of the groove 523 are electrically connected to a conductive part on a plug surface of the power connector of the composite cable. However, an optical cable inserted into the first socket 11 does not include a power connector. Because an end part at an opening of the groove 523 is actually an outer end part of the center pillar 5, insertion of the optical cable into the first socket 11 is not affected. Further, although the first bent strip 3111 and the second bent strip 3112 of the first electrical connector conductive part 311 are mounted in the center pillar 5, insertion of the optical cable into the first socket 11 is not affected, so that the first socket 11 is compatible.

Figure 25:
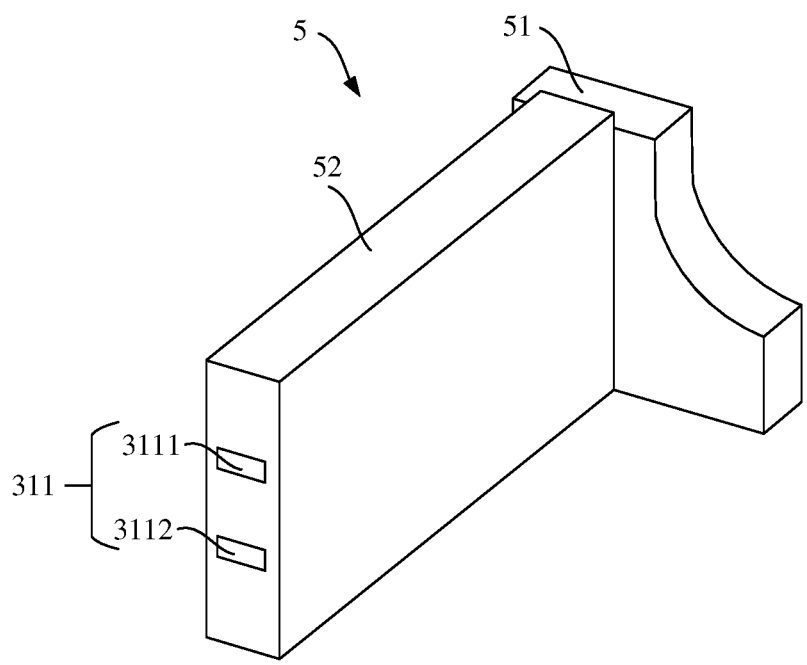
FIG. 25 is a schematic diagram of a structure of a first electrical connector conductive part in a center pillar according to this application.

For another example, as shown in FIG. 25, another manner in which both the first segment 3111*a* of the first bent strip 3111 and the fourth segment 3112*a* of the second bent strip 3112 are exposed from the guiding and limiting plate 52 may be that end parts of both the first segment 3111*a* of the first bent strip 3111 and the fourth segment 3112*a* of the second bent strip 3112 form contacts on an outer end face of the guiding and limiting plate 52.

Figure 26:
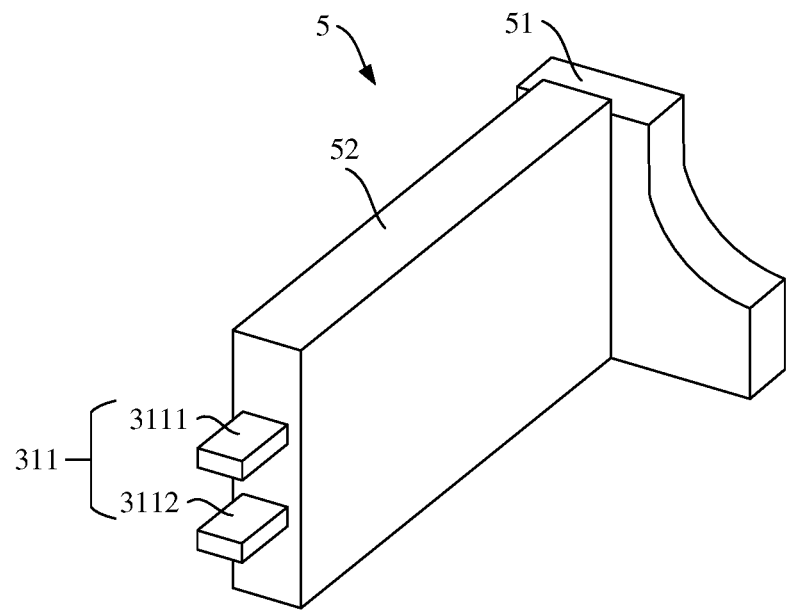
FIG. 26 is a schematic diagram of a structure of a first electrical connector conductive part in a center pillar according to this application.

For another example, another manner in which both the first segment 3111*a* of the first bent strip 3111 and the fourth segment 3112*a* of the second bent strip 3112 are exposed from the guiding and limiting plate 52 may be, as shown in FIG. 26, that end parts of both the first segment 3111*a* of the first bent strip 3111 and the fourth segment 3112*a* of the second bent strip 3112 extend out from an outer end face of the guiding and limiting plate 52. In this solution, to implement compatibility of the first socket 11, a sum of a length of a part that is of the first segment 3111*a* of the first bent strip 3111 and that extends out of the outer end face of the guiding and limiting plate 52 and a length of the center pillar 5 is less than or equal to a standard length of the center pillar 5. Similarly, a sum of a length of a part that is of the fourth segment 3112*a* of the second bent strip 3112 and that extends out of the outer end face of the guiding and limiting plate 52 and a length of the center pillar 5 is less than or equal to the standard length of the center pillar 5. The standard length of the center pillar 5 is a length of the center pillar 5 obtained when the optical module is packaged based on a standard packaging type.

Figure 27:
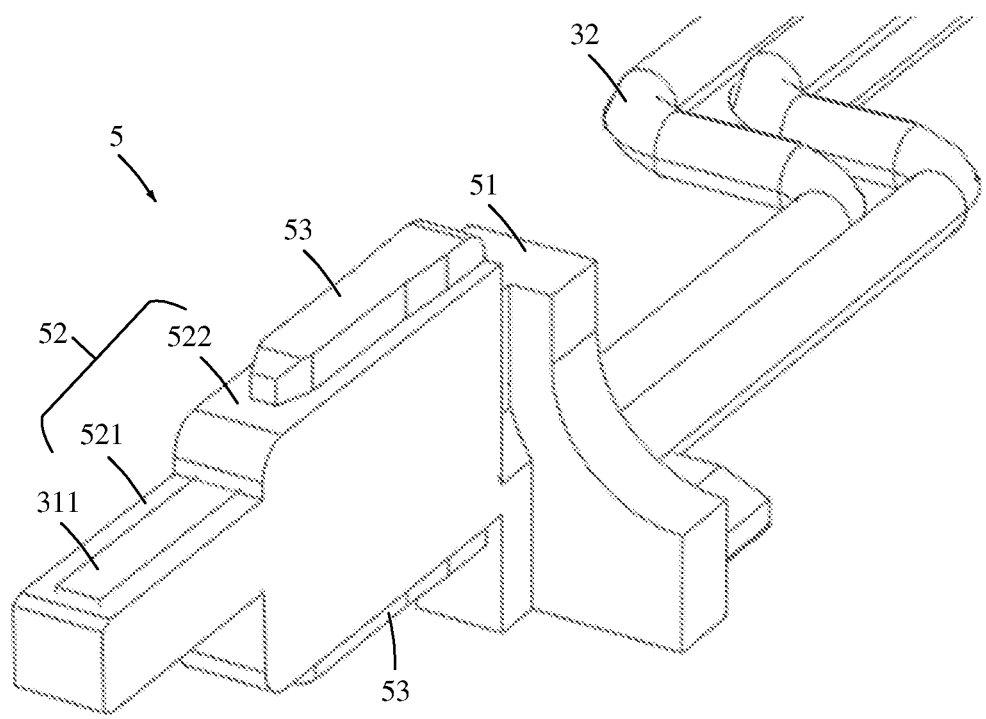
FIG. 27 is a schematic diagram of a structure of a center pillar according to this application.
Figure 28:
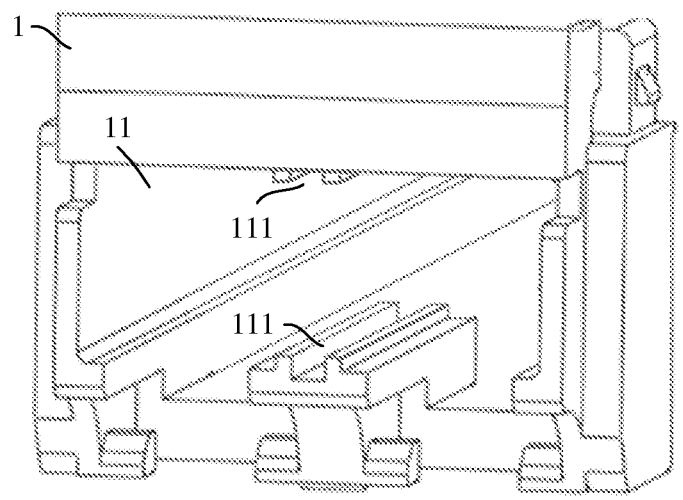
FIG. 28 is a schematic diagram of a structure of a first socket of an optical module according to this application.

To assemble the center pillar 5 in which the first electrical connector conductive part 311 is fastened into the housing 1, correspondingly, as shown in FIG. 27, a strip-shaped guide block 53 is disposed at an end part of the center pillar 5 in a height direction. As shown in FIG. 28, an inner wall of the first socket 11 has a strip-shaped guide groove 11. The strip-shaped guide block 53 matches the strip-shaped guide groove 11, and the strip-shaped guide block 53 is located in the strip-shaped guide groove 111.

For example, as shown in FIG. 27, both a top and a bottom opposite to each other of the guiding and limiting plate 52 of the center pillar 5 have strip-shaped guide blocks 53. As shown in FIG. 28, both a top wall and a bottom wall opposite to each other of the first socket 11 have strip-shaped guide grooves 111. As shown in FIG. 1, the strip-shaped guide block 53 on the top of the guiding and limiting plate 52 is located in the strip-shaped guide groove 111 on the top wall of the housing 1, and the strip-shaped guide block 53 on the bottom of the guiding and limiting plate 52 is located in the strip-shaped guide groove 111 on the bottom wall of the housing 1.

As shown in FIG. 27, the strip-shaped guide block 53 may be of a strip-shaped protrusion structure. Correspondingly, as shown in FIG. 28, the strip-shaped guide groove 111 may be of a strip-shaped groove structure. The strip-shaped guide block 53 adapts to the strip-shaped guide groove 11. For example, a size of the strip-shaped guide block 53 matches a size of the strip-shaped guide groove 11, and a position of the strip-shaped guide block 53 corresponds to a position of the strip-shaped guide groove 11.

In this way, the center pillar 5 in which the first electrical connector conductive part 311 is fastened is mounted in the housing 1. The strip-shaped guide block 53 of the guiding and limiting plate 52 slides in the corresponding strip-shaped guide groove 111 until the strip-shaped guide block 53 is limited in the strip-shaped guide groove 111 and cannot continue to slide. When the strip-shaped guide block 53 stops sliding in the strip-shaped guide groove 11, the center pillar 5 in which the first electrical connector conductive part 311 is fastened is mounted in the housing 1.

Figure 29:
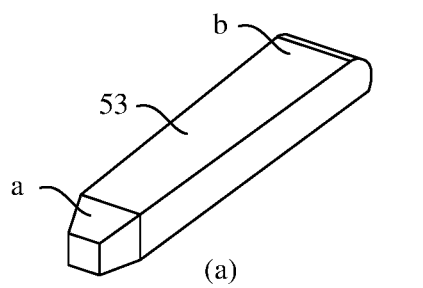
FIG. 29 is a schematic diagram of structures of a strip-shaped guide block and a strip-shaped guide groove according to this application.
Figure 29:
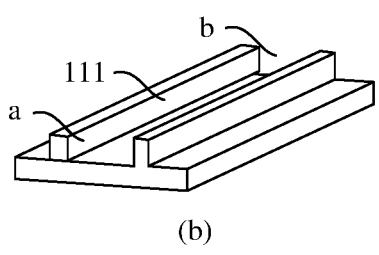

In an example, to enable the strip-shaped guide block 53 to slide in the strip-shaped guide groove 11, correspondingly, as shown in (a) in FIG. 29, a width of the strip-shaped guide block 53 is gradually increased from a first end a to a second end b, the first end a of the strip-shaped guide block 53 is an end part facing the outside of the housing 1, and the second end b of the strip-shaped guide block 53 is an end part facing the inside of the housing 1.

For example, a groove width of the strip-shaped guide groove 11 adapts to the width of the strip-shaped guide block 53. For example, in a case, as shown in (b) in FIG. 29, the groove width of the strip-shaped guide groove 11 is gradually increased from a first end a to a second end b, the first end a of the strip-shaped guide groove 11 is an end part facing the outside of the housing 1, and the second end b of the strip-shaped guide groove 11 is an end part facing the inside of the housing 1. For another example, in another case, a groove width of the strip-shaped guide groove 11 may be greater than a minimum width of the strip-shaped guide block 53, and is less than a maximum width of the strip-shaped guide block 53. In other words, the groove width of the strip-shaped guide groove 111 is greater than a width of the first end a of the strip-shaped guide block 53, and is less than a width of the second end b of the strip-shaped guide block 53. In this way, in a process in which the strip-shaped guide block 53 slides in the strip-shaped guide groove 11, the strip-shaped guide block 53 does not slide out of the strip-shaped guide groove 11, and the strip-shaped guide block 53 can be limited in the strip-shaped guide groove 111. Therefore, the center pillar 5 can be stably mounted in the housing 1.

The foregoing is description about the first electrical connector conductive part 311 that includes a bent strip. The first electrical connector conductive part 311 may alternatively be a spring pin or a conductive pillar. For details, refer to the following description.

Figure 30:
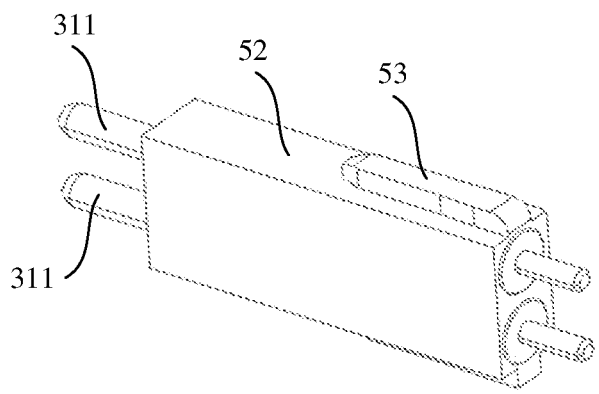
FIG. 30 is a schematic diagram of a structure of a first electrical connector conductive part in a center pillar according to this application.

As shown in FIG. 30, the first electrical connector conductive part 311 may be a spring pin, or may be referred to as a pogopin, and the first electrical connector conductive part 311 may alternatively be a conductive pillar. This embodiment does not limit a specific structure of the first electrical connector conductive part 311. The following uses an example in which the first electrical connector conductive part 311 is a spring pin and the first electrical connector conductive part 311 is a conductive pillar for description.

As shown in FIG. 30, the first electrical connector conductive part 311 is a spring pin, and the spring pin mainly includes a pin shaft, a tube, and an internal spring. The pin shaft can slide in the tube in an extending/retracting manner under an action of the spring.

The spring pin is fastened to the center pillar 5. For example, a part of the spring pin is fastened to the guiding and limiting plate 52 of the center pillar 5, and the other part is fastened to the support plate 51. As shown in FIG. 30, a pin shaft of the spring pin extends out of an outer end face of the guiding and limiting plate 52, so as to be electrically connected to a power connector of a composite cable inserted into the first socket 11. An end part that is of the spring pin and that is away from the pin shaft extends out of the guiding and limiting plate 52, so as to facilitate an electrical connection with the power supply line 32.

A position relationship between an end part of the pin shaft of the spring pin and an outer end face of the center pillar 5 is related to a length of the center pillar 5. When an optical module is packaged based on a standard packaging type, the length of the center pillar 5 is a standard length. In a standard length of the center pillar 5, when an optical fiber connector of an optical cable is inserted into the first socket 11, the center pillar 5 does not block a connection between the optical fiber connector of the optical cable and the first optical connector 21, so that the first socket 11 is compatible. If the length of the center pillar 5 is less than the standard length, when the optical fiber connector of the optical cable is inserted into the first socket 11, the center pillar 5 does not block the connection between the optical fiber connector of the optical cable and the first optical connector 21. However, if the length of the center pillar 5 is greater than the standard length, when the optical fiber connector of the optical cable is inserted into the first socket 11, the center pillar 5 blocks the connection between the optical fiber connector of the optical cable and the first optical connector 21. Specifically, the optical fiber connector of the optical cable cannot be connected to the first optical connector 21 in the first socket 11.

Based on a principle that the length of the center pillar 5 and the first socket 11 are compatible, a position relationship between the end part of the pin shaft of the spring pin and the outer end face of the center pillar 5 is as follows.

The length of the center pillar 5 is the standard length.

For the tube of the spring pin, because the length of the center pillar 5 is the standard length and the tube is neither extendable nor retractable, the tube of the spring pin is located in the center pillar 5. For example, an end part of the tube of the spring pin is flush with an outer end face of the guiding and limiting plate 52 of the center pillar 5. For another example, the tube of the spring pin is totally located in the guiding and limiting plate 52 of the center pillar 5.

For the pin shaft of the spring pin, because the pin shaft is extendable or retractable, it is only required that when a composite cable is inserted into the first socket 11, an end part of the pin shaft of the spring pin is flush with the outer end face of the guiding and limiting plate 52 of the center pillar 5. However, when no composite cable is inserted into the first socket 11, the pin shaft of the spring pin may protrude from the outer end face of the guiding and limiting plate 52 of the center pillar 5, or may be flush with the outer end face of the guiding and limiting plate 52 of the center pillar 5. When a connector of the composite cable is inserted into the first socket 11, a conductive part of a power connector of the composite cable can be closely joined with the pin shaft of the spring pin to ensure good conductivity. Correspondingly, when the connector of the composite cable is not inserted into the first socket 11, the pin shaft of the spring pin may protrude from the outer end face of the guiding and limiting plate 52 of the center pillar 5; or when the composite cable is inserted into the first socket 11, an end part of the pin shaft of the spring pin is flush with the outer end face of the guiding and limiting plate 52 of the center pillar 5.

The length of the center pillar 5 is less than the standard length.

For the tube of the spring pin, because the length of the center pillar 5 is less than the standard length, the tube of the spring pin is completely located in the guiding and limiting plate 52 of the center pillar 5. Alternatively, an end part of the tube of the spring pin may be flush with the outer end face of the guiding and limiting plate 52 of the center pillar 5, or an end part of the tube of the spring pin may slightly protrude from the outer end face of the guiding and limiting plate 52 of the center pillar 5. However, in a case in which the end part of the tube of the spring pin slightly protrudes from the outer end face of the guiding and limiting plate 52 of the center pillar 5, a sum of a length of a protruded part of the tube and a length of the center pillar 5 is less than or equal to the standard length, to avoid blocking the connection between the optical fiber connector of the optical cable and the first optical connector.

For the pin shaft of the spring pin, when no composite cable is inserted into the first socket 11, an end part of the pin shaft of the spring pin protrudes from the outer end face of the center pillar 5, and a sum of a length of the protruded part of the pin shaft and a length of the center pillar 5 is greater than the standard length. When the composite cable is inserted into the first socket 11, an end part of the pin shaft of the spring pin protrudes from the outer end face of the center pillar 5, and a sum of a length of the protruded part of the pin shaft and a length of the center pillar 5 is less than or equal to the standard length. In this way, when the composite cable is inserted into the first socket 11, the pin shaft does not block the connection between the optical fiber connector of the optical cable and the first optical connector, but can implement close contact between the power connector of the composite cable and the pin shaft, to ensure good conductivity. Certainly, alternatively, when no composite cable is inserted into the first socket 11, an end part of the pin shaft of the spring pin protrudes from the outer end face of the center pillar 5, and a sum of a length of the protruded part of the pin shaft and a length of the center pillar 5 is less than or equal to the standard length. When the composite cable is inserted into the first socket 11, an end part of the pin shaft of the spring pin protrudes from the outer end face of the center pillar 5, and a sum of a length of the protruded part of the pin shaft and a length of the center pillar 5 is also less than or equal to the standard length.

The foregoing is a case in which the first electrical connector conductive part 311 is specifically a spring pin, and a specific structure of the first electrical connector conductive part 311 may alternatively be a conductive pillar.

The conductive pillar may be a cylindrical structure, or may be a square column structure, or may be a column structure of another shape, which is not limited in this embodiment.

Based on a principle that the length of the center pillar 5 and the first socket 11 are compatible, a position relationship between the end part of the conductive pillar and the outer end face of the center pillar 5 is as follows.

The length of the center pillar 5 is the standard length.

Figure 31:
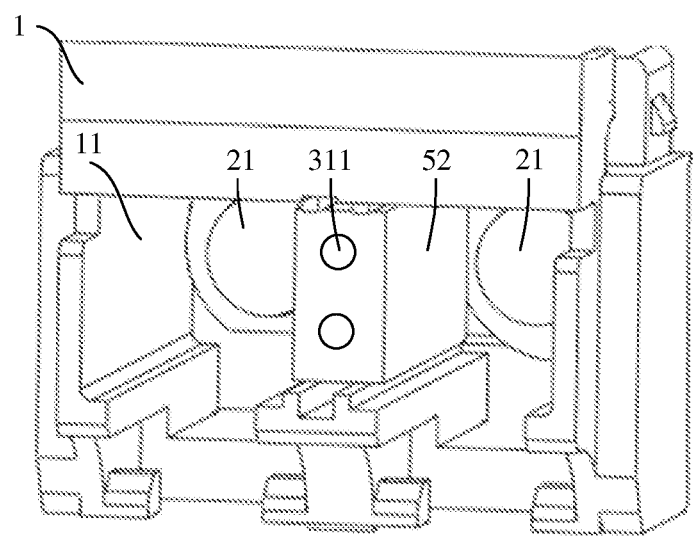
FIG. 31 is a schematic diagram of a structure of a first electrical connector conductive part in a center pillar according to this application.

As shown in FIG. 31, the end part of the conductive pillar is flush with the outer end face of the center pillar 5. For example, the end part of the conductive pillar is flush with the outer end face of the guiding and limiting plate 52 of the center pillar 5. In this way, a conductive contact is formed on the outer end face of the guiding and limiting plate 52. In this way, when the composite cable is inserted into the first socket 11, the conductive part of the power connector of the composite cable is in contact with the contact on the outer end face of the guiding and limiting plate 52. An optical cable that does not include a power connector is inserted into the first socket 11. Because the length of the center pillar 5 is the standard length, the first electrical connector conductive part 311 that is the conductive pillar is located in the center pillar 5, and the end part of the conductive pillar is flush with the outer end face of the center pillar 5, the first electrical connector conductive part 311 that is the conductive pillar does not affect a position of the center pillar 5 and occupied space in the housing 1. In this case, the optical cable that does not include the power connector can still be inserted into the first socket 11 of the optical module, and is connected to the first optical connector 21 in the first socket 11.

The length of the center pillar 5 is less than the standard length.

In an example, the end part of the conductive pillar protrudes from the outer end face of the center pillar 5, and a sum of a length of a protruded part of the conductive pillar and a length of the center pillar 5 is less than or equal to the standard length. In this way, when a composite cable is inserted into the first socket 11, a conductive part of a power connector of the composite cable is in contact with the end part of the conductive pillar. However, if an optical cable that does not include a power connector is inserted into the first socket 11, because a sum of a length of the protruded part of the conductive pillar and a length of the center pillar 5 is less than or equal to the standard length, the part of the conductive part protruding from the center pillar 5 does not block a connection between the optical fiber connector of the optical cable and the first optical connector. In this case, the optical cable that does not include the power connector can still be inserted into the first socket 11 of the optical module, and is connected to the first optical connector 21 in the first socket 11.

The foregoing describes specific structures of the first electrical connector conductive part 311 of the first electrical connector 31 that are respectively a spring pin and a conductive pillar. This embodiment does not limit the specific structure of the first electrical connector conductive part 311. After the first electrical connector conductive part 311 is fastened in the center pillar 5 of the optical module, the optical cable that does not include the power connector can still be inserted into the first socket 11, so that the first socket 11 is compatible.

Figure 32:
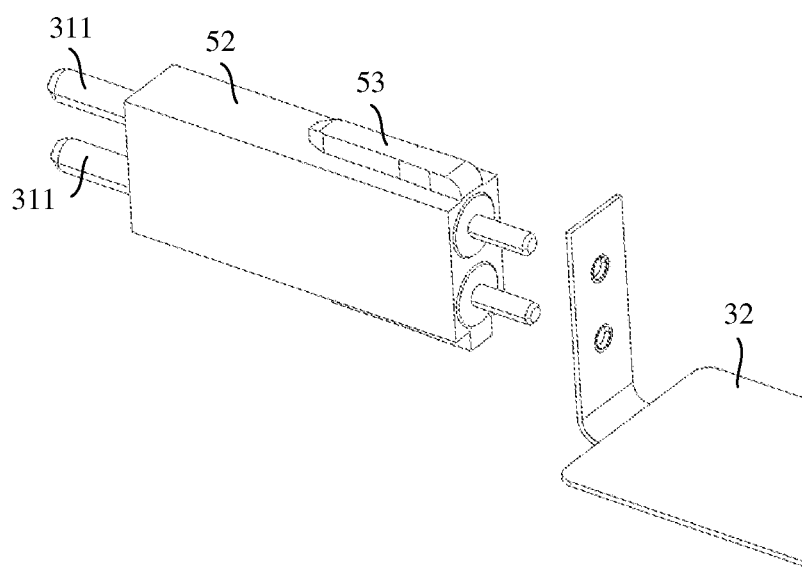
FIG. 32 is a schematic diagram of a structure of a connection between a first electrical connector conductive part and a power supply line according to this application.

As described above, an end part that is of the first electrical connector conductive part 311 of the first electrical connector 31 and that is located in the housing 1 is electrically connected to the power supply line 32. In order to implement the electrical connection between the first electrical connector conductive part 311 and the power supply line 32, correspondingly, the end part that is of the first electrical connector conductive part 311 and that is located in the housing 1 may extend out of the center pillar 5, so as to be electrically connected to the power supply line 32. For example, as shown in FIG. 32, in a solution in which the first electrical connector conductive part 311 is a spring pin and the power supply line 32 is a flexible circuit board, a pin that is of the spring pin and that is away from a pin shaft extends out of the center pillar 5 and passes through a pad of the flexible circuit board, and the pin that is of the spring pin and that is away from the pin shaft is welded on the flexible circuit board, so as to implement an electrical connection between the spring pin and the flexible circuit board. For another example, in a solution in which the first electrical connector conductive part 311 is a spring pin and the power supply line 32 is a cable, the cable may be wound around a pin that is of the spring pin and that is away from a pin shaft, to implement an electrical connection between the spring pin and the cable.

To assemble the center pillar 5 in which the first electrical connector conductive part 311 is fastened into the housing 1, correspondingly, a strip-shaped guide block 53 is disposed at an end part of the center pillar 5 in a height direction. An inner wall of the first socket 11 has a strip-shaped guide groove 11. The strip-shaped guide block 53 matches the strip-shaped guide groove 11, and the strip-shaped guide block 53 is located in the strip-shaped guide groove 11. For specific structures of the strip-shaped guide block 53 and the strip-shaped guide groove 111, refer to the foregoing description. Details are not described herein again.

The Power Supply Line 32 of the Power Supply Component 3

Figure 33:
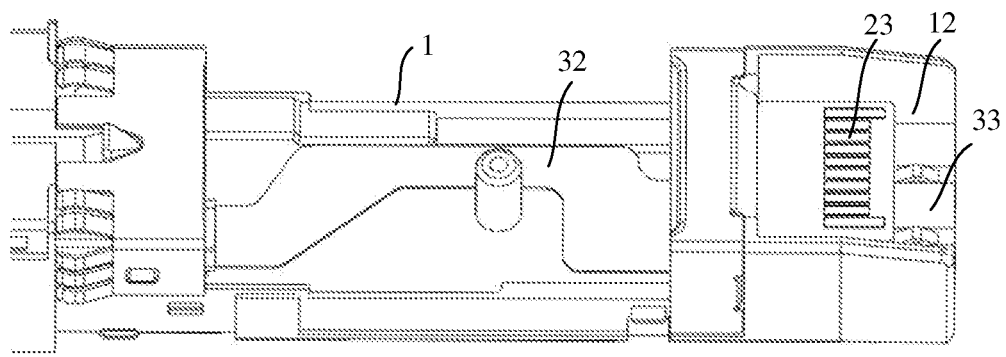
FIG. 33 is a schematic diagram of a structure in which a power supply line of an optical module is a flexible circuit board according to this application.

In an example, as shown in FIG. 33, the power supply line 32 may be a flexible circuit board (that is, a flexible printed circuit board). One end of the flexible circuit board is electrically connected to the first electrical connector conductive part 311 of the first electrical connector 31, and the other end of the flexible circuit board is electrically connected to the second electrical connector conductive part 331 of the second electrical connector 33.

Figure 34:
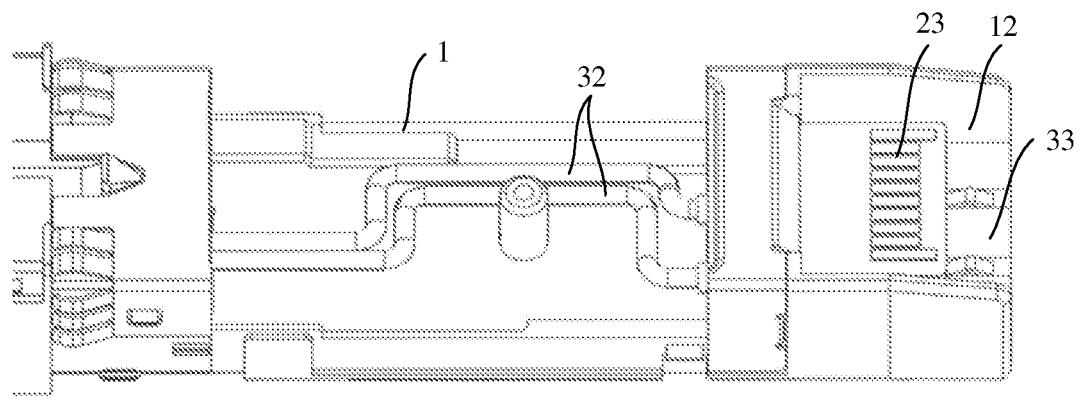
FIG. 34 is a schematic diagram of a structure in which a power supply line of an optical module is a cable according to this application.

In another example, as shown in FIG. 34, the power supply line 32 may be a cable (that is, a cable in which a copper wire is wrapped), one end of the cable is electrically connected to the first electrical connector conductive part 311 of the first electrical connector 31, and the other end of the cable is electrically connected to the second electrical connector conductive part 331 of the second electrical connector 33.

In another example, the power supply line 32 may be a second rigid circuit board. One end of the second rigid circuit board is electrically connected to the first electrical connector conductive part 311 of the first electrical connector 31, and the other end of the second rigid circuit board is electrically connected to the second electrical connector conductive part 331 of the second electrical connector 33.

In another example, in a solution in which the power supply line 32 is a second rigid circuit board, the second electrical connector conductive part 331 of the second electrical connector 33 may be located on a surface of the second rigid circuit board. For example, the power supply line 32 may be a second rigid circuit board, one end of the second rigid circuit board is electrically connected to the first electrical connector conductive part 311 of the first electrical connector 31, the other end of the second rigid circuit board extends into the second socket 12, and a surface of a part that is of the second rigid circuit board and that is located in the second socket 12 may have an edge connector, and the edge connector forms the second electrical connector conductive part 331 of the second electrical connector 33.

Figure 35:
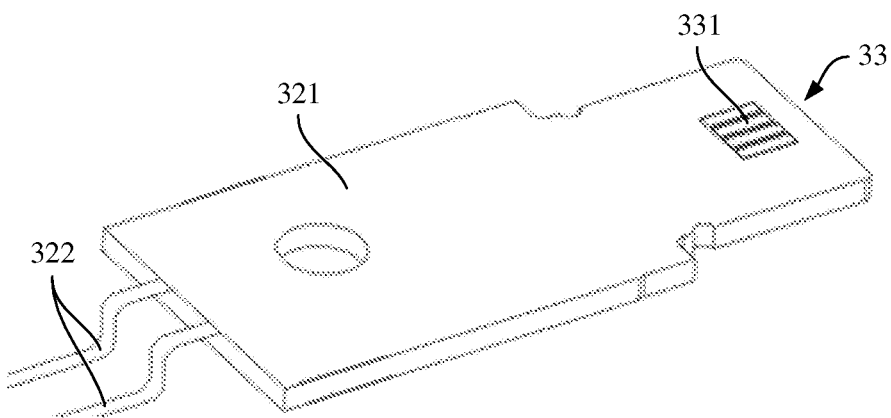
FIG. 35 is a schematic diagram of a structure in which a power supply line includes a cable and a second rigid circuit board according to this application.

In some other examples, as shown in FIG. 35, the power supply line 32 may include a second rigid circuit board 321 and a cable 322. One end of the second rigid circuit board 321 is electrically connected to the cable 322, and the other end of the second rigid circuit board 321 is electrically connected to the second electrical connector conductive part 331 of the second electrical connector 33. Alternatively, the second electrical connector conductive part 331 of the second electrical connector 33 is integrated on a surface of the second rigid circuit board 321. For example, one end of the second rigid circuit board 321 is electrically connected to the cable 322, the other end of the second rigid circuit board 321 extends into the second socket 12, and a surface that is of a part of the second rigid circuit board 321 and that is located in the second socket 12 may have an edge connector. The edge connector forms the second electrical connector conductive part 331 of the second electrical connector 33. An end part that is of the cable 322 and that is away from the second rigid circuit board 321 is electrically connected to the first electrical connector conductive part 311 of the first electrical connector 31.

Figure 36:
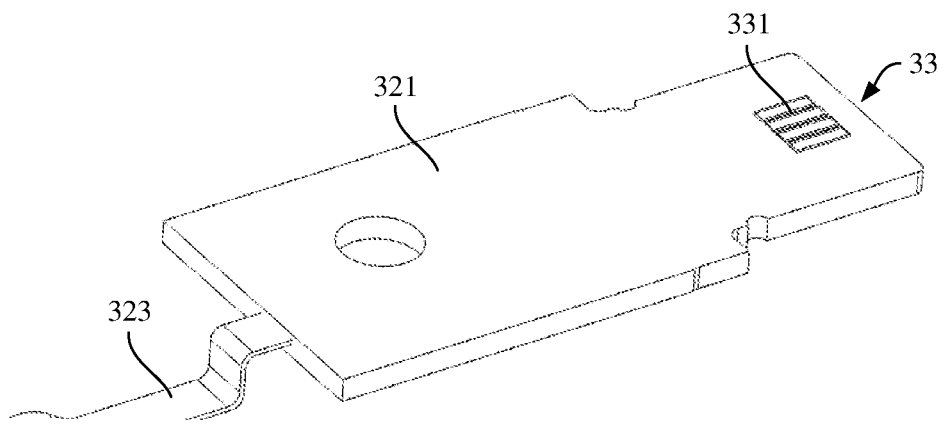
FIG. 36 is a schematic diagram of a structure in which a power supply line includes a flexible circuit board and a second rigid circuit board according to this application.

In some other examples, as shown in FIG. 36, the power supply line 32 includes a second rigid circuit board 321 and a flexible circuit board 323. One end of the second rigid circuit board 321 is electrically connected to the flexible circuit board 323, and the other end of the second rigid circuit board 321 is electrically connected to the second electrical connector conductive part 331 of the second electrical connector 33. Alternatively, the second electrical connector conductive part 331 of the second electrical connector 33 is integrated on a surface of the second rigid circuit board 321. For example, one end of the second rigid circuit board 321 is electrically connected to the flexible circuit board 323, the other end of the second rigid circuit board 321 extends into the second socket 12, and a surface that is of a part of the second rigid circuit board 321 and that is located in the second socket 12 may have an edge connector. The edge connector forms the second electrical connector conductive part 331 of the second electrical connector 33. An end part that is of the flexible circuit board 323 and that is away from the second rigid circuit board 321 is electrically connected to the first electrical connector conductive part 311 of the first electrical connector 31.

In some other examples, the power supply line 32 may alternatively include a cable 322 and a flexible circuit board 323. For example, the first electrical connector conductive part 311 of the first electrical connector 31, the cable 322, the flexible circuit board 323, and the second electrical connector conductive part 331 of the second electrical connector 33 are electrically connected in sequence. For another example, the first electrical connector conductive part 311 of the first electrical connector 31, the flexible circuit board 323, the cable 322, and the second electrical connector conductive part 331 of the second electrical connector 33 are electrically connected in sequence.

In some other examples, the power supply line 32 may alternatively be integrated into the first rigid circuit board 221 of the optical component 2. For example, the power supply line 32 may alternatively be a flat cable printed on a surface of the first rigid circuit board 221 of the optical component 2. In this case, the first electrical connector conductive part 311 of the first electrical connector 31 and the second electrical connector conductive part 331 of the second electrical connector 33 may be electrically connected by using the first rigid circuit board 221. For example, the first electrical connector conductive part 331 is connected to one end of the first rigid circuit board 221, and the second electrical connector conductive part 331 is connected to the other end of the first rigid circuit board 221.

In a solution in which the power supply line 32 is integrated into the first rigid circuit board 221, the second electrical connector conductive part 331 may alternatively be integrated into the first rigid circuit board 221. For example, the second electrical connector conductive part 331 is a metal sheet located on a surface of the first rigid circuit board 221.

Figure 51:
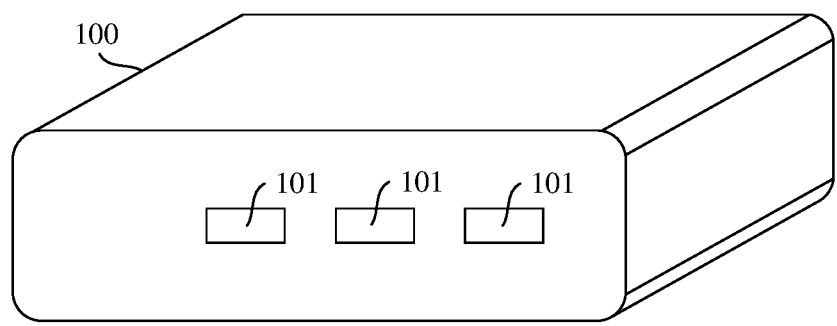
FIG. 51 is a schematic diagram of a structure of an optical communication device according to this application.
Figure 52:
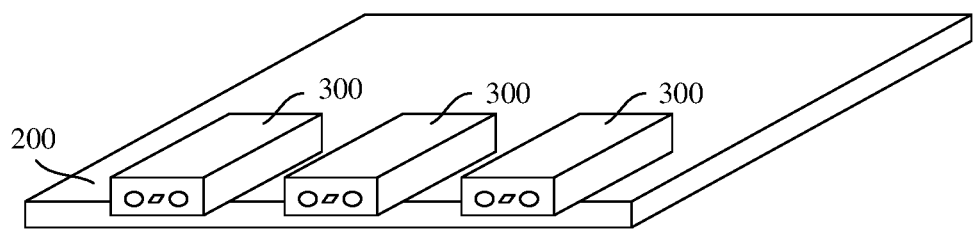
FIG. 52 is a schematic diagram of a structure of a mainboard of an optical communication device according to this application.

In a solution in which the second electrical connector conductive part 331 is a metal sheet located on a surface of the first rigid circuit board 221, as shown in FIG. 51, the second optical connector 23 of the optical component 2 is an edge connector located on the surface of the first rigid circuit board 221. Therefore, as shown in FIG. 51, the second electrical connector conductive part 331 may be an undefined metal sheet in the edge connector, and the undefined metal sheet is an unused metal sheet in the edge connector. For another example, as shown in FIG. 52 and FIG. 53, the second electrical connector conductive part 331 is a metal sheet additionally disposed around the edge connector, and 23-33 in FIG. 52 and FIG. 53 indicates a composite electrical connector including the second optical connector 23 and the second electrical connector 33.

In the solution in which the second electrical connector conductive part 331 is a metal sheet located on the surface of the first rigid circuit board 221, and the second electrical connector conductive part 331 may be a metal sheet additionally disposed around the edge connector. As shown in FIG. 52, the second electrical connector conductive part 331 is located at an end part of the edge connector in a length direction. Alternatively, as shown in FIG. 53, the second electrical connector conductive part 331 is located at a side part of the edge connector in a length direction. Position arrangement of the second electrical connector conductive part 331 of the second electrical connector 33 relative to the conductive part of the second optical connector 23 is not limited in this embodiment.

In another example, the first electrical connector conductive part 331 of the first electrical connector 31, the power supply line 32, and the second electrical connector conductive part 331 of the second electrical connector 33 are integrally formed. For example, the first electrical connector conductive part 331, the power supply line 32, and the second electrical connector conductive part 331 may be formed by processing metal conductors, a part close to the first end of the metal conductor may form the first electrical connector conductive part 311, a part close to the second end of the metal conductor may form the second electrical connector conductive part 331, and other parts of the metal conductor may form the power supply line 32. In this way, the first electrical connector conductive part 311, the power supply line 32, and the second electrical connector conductive part 331 are formed by processing metal conductors.

A specific implementation of the power supply line 32 is not limited in this embodiment, and in actual processing of the optical module, the optical module may be flexibly selected based on an actual situation.

In order not to affect layout space of the optical component 2 in the housing 1, correspondingly, as shown in FIG. 33 and FIG. 34, the power supply line 32 may be laid on an inner surface of the housing 1.

For example, as shown in FIG. 33, the power supply line 32 is a flexible circuit board, and the flexible circuit board may be laid on an inner surface of the housing 1. For another example, as shown in FIG. 34, the power supply line 32 is a cable, and the cable may be laid on an inner surface of the housing 1. For another example, the power supply line 32 includes a cable and a flexible circuit board, and both the cable and the flexible circuit board may be located on an inner surface of the housing 1. For another example, the power supply line 32 includes a cable and a second rigid circuit board, or the power supply line 32 includes a flexible circuit board and a second rigid circuit board. In this case, the cable or the flexible circuit board may be laid on an inner surface of the housing 1, and the second rigid circuit board may be suspended in the housing 1, so that some components may be installed on the surface of the second rigid circuit board. For example, a component used by the power supply line 32 to transmit a data signal may be installed, and some components may be installed. These components may be components used by an optical module to receive feedback information and determining feedback information, this part of content is described in detail in the following when a function of the power supply component 3 is described.

In a solution in which the power supply line 32 is a second rigid circuit board, the second rigid circuit board may be located in the housing 1 side by side with the first rigid circuit board 221 of the optical component 2.

The foregoing is a specific form of the power supply line 32 and a position of the power supply line 32 in the housing 1. Regardless of a manner and a position of the power supply line 32 in the housing 1, the power supply line 32 does not affect layout space of the optical component 2 in the housing 1.

The Second Electrical Connector 33 of the Power Supply Component 3

Positions of the second optical connector 23 and the second electrical connector 33 that are located in the second socket 12 of the housing 1 are independent of each other, so that the second end of the optical module is compatible. The second end of the optical module is compatible, or in other words, the second socket 12 of the optical module is compatible.

The second end of the optical module is compatible, that is, the second end of the optical module may be inserted into an optical cage that includes a power interface, or may be inserted into an optical cage that does not include a power interface.

Figure 37:
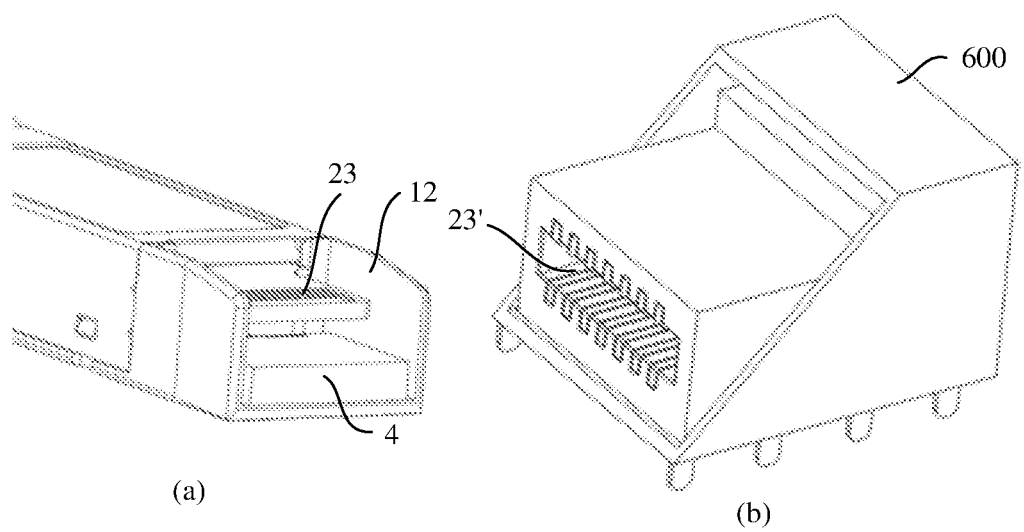
FIG. 37 is a schematic diagram of a structure in which an optical module is matched with an optical cage according to this application.
Figure 38:
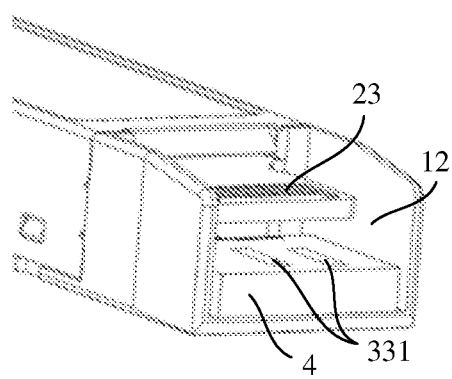
FIG. 38 is a schematic diagram of a structure of an optical module in which a second electrical connector conductive part is a metal sheet according to this application.

As shown in FIG. 37, the optical module includes a pluggable guide block 4, and the pluggable guide block 4 is located in the second socket 12. The second electrical connector 33 includes a second electrical connector conductive part 331. As shown in FIG. 38, the second electrical connector conductive part 331 is fastened to the pluggable guide block 4. A second end of the housing 1 can be inserted into an optical communication device that matches an optical module, and the optical module is any one of a standard optical module packaging type.

The pluggable guide block 4 is a structure included in all optical modules of a standard packaging type. Therefore, for an optical module that does not include the power supply component 3, the pluggable guide block 4 is also included. When the optical module is inserted into an optical cage of the optical communication device, as shown in FIG. 37, the pluggable guide block 4 of the optical module first is in contact with the optical cage 600, the optical module continues to be inserted into the optical cage 600, and the second optical connector 23 enters an electrical interface of the optical cage 600 under guidance of the pluggable guide block 4. 23' in FIG. 37 indicates an electrical interface corresponding to the second optical connector 23. In a process in which the optical module is inserted into the optical cage, the pluggable guide block 4 can further bear a specific action force, so as to reduce a force exerted on the second optical connector 23, protect the first rigid circuit board 221 in which the second optical connector 23 is located, and reduce a force exerted by the optical cage on the first rigid circuit board 221.

For a conductive part of the second electrical connector 33, the second electrical connector conductive part 331 of the second electrical connector 33, is fastened to the pluggable guide block 4, so that the second end of the housing 1 can be inserted into any optical communication device that matches the packaging type of the optical module, and the second end of the optical module is compatible.

The pluggable guide block 4 is used as an installation part of the second electrical connector 33, is a carrier of the second electrical connector conductive part 331, and may alternatively be referred to as a second electrical connector installation part. The pluggable guide block 4 may be made of an insulation material such as a plastic part.

As shown in FIG. 37, the pluggable guide block 4 has a plate-shaped structure, and is installed on an inner wall that is of the second socket 12 and that is located at the top (or bottom). For example, the pluggable guide block 4 may be fastened to the inner wall that is of the second socket 12 and that is located at the top by clamping, or may be fastened to the inner wall that is of the second socket 12 and that is located at the top through an adhesive.

The pluggable guide block 4 serves as a carrier of the second electrical connector conductive part 331, the second electrical connector conductive part 331 may be fastened on the pluggable guide block 4, and the second electrical connector conductive part 331 is further electrically connected to the power supply line 32. There are a plurality of positions for fastening the second electrical connector conductive part 331 on the pluggable guide block 4.

For example, a fastening position may be as follows. As shown in FIG. 38, the second electrical connector conductive part 331 is a strip-shaped metal sheet; the second electrical connector conductive part 331 is fastened on an outer surface that is of the pluggable guide block 4 and that is opposite to the second optical connector 23, the outer surface of the pluggable guide block 4 is a surface parallel to an insertion/removal direction of an optical module, and the strip direction of the second electrical connector conductive part 331 is parallel to the insertion/removal direction of the optical module.

For example, as shown in FIG. 38, the second electrical connector conductive part 331 may be attached to an outer surface that is of the pluggable guide block 4 and that faces the second optical connector 23. For another example, the second electrical connector conductive part 331 may alternatively be attached to an outer surface of a sidewall of the pluggable guide block 4. For another example, when an outer surface of a sidewall of the pluggable guide block 4 is fastened to an inner surface of a sidewall of the second socket 12, the second electrical connector conductive part 331 may alternatively be attached to an outer surface that is of the pluggable guide block 4 and that is back to the second optical connector 23.

Figure 39:
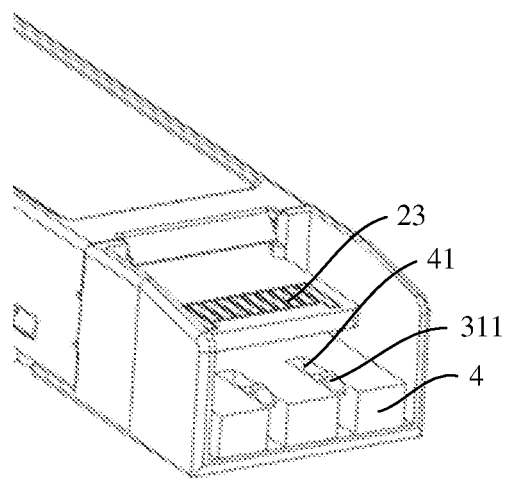
FIG. 39 is a schematic diagram of a structure of an optical module in which a second electrical connector conductive part is a strip-shaped spring according to this application.

For another example, as shown in FIG. 39, the second electrical connector conductive part 331 is a strip-shaped metal spring. The strip-shaped metal spring may alternatively be referred to as a strip-shaped spring. For a structure of the strip-shaped metal spring, refer to FIG. 40. The second electrical connector conductive part 331 that is a strip-shaped spring includes a straight part 3311 and a bent part 3312.

As shown in FIG. 39, the pluggable guide block 4 has a mounting groove 41, the mounting groove 41 has an opening on an outer surface of the pluggable guide block 4, and the outer surface of the pluggable guide block 4 is any surface parallel to an insertion/removal direction of the optical module. The surface parallel to the insertion/removal direction of the optical module may be an outer surface that is of the pluggable guide block 4 and that faces the second optical connector 23, or may be an outer surface of a sidewall of the pluggable guide block 4, or may be an outer surface that is of the pluggable guide block 4 and that is back to the second optical connector 23, or the like. This is not limited in this embodiment, and an example of facing the outer surface of the second optical connector 23 may be used.

Figure 40:
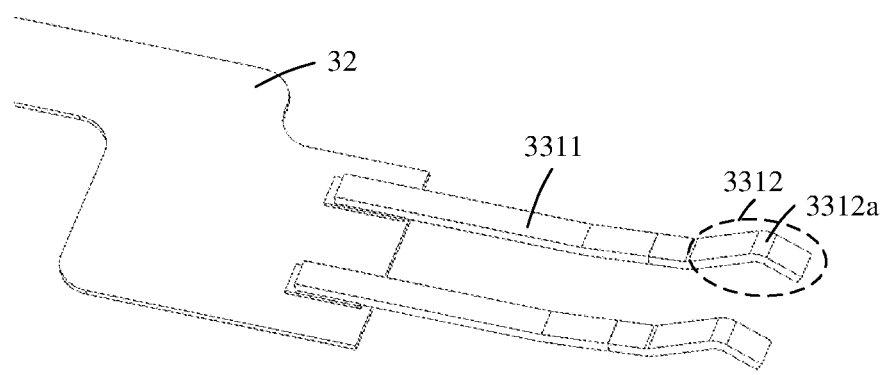
FIG. 40 is a schematic diagram of a structure of a strip-shaped spring according to this application.

As shown in FIG. 40 and FIG. 39, the straight part 3311 of the second electrical connector conductive part 331 that is a strip-shaped spring is located in the pluggable guide block 4, and the bent part 3312 of the strip-shaped spring is located in the mounting groove 41. For example, the bent part 3312 is suspended in the mounting groove 41, and a bending position 3312a of the bent part 3312 extends out of the opening of the mounting groove 41. The bending position 3312a of the bent part 3312 is configured to be electrically connected to a contact part of the inserted device. In this way, when the optical module is inserted into the device, the bending position 3312a may be in contact with a conductive part in the inserted device to implement an electrical connection.

Figure 41:
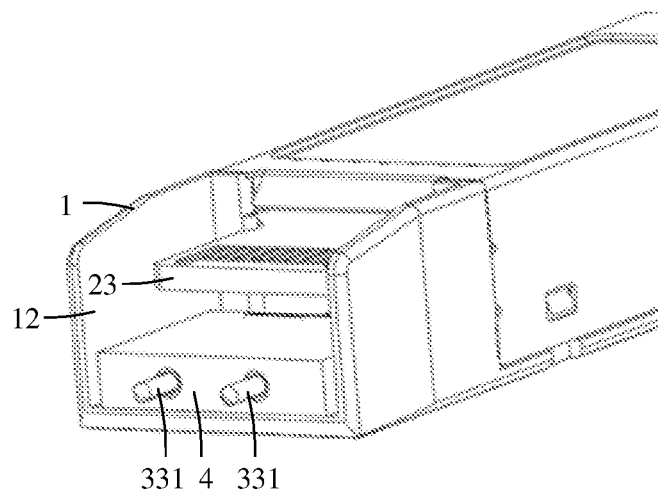
FIG. 41 is a schematic diagram of a structure of an optical module in which a second electrical connector conductive part is a conductive pillar according to this application.

For another example, as shown in FIG. 41, the second electrical connector conductive part 331 is a metal rod; and the second electrical connector conductive part 331 is fastened inside the pluggable guide block 4, and extends out of an end face that is of the pluggable guide block 4 and that is away from the power supply line 32.

For example, the second electrical connector conductive part 331 penetrates through the inside of the pluggable guide block 4, one end of the second electrical connector conductive part 331 extends out of an end face that is of the pluggable guide block 4 and that is close to the power supply line 32 and is electrically connected to the power supply line 32, and the other end extends out of the end face that is of the pluggable guide block 4 and that is away from the power supply line 32 and is configured to electrically connect to the inserted device.

Figure 42:
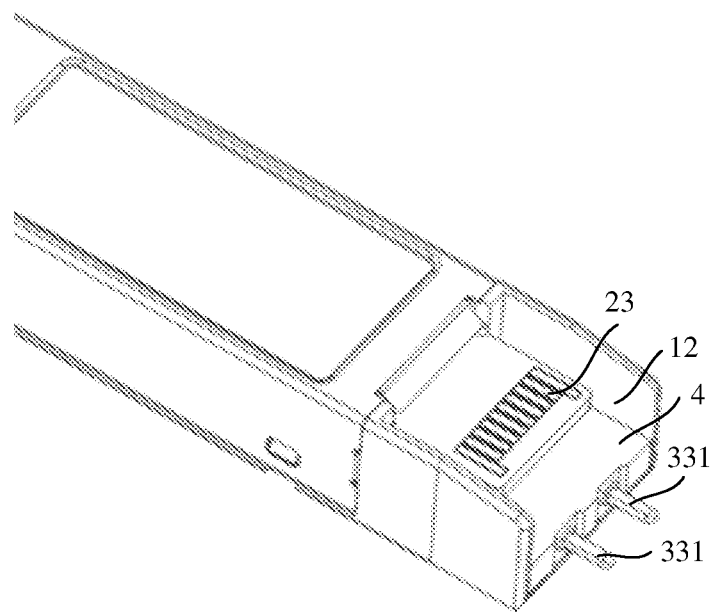
FIG. 42 is a schematic diagram of a structure of an optical module in which a second electrical connector conductive part is a spring pin according to this application.

In an example, to ensure that an electrical connection between the second electrical connector conductive part 331 and the inserted device is stable, correspondingly, as shown in FIG. 42, the metal rod may be a spring pin, where the spring pin may also be referred to as a pogopin, and a pin shaft of the spring pin can extend in an insertion/removal direction of an optical module.

Figure 43:
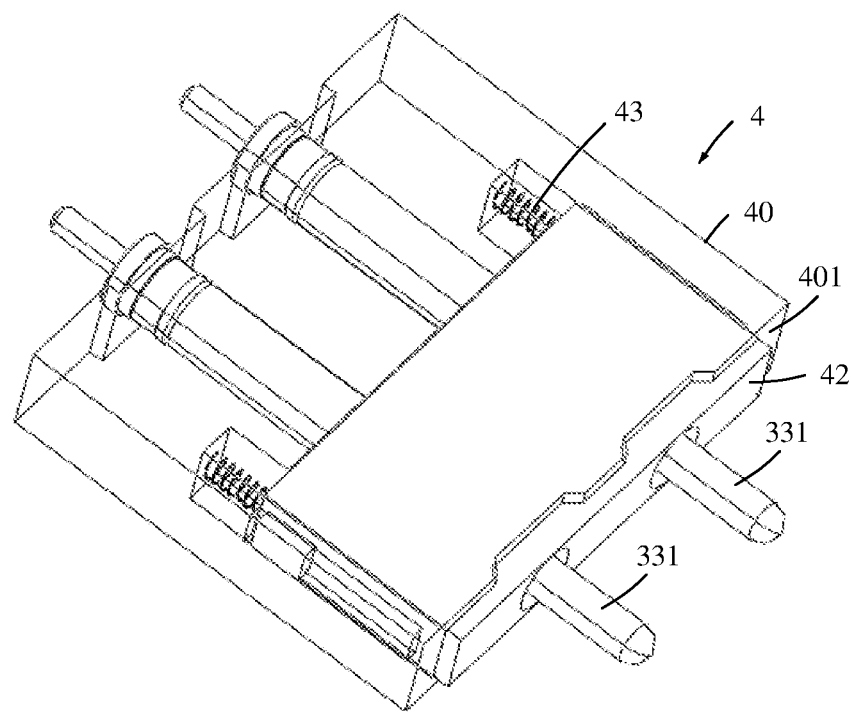
FIG. 43 is a schematic diagram of a structure in which a second electrical connector conductive part is in a pluggable guide block according to this application.

Because the spring pin extends out of an end part of the pluggable guide block 4, and has an end part that is configured to be electrically connected to an optical communication device and that is exposed on the housing 1, to avoid damage to the spring pin when the optical module falls, correspondingly, as shown in FIG. 43, the pluggable guide block 4 includes a body 40 and a protective part. The protective part is fixedly connected to the body 40, and the protective part is configured as follows. When the optical module is inserted into the optical communication device, the protective part can enable the pin shaft of the spring pin to be in close contact with a contact point of the optical communication device; or when the optical module is not inserted into the optical communication device, the protective part can protect the pin shaft of the spring pin.

Figure 44:
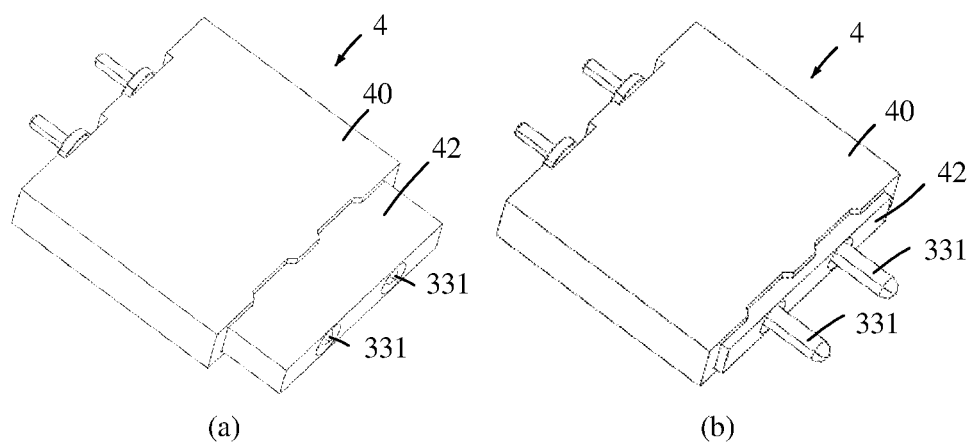
FIG. 44 is a schematic diagram of a structure in which a second electrical connector conductive part is in a pluggable guide block according to this application.

A specific implementation structure of the protective part includes a plurality of types. For example, a structure of the protective part is shown in FIG. 43. The protective part includes a slider 42 and a first elastic part 43. An elastic force of the first elastic part 43 is less than an elastic force of the spring pin. An end part of the body 40 has a sliding slot 401, the slider 42 and the first elastic part 43 are both located in the sliding slot 401, and the first elastic part 43 is connected between a bottom of the sliding slot 401 and the slider 42. One part of the spring pin is fastened in the body 40, and the other part is located in the slider 42. The slider 42 can slide relative to the body 40 and the spring pin, and a sliding direction is parallel to an insertion/removal direction of the optical module, as shown in (a) and (b) in FIG. 44.

The first elastic part 43 may be any component having telescopic elasticity, for example, may be a spring. In this way, under elasticity of the first elastic part 43, the slider 42 can extend out of the sliding slot 401 without detaching from the sliding slot 401, and can alternatively be retracted into the sliding slot 401.

In this way, when the optical module is inserted into the optical communication device, as the optical module is inserted, the slider 42 is retracted into the sliding slot 401 under push of the optical communication device. Because a elasticity of the spring pin is greater than the elasticity of the first elastic part 43, the pin shaft of the spring pin is in close contact with a contact point of the optical communication device. However, when the optical module is not inserted into the optical communication device, the slider 42 extends out of the sliding slot 401 under an elastic force of the first elastic part 43, so as to enclose the spring pin and protect the pin shaft of the spring pin.

Figure 45:
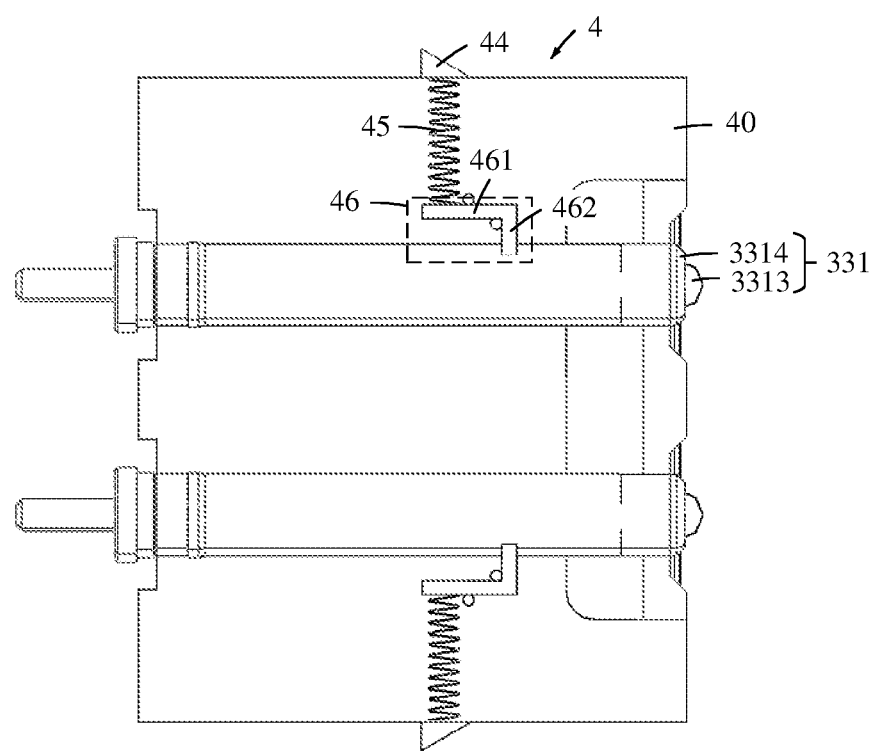
FIG. 45 is a schematic diagram of a structure in which a second electrical connector conductive part is in a pluggable guide block according to this application.
Figure 46:
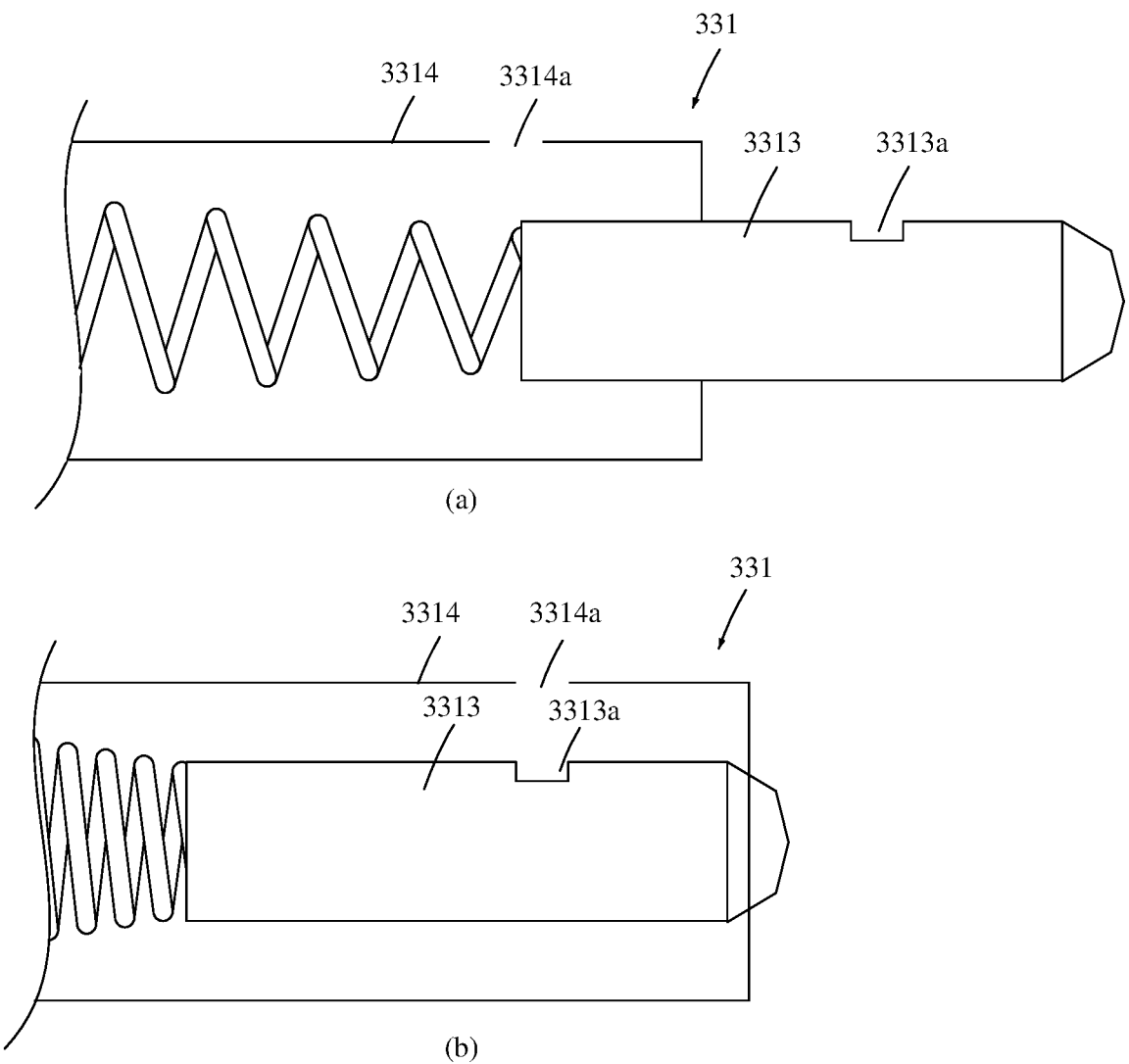
FIG. 46 is a schematic diagram of a structure of a spring pin according to this application.

For another structure of the protective part, as shown in FIG. 45, the protective part includes a pressing part 44, a second elastic part 45, and an L-shaped rod 46. As shown in (a) and (b) in FIG. 46, the pin shaft 3313 of the spring pin has a groove 3313a, and a tube wall of a tube 3314 of the spring pin has a through hole 3314a. When the groove 3313a of the pin shaft 3313 is opposite to the through hole 3314a of the tube 3314, the pin shaft 3313 is accommodated in the tube 3314.

As shown in FIG. 45, one part of the pressing part 44 is located outside the body 40, and the other part is located in the body 40. The spring pin, the second elastic part 45, and the L-shaped rod 46 are all located in the body 40. The pressing part 44, the second elastic part 45, and the first rod 461 of the L-shaped rod 46 are sequentially connected. The second rod 462 of the L-shaped rod 46 is opposite to the through hole 3314a of the tube 3314.

The pressing part 44 may extend or retract relative to the body 40, and an extending/retracting direction is perpendicular to an insertion/removal direction of the optical module. Correspondingly, as shown in FIG. 45, the pressing part 44 is located at a side part of the body 40.

In this way, when the optical module is inserted into an optical cage of an optical communication device, an inner wall of a socket of the optical cage exerts an action force on the pressing part 44, so that the pressing part 44 is in a pressed state. When the optical module is removed from the optical cage of the optical communication device, the inner wall of the socket of the optical cage no longer exerts an action force on the pressing part 44, and the pressing part 44 restores to a natural state under the action of the second elastic part 45, and is no longer in the pressed state.

A structure of the pressing part 44 may be any structure that is convenient for entering the optical cage. For example, as shown in FIG. 45, the pressing part 44 has a wedge-shaped structure, including an oblique surface. When the optical module is inserted into the optical communication device, the oblique surface of the pressing part 44 first enters the optical cage. For another example, the pressing part 44 may alternatively have a spherical structure, and a part that is of the pressing part 44 and that extends out of the body 40 is a spherical structure. A specific implementation structure of the pressing part 44 is not limited in this embodiment.

In this way, when the optical module is inserted into the optical communication device, the pressing part 44 is in a pressed state, and an end part of the second rod 462 of the L-shaped rod 46 is located outside the tube 3314, so that the pin shaft 3313 is in close contact with a contact point of the optical communication device. However, when the optical module is not inserted into the optical communication device, and the pin shaft 3313 is retracted into the tube 3314, an end part of the second rod 462 of the L-shaped rod 46 is located in the groove 3313a of the pin shaft 3313, so that the pin shaft 3313 keeps being retracted into the tube 3314.

Figure 47:
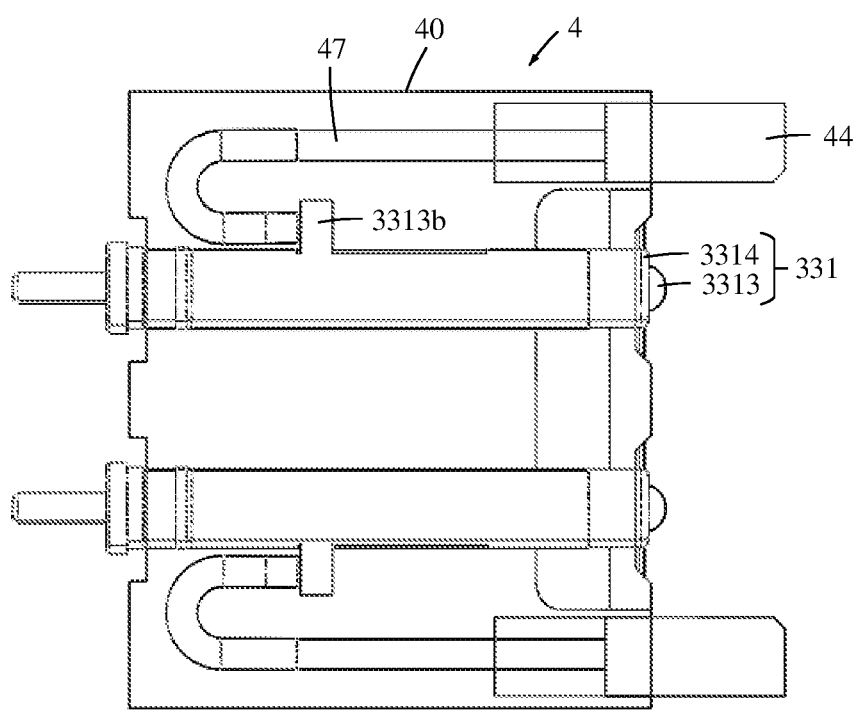
FIG. 47 is a schematic diagram of a structure in which a second electrical connector conductive part is in a pluggable guide block according to this application.
Figure 48:
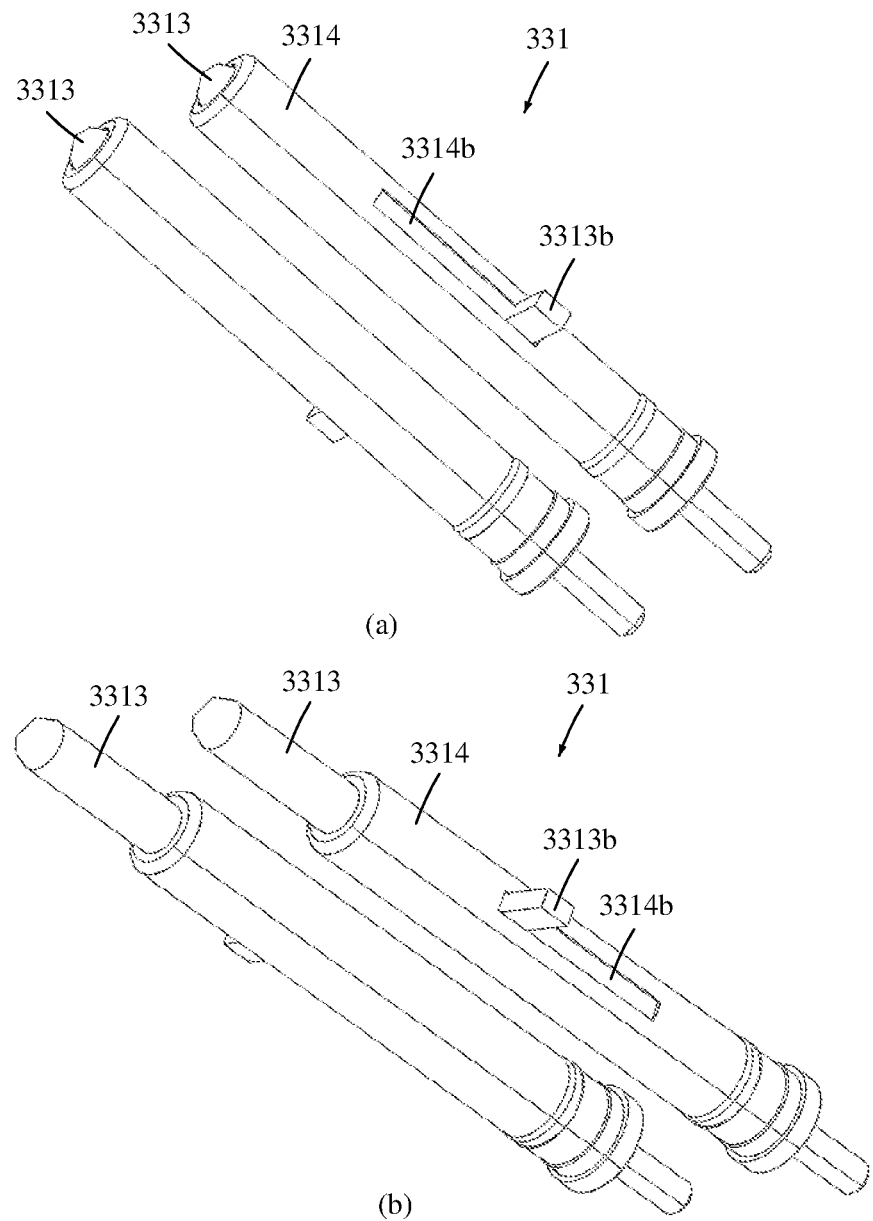
FIG. 48 is a schematic diagram of a structure of a spring pin according to this application.

For another structure of the protective part, as shown in FIG. 47. The protective part includes a pressing part 44, and a U-shaped part 47. As shown in (a) and (b) in FIG. 48, the tube 3314 of the spring pin has an axial strip-shaped hole 3314b, the pin shaft 3313 of the spring pin has a bump 3313b, and the bump 3313b is located in the axial strip-shaped hole 3314b.

As shown in FIG. 47, one part of the pressing part 44 is located outside the body 40, and the other part is located in the body 40. Both the spring pin and the U-shaped part 47 are located in the body 40, a first end of the U-shaped part 47 is located at the pressing part 44, and a second end of the U-shaped part 47 is located at the bump 3313b of the pin shaft 3313.

The pressing part 44 may extend or retract relative to the body 40, and an extending/retracting direction is parallel to an insertion/removal direction of the optical module. Correspondingly, as shown in FIG. 47, the pressing part 44 is located at an end part of the body 40.

In this way, when the optical module is inserted into an optical cage of an optical communication device, the optical cage exerts an action force on the pressing part 44, so that the pressing part 44 is in a pressed state. When the pressing part 44 is in the pressed state, the U-shaped part 47 can push the pin shaft 3313 of the spring pin, so that the pin shaft 3313 is in close contact with a connector in the optical cage. When the optical module is removed from the optical cage of the optical communication device, the optical cage no long applies an action force on the pressing part 44, the spring inside the spring pin pulls the pin shaft 3313 to retract, and the bump 3321b of the pin shaft 3313 pushes the U-shaped part 47 to move, so that the pressing part 44 restores to a natural state, and is no longer in a pressed state.

It can be learned that, when the optical module is inserted into the optical communication device, the pressing part 44 is in a pressed state, and the pin shaft 3313 extends out of the tube 3314 under the push of the U-shaped part 47, so as to be in close contact with a contact point of the optical communication device. When the optical module is not inserted into the optical communication device, the pressing part 44 is in a non-pressed state, and the pin shaft 3313 is retracted into the tube 3314.

In the foregoing solution, positions of the second electrical connector 33 and the second optical connector 23 are independent of each other, and the optical module includes one rigid circuit board, that is, the first rigid circuit board 221 of the optical component 2. In a solution in which the optical module includes two rigid circuit boards, positions of the second electrical connector 32 and the second optical connector 23 can also be independent of each other. One of the two rigid circuit boards is a rigid circuit board of the optical component 2, and is denoted as the first rigid circuit board 221, and the other is a rigid circuit board of the power supply component 3, and is denoted as a second rigid circuit board 321. The detailed solution is as follows.

Figure 49:
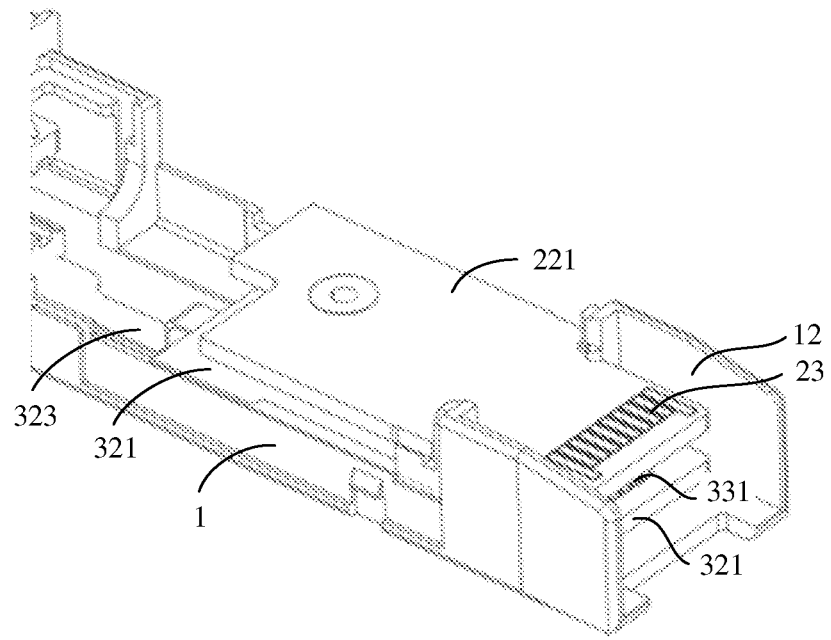
FIG. 49 is a schematic diagram of a structure of an optical module whose power supply line includes a second rigid circuit board according to this application.
Figure 50:
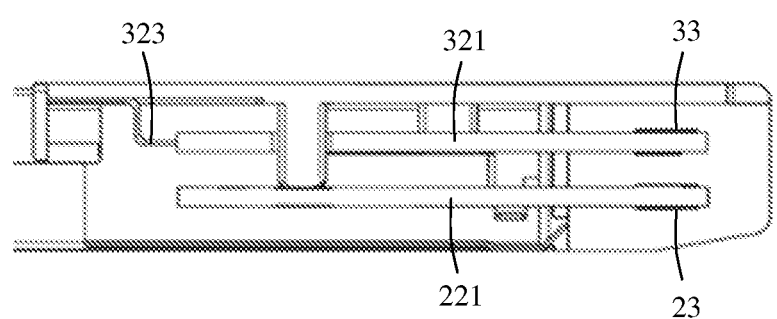
FIG. 50 is a schematic diagram of a structure of an optical module whose power supply line includes a second rigid circuit board according to this application.

For example, as shown in FIG. 49 and FIG. 50, the power supply component 3 further includes a second rigid circuit board 321. For example, the power supply line 32 of the power supply component 3 includes the second rigid circuit board 321, a first end of the second rigid circuit board 321 is located in the second socket 12, and the second electrical connector conductive part 331 of the second electrical connector 33 is an edge connector located on a surface of the second rigid circuit board 321.

As shown in FIG. 50, the second rigid circuit board 321 and the first rigid circuit board 221 of the optical component 2 are vertically located in parallel in the housing 1, a first end of the second rigid circuit board 321 extends into the second socket 12, a surface of a part that is of the second rigid circuit board 321 and that is located in the second socket 12 has an edge connector, and the edge connector may be used as the second electrical connector conductive part 331 of the second electrical connector 33.

In an example, the second rigid circuit board not only has a flat cable used to implement an electrical connection between the first electrical connector 31 and the second electrical connector 33, but also may have some components installed, to reduce a quantity of components on the first rigid circuit board 221 of the optical component 2. In some other examples, a processing chip may be mounted on a surface of the second rigid circuit board 321, to increase a processing speed of the optical module.

An electrical connection relationship between the second electrical connector 33 and the first electrical connector 31 may be as follows. The power supply line 32 not only includes the second rigid circuit board 321, as shown in FIG. 49, but also includes the flexible circuit board 323. The first electrical connector 31, the flexible circuit board 323, and the second rigid circuit board 321 are electrically connected in sequence. The flexible circuit board 323 may be replaced with a cable.

In an example, the second rigid circuit board 321 is relatively close to an inner wall of the housing 1. In this case, the second socket 12 at a second end of the optical module is compatible, and can be inserted into an optical cage that does not include a power connector.

When the power supply component 3 of the optical module is used as a power transmission channel, an application scenario of the power supply component 3 may be as follows.

The power supply component 3 is mainly configured to transmit electric energy, and is used as a power channel to transmit power.

Therefore, the optical module not only has an optical component for implementing conversion between an optical signal and an electrical signal, but also has a power supply component for implementing PoE. In this way, only an interface used to insert an optical module may be disposed on a panel of a device into which the optical module is inserted, for example, a switch or an AP, and an interface used to implement PoE does not need to be additionally disposed, so that a size of a panel on the device can be reduced.

As described above, the optical module has the power supply component 3 for implementing PoE. In application, the optical module may be configured to when it is detected that the inserted optical communication device is a powered device, determine a power consumption level of the optical communication device, and transmit electric energy to the optical communication device based on the power consumption level of the optical communication device.

PoE includes power sourcing equipment (PSE) and a powered device (PD). The power sourcing equipment may be a PoE switch or the like, and the powered device may be a PoE network camera, an AP, or the like.

For example, in a scenario, an optical module is inserted into an interface of a switch, an optical module is inserted into an interface of an AP, and the optical module on the switch is connected to the optical module on the AP by using a composite cable. The switch is power sourcing equipment, and the AP is a powered device. The switch outputs a small voltage to the AP through a port. After detecting that the AP is a powered device and supports PoE, the processor in an optical module inserted into the switch may feed back that the AP is the powered device to the inserted switch, and then the switch increases a voltage transmitted to the AP, so that the processor of the optical module inserted into the switch detects a power consumption level of the AP, the processor of the optical module inserted into the switch determines, based on a pre-stored correspondence between a power consumption level and a power supply voltage, a power supply voltage corresponding to the power consumption level of the AP, and feeds back the power supply voltage required by the AP to the inserted switch. In this way, the switch stably transmits electric energy to the AP based on the power supply voltage.

The power supply component 3 in the optical module may be configured to transmit not only electric energy, but also some data signals.

In some examples, the data signal transmitted in the power supply component 3 may include at least one of a signal used to adjust optical power of an optical component, a signal used to adjust a signal-to-noise ratio of a fiber channel, a signal used to adjust an S parameter of a fiber channel, and a signal indicating that an optical module is abnormal.

Since the power supply component 3 may transmit a data signal, the power supply component 3 may be used as a backhaul channel, and the backhaul channel is a channel that can return some information to a transmit end after a receive end receives the signal.

The power supply component 3 is used as a backhaul channel. In this case, when receiving an optical signal sent by an optical module at the transmit end, an optical module at a receive end may generate first feedback information based on the optical signal, and modulate the first feedback information to the power supply component 3. The first feedback information is used to indicate the optical module at the transmit end to adjust a parameter of the optical component 2. For example, the first feedback information includes at least one type of information used to adjust optical power of the optical component 2, information used to adjust a signal-to-noise ratio of a fiber channel, and information used to adjust an S parameter of the fiber channel, where the S parameter may also be referred to as a scattering parameter, and is an important parameter in microwave transmission.

In this case, for the optical module at the transmit end, when second feedback information sent by the optical module at the receive end is received by using the power supply component 3, the parameter of the optical component 2 is adjusted based on the second feedback information.

The second feedback information also includes at least one of information used to adjust optical power of the optical component 2, information used to adjust a signal-to-noise ratio of a fiber channel, and information used to adjust an S parameter of the fiber channel.

If the optical module at the transmit end and the optical module at the receive end are a pair of interactive optical modules, content carried in the first feedback information is equal to content carried in the second feedback information. In the following example, a pair of interactive optical modules may be used as an example for description.

For example, if a switch sends an optical signal to an AP, an optical module inserted into a panel of the switch is a transmit end, and an optical module inserted into a panel of the AP is a receive end. The optical module at the transmit end sends an optical signal to the optical module at the receive end through a fiber channel. When receiving the optical signal sent by the optical module at the transmit end, the optical module at the receive end generates feedback information (that is, the foregoing first feedback information) based on the optical signal, and modulates the feedback information to the power supply component 3. The power supply component 3 sends the feedback information to a copper wire of a composite cable by using the first electrical connector 31.

The feedback information is transmitted to the optical module at the transmit end by using the copper wire, and is transmitted to the power supply component 3 of the optical module at the transmit end by using the first electrical connector 31 of the optical module at the transmit end. The power supply component 3 of the optical module at the transmit end sends the feedback information to a processor, and the processor parses to obtain the feedback information (that is, the foregoing second feedback information). Then, a processor in the optical module at the transmit end performs equalization adjustment on a parameter of the optical component 2 based on the received feedback information.

In an example, the feedback information includes a power value. In this case, after obtaining, through parsing, the power value received by the optical module at the receive end, the optical module at the transmit end compares the power value with a pre-stored power threshold required by the optical module at the receive end. If the received power value is greater than the power threshold, a power value for subsequently sending the optical signal to the optical module at the receive end may be reduced, and when the received power value is relatively close to the pre-stored power threshold, adjustment of the power value for sending the optical signal to the optical module at the receive end is stopped. In this way, the optical module at the transmit end may dynamically adjust the power value of the transmitted optical signal based on the feedback information that is sent by the optical module at the receive end and that carries the power value, to achieve an effect of reducing power consumption and saving energy.

In another example, the feedback information includes a signal-to-noise ratio or an S parameter. In this case, after the optical module at the transmit end obtains, through parsing, the signal-to-noise ratio of the fiber channel sent by the optical module at the receive end, if the signal-to-noise ratio is high, the optical module at the transmit end does not need to adjust a parameter; if the signal-to-noise ratio is low, the optical module at the transmit end may increase the signal-to-noise ratio by increasing a transmit power, or may increase the signal-to-noise ratio by adjusting a quantity of taps and a coefficient of the quantity of taps.

In this way, the power supply component 3 is used as a backhaul channel, so that the optical module at the transmit end can obtain some data in the fiber channel, to provide a basis for transmitting an optimal optical signal. However, once quality of the transmitted optical signal is high, the optical module is also protected to a specific extent. This helps prolong the service life of the optical module.

For another example, when the optical module is faulty, for example, when power of the transmitted optical signal is excessively low, or when optical-to-electrical conversion cannot be performed, an abnormal signal may be sent to the inserted device by using the power supply component 3, so that a skilled person can learn, by using the device, that the optical module is faulty and needs to be replaced.

Because power of a transmitted data signal is much lower than power of power transmission, the transmitted data signal is equivalent to being overwhelmed in a power signal in a spectrum. In this way, even if the data signal is intercepted by an eavesdropper, the eavesdropper may consider it as a noise signal. Therefore, when the data signal is transmitted by using the power supply component 3, it is difficult to intercept the data signal, and security of data signal transmission can be improved.

It can be learned that the optical module has a power supply component for implementing PoE, and the power supply component can not only transmit electric energy, but also transmit some data signals.

Based on the foregoing description, the optical module has at least the following effects.

The optical module not only has an optical-to-electrical conversion function, but also has a power supply component for implementing PoE. As an inserted device, an optical port configured to insert an optical module and an electrical port configured to insert a power connector are also located in a same port. For example, only a port configured to insert the optical module needs to be disposed on a panel of a switch and a panel of an AP, so that panel sizes of the switch and the AP can be reduced, and miniaturization development of the switch and the AP is facilitated.

The first electrical connector 31 at a first end of the optical module does not change the original structural feature of the optical module, so that the first end of the optical module is compatible, and can be configured to insert an updated composite cable or a composite cable before update. Therefore, the optical module has a wide application scenario. The updated optical cage matches a packaging type of the optical module, and includes a composite cable that has a power connector that matches the first electrical connector. The composite cable before update matches the packaging type of the optical module, but does not include the composite cable that has the power connector that matches the first electrical connector.

The second electrical connector 33 at a second end of the optical module does not change an original structural feature of the optical module, so that the second end of the optical module is compatible, and can be inserted into both an updated optical cage and an optical cage before update. Therefore, the optical module has a wide application scenario. The updated optical cage matches a packaging type of the optical module, and includes an optical cage of a power connector that matches the second electrical connector. The optical cage before update matches the packaging type of the optical module, but does not include the optical cage of the power connector that matches the second electrical connector. The optical cage is an interface component of an optical communication device.

Embodiments of this application further provide an optical communication device. The optical communication device may be any device in the optical communication field, for example, may be a switch or an AP.

As shown in FIG. 51 and FIG. 52, the optical communication device includes a chassis 100, a mainboard 200, and an optical-to-electrical conversion assembly 300. As shown in FIG. 51, a panel of the chassis 100 has an optical cable socket 101. The optical-to-electrical conversion assembly 300 shown in FIG. 52 includes the optical component 2 and the power supply component 3. The mainboard 200, the optical component 2, and the power supply component 3 are all located in the chassis 100, the optical component 2 and the power supply component 3 are both on a surface of the mainboard 200, and the optical connector of the optical component 2 and the electrical connector of the power supply component 3 are independent of each other, and are both located in the optical cable socket 101.

The optical connector of the optical component 2 is configured to be connected to an optical fiber connector of a composite cable, so as to transmit an optical signal. The electrical connector of the power supply component 3 is configured to be electrically connected to the power connector of the composite cable, to implement PoE power transmission.

In an example, the optical-to-electrical conversion assembly 300 implements an optical-to-electrical conversion function by using the optical component 2, and implements a PoE function by using the power supply component 3. The optical-to-electrical conversion assembly 300 is packaged in the chassis 100 based on a standard optical module packaging type. Because the optical communication device needs to be connected to the composite cable, a panel of the chassis 100 has an optical cable socket 101. An optical connector of the optical component 2 and an electrical connector of the power supply component 3 are both opposite to the optical cable socket 101. For example, the optical connector of the optical component 2 is located in the optical cable socket 101, and the electrical connector of the power supply component 3 is also located in the optical cable socket 101.

In an example, the optical communication device may be matched with an updated composite cable for use. For the updated composite cable, a connector at an end part of the composite cable not only includes an optical fiber connector, but also includes a power connector, the optical fiber connector matches the optical connector of the optical component 2, and the power connector matches the electrical connector of the power supply component 3.

In another example, the optical communication device further may be matched with a composite cable before update. For the composite cable before update, a connector at an end part of the composite cable includes an optical fiber connector, and does not include a power connector, and the optical fiber connector matches the optical connector of the optical component 2.

The optical communication device that can be matched with the updated composite cable, and also can be matched with the composite cable before update is compatible, and has a wide application scenario, and high use flexibility.

A structural feature of implementing compatibility of the optical communication device may be as follows.

Both the optical connector of the optical component 2 and the electrical connector of the power supply component 3 are located in the optical cable socket 101, and positions of the optical connector of the optical component 2 and the electrical connector of the power supply component 3 are independent of each other, so that the optical cable socket 101 is configured to be inserted into a composite cable that matches the optical-to-electrical conversion assembly 300 of the standard packaging type.

In an example, the optical component 2 is located on a surface of the mainboard 200, and the optical connector of the optical component 2 is generally supported by using a center pillar 5, and guiding and limiting for insertion and removal are also implemented by using the center pillar 5. A conductive part of the electrical connector of the power supply component 3 may be fastened in the center pillar 5, without affecting a structural feature of the optical connector of the optical component 2. In this way, compatibility of the optical communication device can be implemented. For a fastening relationship between the conductive part of the electrical connector of the power supply component 3 and the center pillar 5 and a specific structural form of the conductive part of the electrical connector, refer to a fastening relationship between the first electrical connector conductive part 311 of the power supply component 3 and the center pillar 5 and a specific structural form of the first electrical connector conductive part 311. Details are not described herein again.

The optical cable socket 101 of the optical communication device has compatibility, so that the composite cable before update can be inserted into the optical cable socket 101 and is connected to an optical connector in the optical cable socket 101, to implement optical signal transmission. The updated composite cable can be further inserted into the optical cable socket 101, and is separately connected to the optical connector in the optical cable socket 101 and electrically connected to an electrical connector in the optical cable socket 101, to implement optical signal transmission and power transmission.

The optical communication device is integrated with the optical-to-electrical conversion assembly 300. In this case, when the optical communication device is connected to another device, only an optical cable or a composite cable needs to be inserted, and an optical module does not need to be additionally inserted. Therefore, the connection operation is simple, and loss of the optical module can be avoided. In addition, a case in which a connection fails due to mismatching between the optical module and the optical communication device can be avoided.

This embodiment further provides a power over Ethernet PoE device. The PoE device includes the optical module described above, and the optical module of the PoE device, as described above, not only has an optical-to-electrical conversion function, but also has a power supply component for implementing PoE, and the power supply component does not change an original structural feature of the optical module, and does not affect a size of the optical module. In this way, the power connector of the composite cable is electrically connected to the PoE device by using the optical module, and the power connector of the composite cable does not need to be inserted into the PoE device, so that panel space of the PoE device can be reduced, a structure of the PoE device is more compact, and miniaturization development of the PoE device is facilitated.

The foregoing description is merely an embodiment of this application, but is not intended to limit this application. Any modification, equivalent replacement, or improvement made without departing from the principle of this application shall fall within the protection scope of this application.

What is claimed is:

1. An optical module, comprising:
   a housing, wherein a second end of the housing has a second socket, and the second end of the housing is an end part that is configured to be inserted into an optical communication device;
   an optical component having a second optical connector;
   a power supply component having a second electrical connector; and
   a first electrical connector located at a first end of the housing that is electrically connected to the second electrical connector such that the first electrical connector supplies power received through the second electrical connector to a power connector of a composite cable,
   wherein both the optical component and the power supply component are located in the housing, both the second optical connector and the second electrical connector are located in the second socket, and positions of the second optical connector and the second electrical connector are independent of each other.

2. The optical module according to claim 1, wherein the second end of the housing is configured to be inserted into an optical communication device that matches a standard optical module packaging type.

3. The optical module according to claim 1, wherein the second electrical connector comprises a second electrical connector conductive part; and
   wherein the second electrical connector conductive part is fastened to a pluggable guide block located in the second socket of the optical module.

4. The optical module according to claim 3, wherein the second electrical connector conductive part is a strip-shaped metal sheet; and
   wherein the strip-shaped metal sheet is located on a surface that is of the pluggable guide block and that is opposite to the second optical connector, and a strip direction of the strip-shaped metal sheet is parallel to an insertion/removal direction of the optical module.

5. The optical module according to claim 3, wherein the second electrical connector conductive part is a strip-shaped spring, and the second electrical connector conductive part comprises a straight part and a bent part; and
   wherein a surface of the pluggable guide block, that is opposite to the second optical connector, has a mounting groove, wherein the straight part of the strip-shaped spring is located in the pluggable guide block, wherein the bent part of the strip-shaped spring is located in the mounting groove, and wherein a bending position of the bent part extends out of an opening of the mounting groove.

6. The optical module according to claim 3, wherein the second electrical connector conductive part is a spring pin; and
   wherein the spring pin is located in the pluggable guide block, and an end part of the spring pin extends out of the pluggable guide block.

7. The optical module according to claim 6, wherein the pluggable guide block comprises a body and a protective part, wherein the protective part is fixedly connected to the body, and wherein the protective part is configured to:

enable, based on the optical module being inserted into the optical communication device, a pin shaft of the spring pin to be in close contact with a contact point of the optical communication device; or protect, based on the optical module not being inserted into the optical communication device, the pin shaft of the spring pin.

8. The optical module according to claim 7, wherein the protective part comprises a slider and a first elastic part, and an elastic force of the first elastic part is less than an elastic force of the spring pin;
wherein an end part of the body has a sliding slot, the slider and the first elastic part are both located in the sliding slot, and the first elastic part is connected between a bottom of the sliding slot and the slider; and
wherein one part of the spring pin is located in the body, and the other part of the spring pin is located in the slider, the slider can slide relative to the body and the spring pin, and a sliding direction is parallel to an insertion/removal direction of the optical module; and
at least one of:
the slider is retracted into the sliding slot, based on the optical module being inserted into the optical communication device, so that the pin shaft of the spring pin is in close contact with the contact point of the optical communication device; or
the slider is extended out of the sliding slot, based on the optical module not being inserted into the optical communication device, protecting the pin shaft of the spring pin.

9. The optical module according to claim 7, wherein the protective part comprises a pressing part, a second elastic part, and an L-shaped rod;
wherein the pin shaft of the spring pin has a groove, wherein a tube wall of a tube of the spring pin has a through hole, and wherein, based on the groove of the pin shaft being opposite to the through hole of the tube, the pin shaft is accommodated in the tube;
wherein one part of the pressing part is located outside the body, and the other part of the pressing part is located in the body, wherein the spring pin, the second elastic part and the L-shaped rod are all located in the body, wherein the pressing part, the second elastic part, and a first rod of the L-shaped rod are sequentially connected, and wherein a second rod of the L-shaped rod is opposite to the through hole of the tube;
the pressing part is in a pressed state, based on the optical module being inserted into the optical communication device, and an end part of the second rod of the L-shaped rod is located outside the tube, so that the pin shaft is in close contact with the contact point of the optical communication device; and
an end part of the second rod of the L-shaped rod is located in the groove of the pin shaft, based on the optical module not being inserted into the optical communication device, and the pin shaft is retracted into the tube.

10. The optical module according to claim 7, wherein the protective part comprises a pressing part and a U-shaped part;
a tube of the spring pin has an axial strip-shaped hole, the pin shaft of the spring pin has a bump, and the bump is located in the axial strip-shaped hole;
one part of the pressing part is located outside the body, and the other part of the pressing part is located in the body, the spring pin and the U-shaped part are both located in the body, a first end of the U-shaped part is located at the pressing part, and a second end of the U-shaped part is located at the bump of the pin shaft; and
the pressing part is in a pressed state, based on the optical module being inserted into the optical communication device, the pin shaft extends out of the tube under a push of the U-shaped part, wherein the pressing part is in close contact with the contact point of the optical communication device; and
the pressing part is in an unpressed state, based on the optical module not being inserted into the optical communication device, and the pin shaft is retracted into the tube.

11. The optical module according to claim 1, wherein the power supply component further comprises a second rigid circuit board; and
wherein one end of the second rigid circuit board is located in the second socket, and a second electrical connector conductive part of the second electrical connector is an edge connector located on a surface of the second rigid circuit board.

12. The optical module according to claim 11, wherein the second rigid circuit board, and a first rigid circuit board of the optical component are vertically located in parallel in the housing.

13. A power over Ethernet (POE) device, comprising:
an optical module, wherein the optical module comprises:
a housing, wherein a second end of the housing has a second socket, and the second end of the housing is an end part that is configured to be inserted into an optical communication device;
an optical component having a second optical connector;
a power supply component having a second electrical connector; and
a first electrical connector located at a first end of the housing that is electrically connected to the second electrical connector such that the first electrical connector supplies power received through the second electrical connector to a power connector of a composite cable,
wherein both the optical component and the power supply component are located in the housing, both the second optical connector and the second electrical connector are located in the second socket, and positions of the second optical connector and the second electrical connector are independent of each other.

14. The PoE device according to claim 13, wherein the second end of the housing is configured to be inserted into an optical communication device that matches a standard optical module packaging type.

15. The PoE device according to claim 13, wherein the second electrical connector comprises a second electrical connector conductive part; and
wherein the second electrical connector conductive part is fastened to a pluggable guide block located in the second socket of the optical module.

16. The PoE device according to claim 15, wherein the second electrical connector conductive part is a strip-shaped metal sheet; and
wherein the strip-shaped metal sheet is located on a surface that is of the pluggable guide block and that is opposite to the second optical connector, and a strip direction of the strip-shaped metal sheet is parallel to an insertion/removal direction of the optical module.

17. The PoE device according to claim 15, wherein the second electrical connector conductive part is a strip-shaped spring, and the second electrical connector conductive part comprises a straight part and a bent part; and wherein a surface of the pluggable guide block, that is opposite to the second optical connector, has a mounting groove, wherein the straight part of the strip-shaped spring is located in the pluggable guide block, wherein the bent part of the strip-shaped spring is located in the mounting groove, and wherein a bending position of the bent part extends out of an opening of the mounting groove.

18. The PoE device according to claim 15, wherein the second electrical connector conductive part is a spring pin; and wherein the spring pin is located in the pluggable guide block, and an end part of the spring pin extends out of the pluggable guide block.

19. The PoE device according to claim 18, wherein the pluggable guide block comprises a body and a protective part, wherein the protective part is fixedly connected to the body, and wherein the protective part is configured to:

enable, based on the optical module being inserted into the optical communication device, a pin shaft of the spring pin to be in close contact with a contact point of the optical communication device; or protect, based on the optical module not being inserted into the optical communication device, the pin shaft of the spring pin.

20. The PoE device according to claim 13, wherein the power supply component further comprises a second rigid circuit board; and wherein one end of the second rigid circuit board is located in the second socket, and a second electrical connector conductive part of the second electrical connector is an edge connector located on a surface of the second rigid circuit board.

* * * * *

UNITED STATES PATENT AND TRADEMARK OFFICE
CERTIFICATE OF CORRECTION

PATENT NO. : 12,481,110 B2
APPLICATION NO. : 18/111338
DATED : November 25, 2025
INVENTOR(S) : Gao et al.

Page 1 of 1

It is certified that error appears in the above-identified patent and that said Letters Patent is hereby corrected as shown below:

In the Claims

In Column 46, in Claim 13, Line 26, delete "(POE)" and insert -- (PoE) --.

Signed and Sealed this
Third Day of February, 2026

John A. Squires
*Director of the United States Patent and Trademark Office*